United States Patent
Nelson et al.

(10) Patent No.: US 12,318,689 B2
(45) Date of Patent: Jun. 3, 2025

(54) REACTION TRACK FOR DIFFERENT SPECTATOR GROUPS WITHIN AN AUDIENCE

(71) Applicant: Sony Interactive Entertainment Inc., Tokyo (JP)

(72) Inventors: David Nelson, San Mateo, CA (US); Sudha Krishnamurthy, San Mateo, CA (US); Mahdi Azmandian, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 784 days.

(21) Appl. No.: 17/220,739

(22) Filed: Apr. 1, 2021

(65) Prior Publication Data

US 2022/0171960 A1    Jun. 2, 2022

Related U.S. Application Data

(60) Provisional application No. 63/133,115, filed on Dec. 31, 2020, provisional application No. 63/133,129, filed on Dec. 31, 2020, provisional application No. 63/119,637, filed on Nov. 30, 2020.

(51) Int. Cl.
| | |
|---|---|
| *G06K 9/00* | (2022.01) |
| *A63F 13/213* | (2014.01) |
| *A63F 13/42* | (2014.01) |
| *A63F 13/53* | (2014.01) |
| *A63F 13/57* | (2014.01) |
| *A63F 13/86* | (2014.01) |
| *A63F 13/87* | (2014.01) |
| *G06V 40/16* | (2022.01) |

(52) U.S. Cl.
CPC ............ *A63F 13/53* (2014.09); *A63F 13/213* (2014.09); *A63F 13/42* (2014.09); *A63F 13/57* (2014.09); *A63F 13/86* (2014.09); *A63F 13/87* (2014.09); *G06V 40/176* (2022.01)

(58) Field of Classification Search
None
See application file for complete search history.

(56) References Cited

U.S. PATENT DOCUMENTS

| | | | | |
|---|---|---|---|---|
| 10,376,795 | B2* | 8/2019 | Garg | A63F 13/87 |
| 11,524,245 | B2* | 12/2022 | Osman | G06N 20/00 |
| 11,983,807 | B2* | 5/2024 | Chen | H04L 51/02 |
| 12,125,130 | B1* | 10/2024 | Mulliken | G06T 13/205 |

(Continued)

OTHER PUBLICATIONS

ISR & WO PCT/US2021/061040, dated Mar. 1, 2022, 3 pages.

*Primary Examiner* — S J Park
(74) *Attorney, Agent, or Firm* — Kilpatrick Townsend & Stockton LLP

(57) ABSTRACT

Methods and systems for representing emotions of an audience of spectators viewing online gaming of a video game include capturing interaction data from spectators of an audience engaged in watching gameplay of the video game. The captured interaction data is used to cluster the spectators into different groups in accordance to emotions detected from the interactions of spectators in the audience. A reaction track is identified for each group based on the emotion associated with the group. The reaction tracks representing distinct emotions of different groups of spectators are presented alongside content of the video game.

18 Claims, 24 Drawing Sheets

(56) References Cited

U.S. PATENT DOCUMENTS

| | | | |
|---|---|---|---|
| 2007/0271580 A1* | 11/2007 | Tischer | H04H 60/07 725/35 |
| 2008/0215973 A1* | 9/2008 | Zalewski | A63F 13/77 715/764 |
| 2017/0003740 A1 | 1/2017 | Verfaillie et al. | |
| 2017/0003784 A1 | 1/2017 | Garg et al. | |
| 2019/0270018 A1* | 9/2019 | Evans | A63F 13/79 |
| 2020/0404344 A1* | 12/2020 | Bathory | H04R 27/00 |
| 2022/0138995 A1* | 5/2022 | Baughman | G06Q 30/0205 345/619 |

* cited by examiner

Unimodal Emotion Recognition

Reaction tracks presented with expressive avatar to spectators of each vibe clique Reaction tracks for the respective vibe cliques Angry track Sad track Laughter (happy) track Vibe cliques

REACTION TRACK FOR DIFFERENT SPECTATOR GROUPS WITHIN AN AUDIENCE

CLAIM OF PRIORITY

The present application claims priority to and the benefit of U.S. Provisional Application Ser. No. 63/119,637, filed on Nov. 30, 2020, entitled "CLUSTERING AUDIENCE BASED ON EXPRESSIONS CAPTURED FROM DIFFERENT SPECTATORS OF THE AUDIENCE," the disclosure of which is incorporated herein by reference in its entirety for all purposes. The present application claims priority to and the benefit of U.S. Provisional Application Ser. No. 63/133,115, filed on Dec. 31, 2020, entitled "REACTION TRACK FOR DIFFERENT SPECTATOR GROUPS WITHIN AN AUDIENCE," the disclosure of which is incorporated herein by reference in its entirety for all purposes. The present application claims priority to and the benefit of U.S. Provisional Application Ser. No. 63/133,129, filed on Dec. 31, 2020, entitled "IDENTIFYING GRAPHIC INTERCHANGE FORMATS FOR INCLUDING WITH CONTENT OF A VIDEO GAME," the disclosure of which is incorporated herein by reference in its entirety for all purposes.

FIELD OF THE DISCLOSURE

The present disclosure relates generally to representing emotions of spectators of a video game, and more particularly to methods and systems for presenting reaction tracks in accordance to the emotions detected from different groups of spectators of a video game.

BACKGROUND

Description of the Related Art

The video game industry has seen many changes over the years. In particular, online gaming and live-streaming events such as E-sports have seen a tremendous growth in terms of the number of live events, viewership, and revenue. Consequently, as online gaming and live-streaming events continue to grow in popularity, the number of spectators accessing the online gaming (i.e., gameplay) for viewing continues to grow. Due to the distributed nature of the video game, the spectators are not restricted to congregating at one or more geographic locations to access and view the online gaming. The spectators are able to view the gameplay from anywhere, including their own living rooms.

Consequently, the video game industry is trying to improve and develop unique ways to access and view gameplay of the video game so as to enhance the experience of spectators and others (e.g., players, commentators, etc.) viewing the online gaming content. For example, in order to provide a truly immersive game viewing experience, the spectators are provided with different tools (e.g., user interfaces, recording tools, etc.) to express their emotions and share with other spectators and/or players. For instance, a spectator viewing the online gaming content may be provided with interactive user interfaces (i.e., interactive tools), such as chat interface, message boards, video/audio content uploading tools, etc., to comment on the online gaming and to communicate with other users. These interactive interfaces/tools allow the spectator to provide audio comments, video comments, textual comments, etc., share memes, graphic interchange format images (GIFs), emojis, etc.

Although the various tools and interfaces provide the spectator with some level of involvement, the spectator is unable to truly gauge the various vibes expressed by different spectators and the number of spectators that express each vibe. With reference to E-Sports where the sheer volume of spectators accessing and viewing the gameplay of the online game may run in the thousands or even millions, (depending on the popularity of the video game, players, video game, etc.), the number of comments shared by the spectators can also run in the thousands or millions. In order for the spectator to get a feel for the various vibes detected from different spectators in the audience watching the video game, the spectator will have to analyze each and every comment provided by the different spectators of the audience. Analyzing each and every comment can be overwhelming due to the sheer volume, especially when comments are being generated in real-time during live streaming of the video game. For a spectator, associating themselves with like-minded spectators would make them enjoy the online gaming (i.e., gameplay) as though they are hanging out with their friends and viewing the gameplay. The lack of visibility of the emotions of the other spectators watching the gameplay results in the spectator not being able to fully immerse and enjoy the gameplay of the video game.

It is in this context that implementations of the disclosure arise.

SUMMARY

Implementations of the present disclosure include methods and systems relating to aggregating the interactions of the spectators viewing the online gaming of the video game, and rendering expressive avatars over an image representation of an audience of the video game, wherein the audience comprises of a plurality of spectators that have accessed the video game for watching gameplay. The various expressive avatars represent the emotions of the crowd of spectators that are part of the audience. The expressive avatars are identified by collecting the interaction data from the spectators as the spectators are watching the gameplay of the video game, in real-time. The interaction data collected from different spectators may include video of the spectators as they are watching the gameplay of the video game, the audio generated by the spectators, the text, Graphic Interchange Format images/files (GIFs), memes, emojis, etc., posted in a chat interface, social media interface, etc. The interaction data collected from different spectators are aggregated and sentiment analysis is performed on the aggregated data to identify salient emotions and ideas communicated by the spectators. As large number of spectators may be accessing the video game to view the gameplay, it is practically infeasible to process and express each individual spectator's emotions. Aggregating the interaction data allows consideration of each individual spectator's emotions in order to determine the different vibes expressed in the audience. The data from the sentiment analysis is used to determine the different vibes (i.e., emotions and reactions) expressed by the spectators in the audience.

The vibes detected from different spectators in the audience are sorted and spectators expressing the same or similar type of vibes are grouped together to define vibe cliques. The data related to the vibe cliques are used to generate expressive avatars, which are then forwarded to the client device of each spectator for rendering. The expressive avatar representing each vibe clique is configured to be overlaid over a corresponding section of an image representation of the audience rendered on client devices of the spectators. The avatars included in the image representation of the audience identify the different dominating vibes detected from the different spectators in the audience. A size of each expressive avatar is scaled to correspond with a size of the respective vibe clique. The larger the avatar of a particular vibe clique is, the more dominating the corresponding emotion associated with the avatar is over the other emotions identified in the audience (i.e., a level of dominance of the vibe detected from the respective avatars over other vibes).

The interactions provided by the spectators may be in response to various activities occurring in the gameplay of the video game or in response to other spectators' comment/interactions. The interactions may be in the form of audio comments, text comments, or chat comments provided via chat interface. Additionally or alternatively, the interactions of the spectators may be in video format. For instance, spectators expressions to the activities occurring within the video game or to interactions of other spectators may be captured using one or more cameras that are integrated within or are communicatively coupled to the client devices of the spectators and forwarded to the game cloud server. The game cloud server processes the images capturing the expressions of the spectators to determine the emotions expressed by the spectators.

The various interactions of the spectators are aggregated and a sentiment analysis is performed on the interaction data to identify salient emotions and ideas communicated by spectators. A word cloud is generated and dynamically updated with keywords identified from textual and audio content included in the interaction data, wherein the keywords that are updated to the word cloud capture the salient emotions and ideas expressing the emotional state of the audience. Machine learning algorithm is used to identify the keywords that express the salient emotions and ideas of spectators included in the interaction data as well as to analyze the facial features from the images of spectators captured in the video content. The machine learning algorithm is used to identify the various modal data streams included in the interaction data. The identified modal data streams are then processed using unimodal or multimodal approach to identify the emotions and reactions of the spectators. Various vibe cliques are identified by clustering the spectators expressing similar vibes (i.e., emotions) identified from the keywords. The clustering of the spectators may be further refined or conditioned based on the age, demographics, and other user attributes of the spectators. The user attributes may be obtained from the user profile maintained at the game cloud system.

Expressive avatars representing the different vibes (i.e., emotions) are generated for the different vibe cliques. The avatars are generated to include different characteristics to provide visual representation of the dominance of each emotion in the audience (i.e., crowd). Some characteristics include size to define the level of dominance of each emotion amongst the audience of spectators, color to reflect the spectators emotions, such as temperature and intensity of hue to invoke group psychology. The color for representing the different emotions may be selected by referring to brand color psychology publications/literature available to the system when generating the avatars. One example reference can be found at http://en.wikipedia.org/wiki/Color_psychology. Using machine learning, the emotions of a large number of spectators are recognized, aggregated and represented in a scalable manner to provide the spectator with a visual representation of the different emotions of the audience and the number of spectators in the audience expressing the different emotions. The avatars expressing the various emotions are provided for rendering over an image representation of the audience of spectators provided alongside the content of the video game from the online gaming session. One advantage is that the avatars provide a way for the spectators to visually gauge the distribution of reactions of the massively large group of gaming spectators quickly (i.e., almost in real-time) and allow a gaming spectator to compare how the spectator's own reaction compares with a peer group of spectators. Another advantage is that the spectator can quickly identify and associate themselves with like-minded spectators in order to fully enjoy the gameplay of the video game from any location. Yet another advantage is that the avatars allow a player of the online video game to gauge feedback to specific gameplays.

In addition to providing avatars expressing the various emotions, the emotions of the spectators may be used to identify reaction tracks to include with the avatar presented to the spectators during live viewing or delayed viewing of a gameplay of the video game. The reaction tracks are used to express the emotions of the spectators in the audience. For example, one of the reaction tracks that may be identified is a laugh track (also referred to as laughter tracks). The laugh tracks are provided to express happiness emotion. In addition to providing laugh tracks to express happiness emotion, the reaction tracks may also be used to express other emotions, such as sad, surprise, angry, neutral, etc. Appropriate reaction tracks are identified based on the emotions expressed by the different avatars in each vibe clique identified in the audience of spectators viewing the video game. In some implementations, the reaction tracks are audio tracks that capture the vibe of the spectators.

In one embodiment, a method for representing emotions of an audience of spectators viewing online gaming of a video game, is disclosed. The method includes aggregating interaction data collected from spectators in an audience engaged in watching gameplay of the video game. The aggregation includes clustering the spectators into different groups based on emotions detected from the spectators in the audience, such that each group of spectators is associated with a distinct emotion identified from the interaction data. A reaction track is identified to correspond with the distinct emotion associated with each group. The reaction track of each group is presented alongside content of the video game that is being viewed by the spectators.

In one implementation, a confidence score of each group of spectators is determined based on a number of spectators in each group. A volume of the reaction track of each group is scaled based on the confidence score of the respective group.

In one implementation, changes in the emotions expressed by spectators of each group is detected over time and the reaction track for each group is dynamically identified to correspond with changes in the emotion detected in the respective group, wherein the changes are detected to correlate with changes occurring in the content of the video game.

In one implementation, the reaction track of each group is presented to all the spectators engaged in watching the video game.

In one implementation, the reaction track of each group of spectators is presented to the spectators of the respective group, such that the reaction track presented to a first group of spectators is different from the reaction track presented to a second group of spectators.

In one implementation, the reaction track of a specific group of spectators is presented to all the spectators watching the video game, wherein the specific group is chosen based on a confidence score of each group. The confidence score of each group is indicative of number of spectators in the respective group.

In one implementation, sentiment analysis of the interaction data is performed to identify keywords that correspond with emotions and a word cloud is generated and dynamically updated with the keywords. The keywords in the word cloud capture an emotional state of the spectators at any given point in time.

In one implementation, the reaction track for a specific group of spectators is identified by grouping the keywords in the word cloud in accordance to the emotions defined by the keywords, such that each group of keywords corresponds to a particular emotion. Select group of keywords representing the emotion of the specific group is used to identify the reaction track for the specific group.

In one implementation, the affiliation of the spectators to particular players or particular team of players of the video game is identified from social graph of the spectators or players. A word cloud is generated and updated from the keywords in the interaction data. The keywords correspond to the emotions of the spectators responding to gameplay of the particular player or particular team of players in the video game. The keywords are grouped into groups in accordance to the affiliations of the spectators, wherein each group of keywords corresponds to a particular emotion. Select group of keywords representing the emotion of a specific group is used to identify the reaction track for the specific group.

In one implementation, the reaction track for each group is identified using artificial intelligence model.

In one implementation, a request is received from a spectator of a first group. The request is to affiliate the spectator to a second group instead of the first group. Responsive to the request, the spectator is disassociated from the first group and associated with the second group. The association of the spectator to the second group results in a change in the number of spectators in the first and the second groups, and provides the spectator with access to the interaction data of the second group.

In one implementation, an avatar is generated and associated with each group of spectators. Expressions of the avatar of each group are dynamically adjusted in accordance to changes detected in the corresponding emotion expressed by the spectators of each group. The changes in the emotions expressed by the spectators correspond to events occurring in the video game. The avatar of each group is presented with the reaction track alongside content of the video game.

In some implementations, a generic avatar is generated for a group of spectators using artificial intelligence model. The generic avatar is associated with the group. The association allows access to the interaction data generated by the spectators of the group. The interaction data is used to determine dynamics of the emotion expressed by the spectators of the group, wherein the emotion changes with changes detected in the video game. The expression of the generic avatar is dynamically adjusted and appropriate reaction track is identified to correspond with changes detected in the emotion of the group. The avatar with the adjusted expression and the reaction track is forwarded to client devices of the spectators for rendering.

In some implementations, the avatar and reaction track of two opposing groups is presented simultaneously to the spectators alongside content of the video game. The avatars and the reaction tracks of the two opposing groups of spectators providing contrasting reactions to an event occurring within the video game.

In one implementation, a spectator is selected from within a specific group of spectators associated with a particular emotion so as to provide reaction highlights for the particular emotion. The spectator is selected based on the emotions expressed by the spectator. A video is presented of the spectator expressing the emotion of the group during a key game moment related to an event occurring in the video game. The video presented along with the reaction track of the specific group.

In one implementation, the spectator for the specific group is selected randomly, or is selected via predictive analysis of prior expressions of the spectator in the specific group captured while the spectator was viewing gameplay of the video game.

In one implementation, a graphic interchange format image (GIF) is identified to provide reaction highlights for a particular emotion associated with a specific group. The GIF is identified using keywords associated with the emotions of the specific group. The identified GIF is presented for providing the reaction highlights during a key game moment related to an event occurring in the video game. The GIF expressing the reaction highlights of the emotion expressed by the spectators of the specific group.

In another embodiment, a method for representing emotions of an audience of spectators viewing online gaming of a video game, is disclosed. The method includes capturing interaction data from spectators in the audience engaged in watching gameplay of the video game. The interaction data captured from spectators is aggregated. The aggregation includes clustering the spectators in the audience into different groups in accordance to emotions detected from the spectators in the audience. Each group of spectators is associated with a distinct emotion identified from the interaction data and a confidence score is computed for the different groups. The confidence score is determined for each group of spectators based on a number of spectators in each group expressing the distinct emotion associated with the group. A reaction track is identified to correspond with the distinct emotion associated with a specific group of spectators identified in the audience, wherein the specific group of spectators is identified based on the confidence score of each group. The reaction track of the specific group of spectators is presented to the spectators of each group alongside the content of the video game that is being viewed by the spectators.

In one implementation, the specific group of spectators is identified to have the highest confidence score in the audience, and a volume of the reaction track of the specific group is adjusted in accordance to the confidence score of the specific group.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
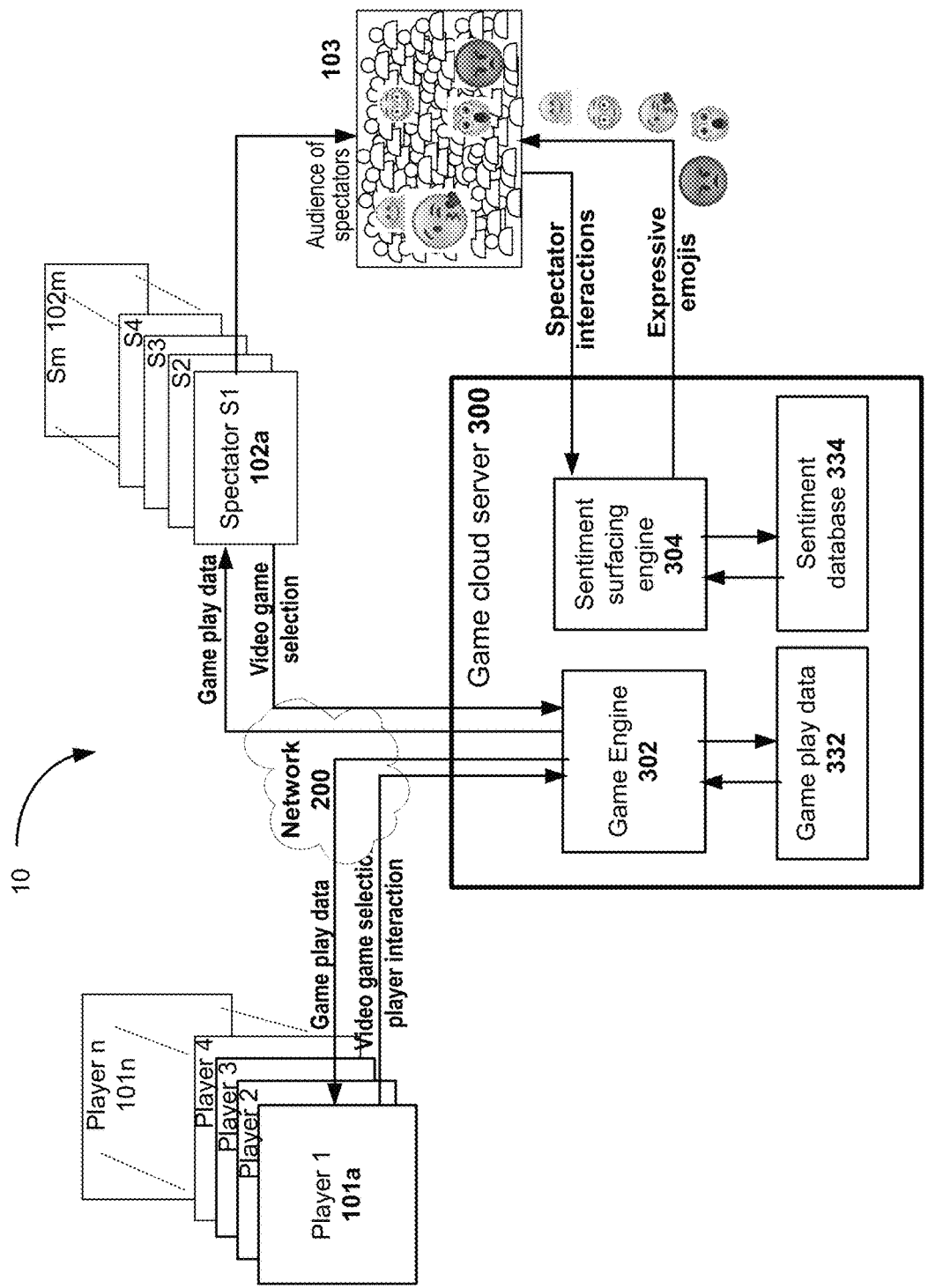
FIG. 1 illustrates a simplified block diagram of a system configured to execute a gameplay of a video game for a plurality of players and to identify and present avatars representing emotions detected from different groups of spectators viewing gameplay of the video game, in accordance with an implementation of the disclosure.

The following implementations of the present disclosure describe methods and systems for generating and displaying expressive avatars of an audience of spectators viewing online gaming of a video game alongside content of the video game. The expressions of the avatars represent different emotions detected from spectators of the audience viewing the online gaming (i.e., gameplay) of the video game, enabling the spectators to gauge the distribution of different vibes of a massive group of spectators in the audience quickly. The avatars also allow each gaming spectator to identify a peer group that they can associate with by comparing their own reactions with the reactions of the different groups of spectators in the audience. The association allows the spectator to "hang out" with other spectators expressing similar emotions (i.e., vibes), making it feel that the spectator is hanging out with their friends or family that have come together in a living room or a common place or a stadium to watch the game. The disclosure allows the spectators to feel the emotions of the audience and associate with the spectators that feel the emotions that the spectator feels, thereby allowing the spectator to have a more enriching game viewing experience via digital spectating.

One of the main disadvantages of conventional digital spectating for a spectator is the lack of presence of other spectators to share the game viewing experience. The online video game (e.g., E-Sports) allows the spectators to view the online gaming (i.e., gameplay) of a video game from anywhere and be part of a spectating audience. The spectators connect to the online video game to spectate the gameplay, from their living room, dorm room, or any other favorite hangouts. However, for the spectator viewing the gameplay, the online spectating lacks the connection with other spectators that are usually present for live games played in stadiums, for example. This disadvantage can be overcome by inviting other spectators to a venue (e.g., sports bar) for watching the online gaming Bringing other spectators together requires planning, which is time consuming and requires the other spectators to be free for the time period, have the ability to travel to the venue, and be willing to travel to the venue. Even when the spectators congregate in a venue of choice, the spectators that are usually gathered in the venue may all be expressing the same emotions as those expressed by the spectator that arranged the gathering. The spectators at the venue may not have the full visibility of the various emotions detected from the spectators in the audience as the spectators that have gathered in a stadium to watch a live game of a sport.

In order to mitigate the inconvenience and overcome the disadvantage of the conventional online spectating, the various embodiments described herein provide ways for visually presenting (i.e., rendering) the emotions of different spectators viewing the online gaming of the video game from different geographical locations. The emotions of massive audience of spectators, especially for E-sports that are very popular, are conveyed using expressive avatars. The avatars allow a first spectator to gauge the distribution of reactions of the massively large group of gaming spectators quickly (i.e., in almost real-time) and compare their reactions with that expressed by a peer group. The avatars also allow a player of an online game to gauge feedback to specific gameplays. To provide the expressive avatars, a sentiment surfacing engine is engaged to perform the various steps. Some of the steps include information collection step or phase, information aggregation step or phase, and the illustration step or phase.

As used in this application, a spectator is an individual (i.e., a person or a user) who has assembled to watch an online event, a show, a game, an activity, etc., wherein the focus is on what they see and/or what they hear. An audience refers to a group or a collection of spectators that have assembled to watch the online event (either public or private event), such as a play, a movie, a concert, a meeting, a game, etc. In the various implementations discussed in this application, the spectator is part of an audience who has gathered to listen to and/or watch gameplay of a video game. The spectator could be engaged in listening to commentary of gameplay of the video game, or be engaged in watching gameplay of the video game, or engaged in both listening to and watching gameplay of the video game. Throughout this application, emotions and sentiments may be used interchangeably to refer to behavior of a person (e.g., spectator) that is communicated either through their interactions or through their expressions. The interactions are generally via speech (i.e., verbal) or writing (e.g., text or graphic content including text comments, graphic interchange format images/files, memes, emojis, graphic content, etc.). The expressions are generally provided using facial features.

In the information collection phase, live information from spectators is collected while the spectators are watching the gameplay of a video game. The live information may include live video of spectators as they are watching the game, live audio as they are communicating with the players and/or with other spectators, text or chat comments or emojis or memes or Graphic Interchange format images or files (GIFs) posted on an interactive interface, such as a chat interface, message board, etc. The information gathered from each spectator is based on the voluntary sharing opted by the respective spectator. For instance, each spectator may be provided with sharing options at a user interface presented alongside the content of the video game, wherein the sharing options identify specific ones of the interaction data generated by the spectator that the spectator is allowing the system to collect and use for determining emotions of the spectator. For instance, the spectator may generate audio data, text data, chat data, etc., and the spectator may generate reactions to events or actions occurring in the video game. The spectator may allow the system to collect only chat data or only text data or only audio data or only reactions or any combinations thereof. Alternatively, the spectator may allow the system to collect any one or combination of the interaction data that the spectator generates or expresses for a specific portion of the video game or for specific session of the video game. The type and amount of live information collected from each spectator is based on the sharing option selected by the spectator.

The information collected in the information collection phase is aggregated and analyzed in real time. For instance, the live video feeds capturing faces of spectators are used to perform real-time emotion recognition. Machine learning algorithm may be used to identify the various modal data streams included in the live information and process the modal data streams to identify various emotions. For instance, the machine learning algorithm may be used to identify emotions expressed by the spectators from the facial features captured in the live feed. Similarly, audio and text comments undergo sentiment analysis to identify the salient emotions and ideas communicated by spectators, memes, GIFs, and emojis are similarly analyzed using machine learning to identify the emotions expressed by the spectators. The results of the analysis of modal data streams, such as text data, audio data, chat data, etc., are used to create and update a dynamic word cloud with keywords that correspond to different emotions. The resulting word cloud captures the emotional state of the audience at different points of time. The machine learning algorithm is further engaged to cluster the spectators and identify the vibe cliques in the audience by identifying and grouping spectators that express similar vibes. The vibe cliques assist the players and spectators to feel the energy of the spectators of the audience and to relate to specific ones of the vibe cliques more strongly over other vibe cliques.

The results of the analysis are used to visualize the emotions of each vibe clique and to generate expressive avatars to represent the emotions of each vibe clique. Various characteristics of the avatar of each vibe clique is dynamically adjusted to change in color, size and expressions to reflect the current emotion of the respective vibe clique. In some implementation, expressions included in certain ones of the avatars are highlighted to provide reaction highlights. In alternate implementation, reactions of select one(s) of spectators in each vibe clique or from a very specific vibe clique may be included as reaction highlights along with the expressive avatars of the different vibe cliques. The expressive avatars, and in some cases, the reaction highlights of select ones of the spectators are rendered alongside or overlaid over the content of the video game rendered at each client device of the spectators.

The sentiment surfacing engine 304 is configured to represent wide variants of emotions (i.e., emotional states) experienced by the audience. The avatars are scaled to visualize a level of dominance the corresponding emotions have in the audience, with more dominant emotions rendered larger than less dominant emotions. The sentiment surfacing engine 304, using machine learning, is able to recognize the emotions of a large number of spectators distributed over a wide geography in a scalable manner and provide aggregate feedback to the spectators in substantial real-time.

With the above overview in mind, specific implementations will be described with reference to several example figures to facilitate understanding of the example embodiments. It will be obvious, however, to one skilled in the art that the present disclosure may be practiced without some or all of the specific details presently described. In other instances, well known process operations have not been described in detail in order not to unnecessarily obscure the present disclosure.

FIG. 1 illustrates an embodiment of an overall game cloud system 10 configured to execute one or more instances of video game for gameplay by a plurality of players 101 and to process player interaction and spectator interactions generated during gameplay. The players 101a through 101n access instances of the game from a plurality of client devices. Selection of video game and request for gameplay of the video game are forwarded from the client devices of players 101 over a network 200 (such as Internet) to a game cloud server 300. A game engine 302 on the game cloud server 300 validates the players using user account information stored in a user account database (not shown) and, upon successful validation, instantiates one or more instances of the video game on one or more game cloud servers 300. The game engine 302 may be a distributed game engine that executes the video game on one or more game cloud servers 300 located within one or more data centers (not shown) located in one geo location or distributed across multiple geo locations. A plurality of spectators 102a-102m may access the gameplay of the video game executing on one or more game cloud servers 300 to view the online gaming of the video game. Access to the spectators 102a-102m may be restricted or open. If the access is restricted, the spectators 102a-102m are validated prior to providing the spectators 102a-102m access to the gameplay of the video game. The various instances of the game executing on different game cloud servers 300 in one or more data centers work together to provide wide access to players 101a-101n and the spectators 102a-102m in a distributed and seamless fashion.

The video game may be a multiplayer online game where the players 101a-101n may be individual players or may be part of different teams that are competing against one another. In some embodiments, the video game may include two teams that are opposing one another and the players 101a-101n may be part of one of two teams. In alternate embodiments, the video game may include more than two teams and the players 101a-101n may be part of any one of the plurality of teams. Player interactions in the video game are forwarded to the game engine 302 to affect game state of the game. In response to the player interactions, updated gameplay data is returned to the client devices of the players 101a-101n. The gameplay data is also maintained in a gameplay datastore 332 for later retrieval. It is to be noted that the gameplay data stored in the gameplay datastore 332 is data from the live gameplay and may be retrieved when the video game is selected for replay by other spectators. The game engine encodes the gameplay data and forwards the gameplay data as encoded video streams to the client devices of the players 101a-101n. The client devices of the players 101a-101n are configured to receive the encoded video streams, decode the video streams and render frames of gameplay content on a display screen associated with the respective client devices. The display screen may be part of the client device (e.g., screen of a mobile device) or may be associated with the client device (e.g., monitor or television or other rendering surface). In some implementations, the client device of the players 101a-101n may be any connected device having a screen and internet connection.

In some implementations, during gameplay, the spectators 102a-102m may select the video game for viewing the gameplay of the video game played by the players 101a-101n. Requests from the spectators 102a-102m are communicated via their respective client devices to the game cloud server 300 through the network 200. In response to the request from the spectators 102a-102m, the gameplay data depicting current game state of the video game is forwarded by the game server 300 (i.e., game cloud server 300) to the respective client devices of the spectators 102a-102m as encoded video streams. The client devices of the spectators 102a-102m receive the encoded video stream, decode the video stream and render the frames of gameplay data on display screen associated with the respective client devices. The client devices of the spectators 102a-102m may be any computing device, such as a head mounted display (HMD), mobile or portable computing device, desktop computing device, etc., and the display device may be a display screen associated with the HMD or other mobile/portable computing device (e.g., screen of a mobile phone, tablet computing device, etc.), or may be separate display devices or display surfaces, such as monitor, television, display screen, etc., communicatively connected to the client devices of the spectators 102a-102m The spectators 102a-102m constitute an audience 103 that are viewing and/or listening to the gameplay of the video game played by the plurality of players 101a-101n.

The spectators 102a-102m may provide interactions related to the video game rendering on the client devices of the players 101a-101n and spectators 102a-102m. The interactions may be provided in the form of texts or emojis or memes or GIFs on a user interface, such as chat interface, message board, social media interface, etc., rendered alongside the content of the video game. The interactions may also be provided in the form of audio comments captured by a microphone or other audio capturing devices included in or associated with the client devices of the spectators 102a-102m. The interactions from the spectators 102a-102m may also be in the form of expressions of the spectators watching the gameplay that can be captured as live video using one or more video cameras that are integrated within the client device of the spectators 102a-102m (e.g., head mounted displays, smart eye glasses, mobile devices, etc.) or from external cameras that are communicatively connected to the client devices of the spectators 102a-102m. The interactions of the spectators in the audience 103 are forwarded to the game cloud server 300.

A sentiment surfacing engine 304 collects the interactions of the spectators 102a-102m in the audience 103, analyzes the interactions to identify emotions expressed by the different spectators 102a-102m, group the spectators 102a-102m in the audience 103 in accordance to the expressed emotions, generate an avatar to represent each group of spectators, and adjust expressions of each generated avatar to match the emotions detected from the respective group of spectators. The expressive avatars, such as expressive emojis, are forwarded to the client devices of the spectators 102a-102m for overlaying over a representative image of the audience 103 of spectators 102a-102m rendered alongside content of the video game at the respective client devices of the spectators 102a-102m. The rendered expressive avatars provide the spectators with a visual representation of the different emotions detected of the spectators viewing the gameplay of the video game.

Figure 2:
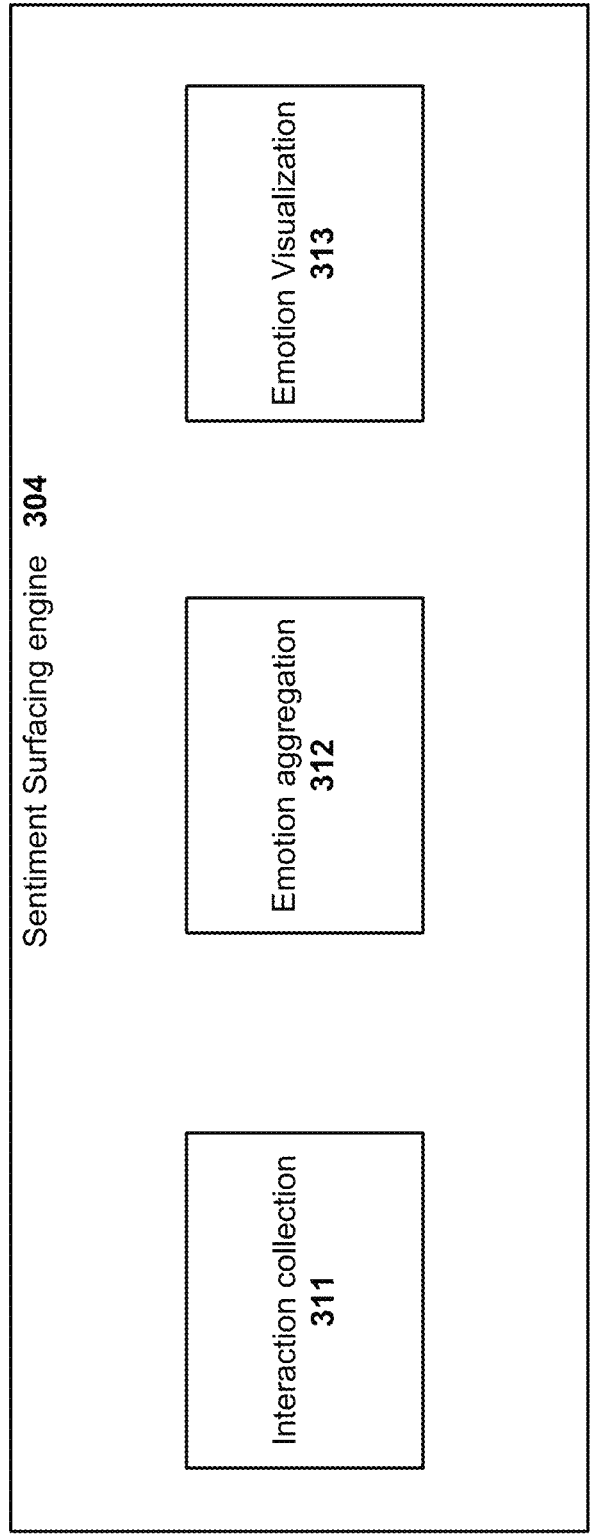
FIG. 2 illustrates a simplified overview of different phases of sentiment surfacing engine used for processing interaction data to identify and present avatars representing emotions expressed by different spectators within an audience of spectators viewing gameplay of the video game, in accordance with an implementation of the disclosure.

FIG. 2 illustrates a broad overview of the various interaction processing phases of the sentiment surfacing engine 304 used for processing interactions and generating representative avatars for groups of spectators 102 that are part of an audience 103 watching gameplay of a video game, in accordance with one implementation. The sentiment surfacing engine 304 engages a machine learning algorithm to perform the various processing phases to identify emotions from interaction data of the spectators and illustrate the emotions in the form of avatars. The processing phases followed by the sentiment surfacing engine 304 may be broadly classified into three main phases. The three main phases include an interaction collection phase performed by an interaction collection engine 311, an emotion aggregation phase performed by an emotion aggregation engine 312 and an emotion visualization phase performed by an emotion visualization engine 313. The emotion aggregation phase encompasses emotion detection and spectator clustering in accordance to detected emotions.

Figure 3:
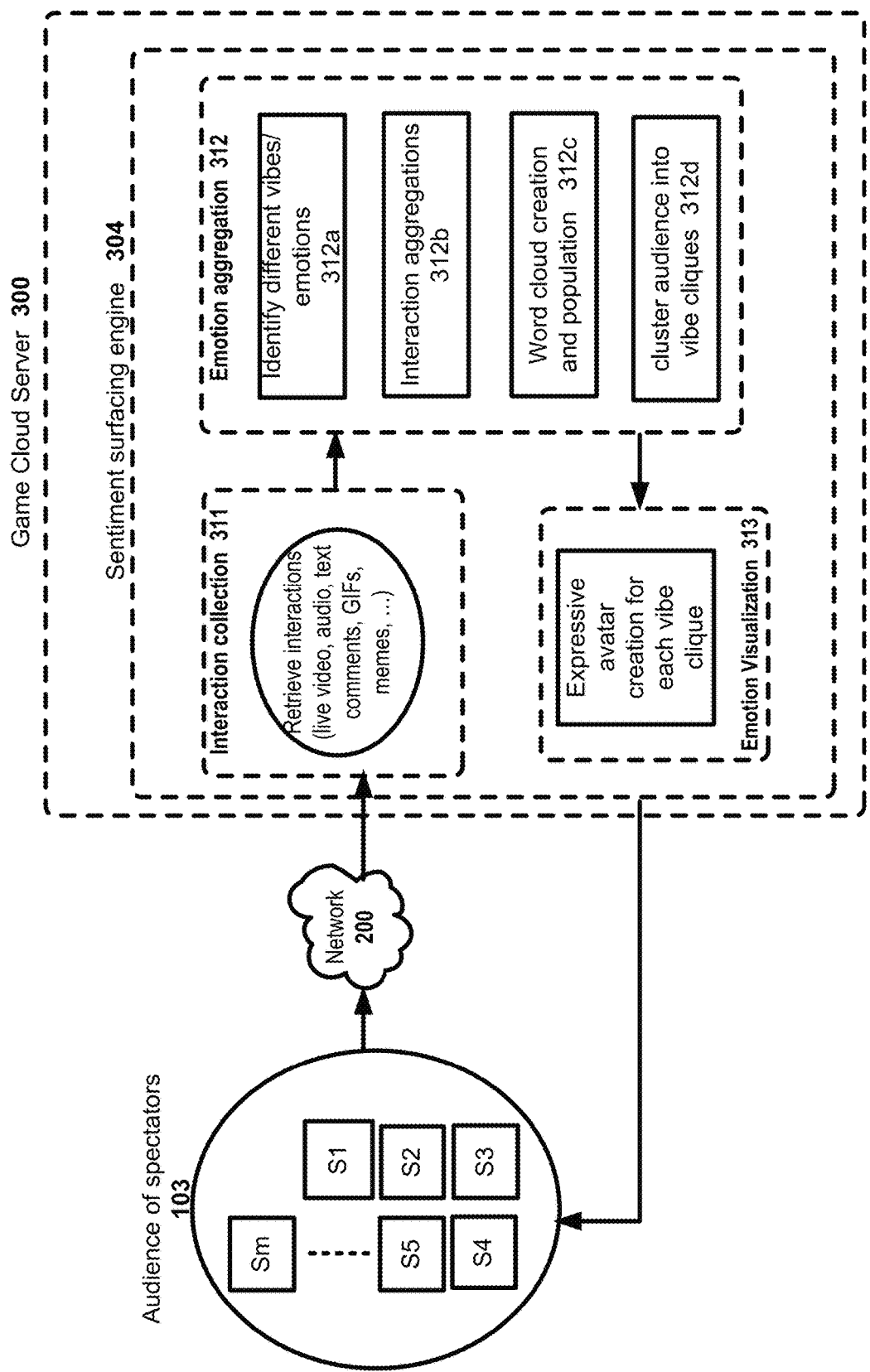
FIG. 3 illustrates a block diagram of a sentiment surfacing engine used to identify emotions detected from different spectators and present a visual representation of emotions detected from the different spectators, in accordance with an implementation of the disclosure.

FIG. 3 identifies sample set of operations performed in each phase by the sentiment surfacing engine 304, in one implementation. Referring simultaneously to FIGS. 2 and 3, the interactions of spectators 102 are captured at the respective client devices of the plurality of spectators 102 of the video game and forwarded as interaction data to the game cloud server 300 through the network 200. A sentiment surfacing engine 304 executing on the game cloud server 300 and operatively connected to the game engine collects the interaction data of the spectators, processes the interaction data, and generates the expressive avatars.

The sentiment surfacing engine 304 begins the processing of the interaction data collected from the spectators starting with the interaction collection phase. In the interaction collection phase, the interaction collection engine 311 collects the various interactions generated by the spectators 102 in real time while the spectators are watching the gameplay of the video game. The interactions may be in the form of reactions from the spectators in response to events or actions or activities occurring in the video game based on inputs provided by one or more players. Alternatively, the reactions from the spectators may be in response to interactions provided by other spectators or players of the video game. The interactions are sorted based on the type. The different types of interactions that may be collected include live video capturing at least facial features of the spectators, audio content from the spectators' verbal interactions provided in response to actions/activities within the video game or as part of interactions with other spectators or players, text or graphical (e.g., memes, GIFs, emojis, etc.) content, etc. The sorted interactions are stored in sentiment database 334 and provided as input to the emotion aggregation engine 312 as part of the emotion aggregation phase.

The live video of a spectator may be captured using various image capturing devices, such as image sensors, video cameras, still cameras, digital cameras, stereoscopic cameras, etc., integrated within or communicatively coupled to the client devices of the spectators. The live video of a spectator is used to identify the facial features from which potential expressions of the spectator may be deduced. Similarly, audio content may be captured using microphones or other audio capturing device of the client device or communicatively coupled to the client device of the spectators. The text or graphical content may be obtained from chat interface or message interface or social media interface rendered alongside the content of the video game. It should be understood that the interaction data is collected from the spectators based on options selected by the spectators for sharing certain ones of the modal content generated while watching the gameplay of the video game. For instance, a spectator may expressly select to share their chat content but not their video or audio content. As a result, in some implementations, a user interface (not shown) with selection options for sharing different modal content generated by the spectators may be provided for spectators' selection. The spectators may select to share none, one, some or all of the different modal content identified from interaction data by selecting the appropriate selection options. Based on the selection options selected by each spectator, the sentiment surfacing engine 304 gathers the corresponding modal data streams from the interaction data of the spectators for processing.

During the emotion aggregation phase the emotion aggregation engine 312 collects, in real time, the interactions of the spectators 102 while the spectators are watching the gameplay of the video game, and analyzes the interactions to recognize the emotions expressed by the spectators while watching the gameplay of the video game. The emotion aggregation engine 312 engages machine learning algorithm to identify the emotions (312a) detected from the interaction data collected from the spectators. The machine learning algorithm first determines the various modal data streams that are included in the interactions collected from the spectators. The machine learning algorithm then processes the modal data streams by either engaging unimodal or multimodal approach. For instance, the video feed of each spectator may be processed by the machine learning algorithm to identify facial features and perform real-time emotion recognition. Similarly, the audio content and text content may be processed by performing sentiment analysis to identify keywords that represent the salient emotions and ideas communicated by the spectators.

The machine learning algorithm then classifies the various emotions expressed by the spectators through interactions to identify the vibes. Emotions may be expressed by the spectators in varying degrees. For instance, spectators may express happy emotion in varying degrees including varying breadth of smile, using different keywords (e.g., happy, ecstatic, joy, pleased, awesome, etc.). The machine learning algorithm recognizes the varying degrees with which each emotion is expressed by the different spectators and classifies the various interactions accordingly into vibe buckets for each emotion. The varying degrees of emotion in each vibe bucket is then aggregated (312b). The machine learning algorithm engaged by the emotion aggregation engine 312 creates and dynamically updates 312c a word cloud using the keywords identified from the sentiment analysis of the textual and verbal interactions. The dynamic word cloud, at any given point in time of the video game, provides a visual, textual representation of the emotional state of the audience. Other graphic content, such as graphic interchange format files/images (GIFs), memes, emojis, etc., included in the interaction data from the spectators are processed by the machine learning algorithm in a manner similar to the processing of the video feed to identify the emotions expressed by the spectators. The emotions identified from the keywords in the word cloud, from the videos of the spectators, and from the graphic content (e.g., memes, GIFs, emojis, other graphic content) are used by the machine learning algorithm to identify the vibes in the audience (step 312c) and to group (i.e., cluster) the spectators in the audience expressing similar vibes into vibe cliques (step 312d).

In one implementation, once the initial vibe cliques are formed, the spectators remain as members of the respective vibe cliques until express request is received from the spectators to disassociate from the initial vibe clique. Consequently, when additional interactions are received from the spectators of a certain vibe clique, the additional interactions are processed by the different sub-components of the emotion aggregation engine 312 to identify additional emotions expressed by the spectators of the certain vibe clique. The additional emotions associated with the certain vibe clique are dynamically updated to reflect the current emotions of the respective group of spectators of the certain vibe clique. The additional interactions may be reactions in response to certain actions or activities occurring in the gameplay of the video game or may be reactions in response to certain interactions generated by players or spectators of the certain vibe clique or different vibe cliques. The grouping of the spectators with similar vibes allows the spectators in each group to associate with certain one of the players and align with other spectators expressing similar vibes. Similarly, the grouping allows the players to strongly jive with the energy of the associated group of spectators, which may be similar to having supporters for a live game played in a stadium. Data related to the vibe cliques are provided as input to the emotion visualization phase.

In the emotion visualization phase, an emotion visualization engine 313 generates an avatar for each vibe clique and adjusts the expressions of each of the avatars to reflect the emotions of each vibe clique. In addition to adjusting the expressions, the emotion visualization engine 313 adjusts one or more characteristics of the avatar, such as a size, color, etc., of the avatars to reflect the audience's emotions, wherein a larger sized avatar is used to represent a more dominant emotion and a smaller sized avatar is used to represent a less dominant emotion expressed by the spectators in the audience. In addition to generating avatars, the emotion visualization engine 313 also identifies an appropriate reaction track to associate with each vibe clique. The reaction track provides the sound of audience expressing the vibe associated with each vibe clique. For instance, the vibes may include happy, sad, surprise, angry, neutral, etc., and the reaction tracks associated with these vibes captured from live audience is identified for presentation with the representative avatar. In one implementation, the reaction tracks for various vibes may be stored in a reaction track datastore (not shown) within the game cloud server 300 or external to the game cloud server 300 and accessed by the sentiment surfacing engine 304 executing in the game cloud server 300. The reaction tracks stored in the reaction track datastore may include reaction tracks for different emotions and organized in accordance to context. For example, the reaction tracks may capture different emotions expressed for different events and for different context. The emotion visualization engine 313 identifies an appropriate reaction track for the emotion expressed in each vibe clique based on the context of the video game.

The adjusted avatars are returned to the respective client devices of the spectators 102 for rendering over an image representation of the audience 103 of spectators 102. The rendering of the expressive avatars provide the players 101 and the spectators 102 of the audience 103 a visual representation of a distribution of emotions (i.e., feelings) experienced by the audience 103 of the spectators 102. In some implementations, the avatars are in the form of emojis. Using machine learning, the sentiment surfacing engine 304 manages to recognize the emotions of a large number of spectators in a scalable manner and provides an aggregated feedback in real-time to allow the spectators in different groups to properly gauge the emotions of the crowd of spectators 102.

In addition to returning the avatars for the spectators associated with different vibe cliques, reaction tracks identified for the various emotions associated with the different vibe cliques are also forwarded to the client devices of the spectators for rendering with the avatars. The reaction tracks provide the spectators additional ways to feel the vibe of the audience. The avatars provide a visual representation of the vibes and the reaction tracks provide the aural representation of the vibes. The spectators can hear and feel the vibes of the audience making them believe they are in an arena or stadium watching the game with the crowd of spectators rather than in their living room watching the game alone.

Figure 4:
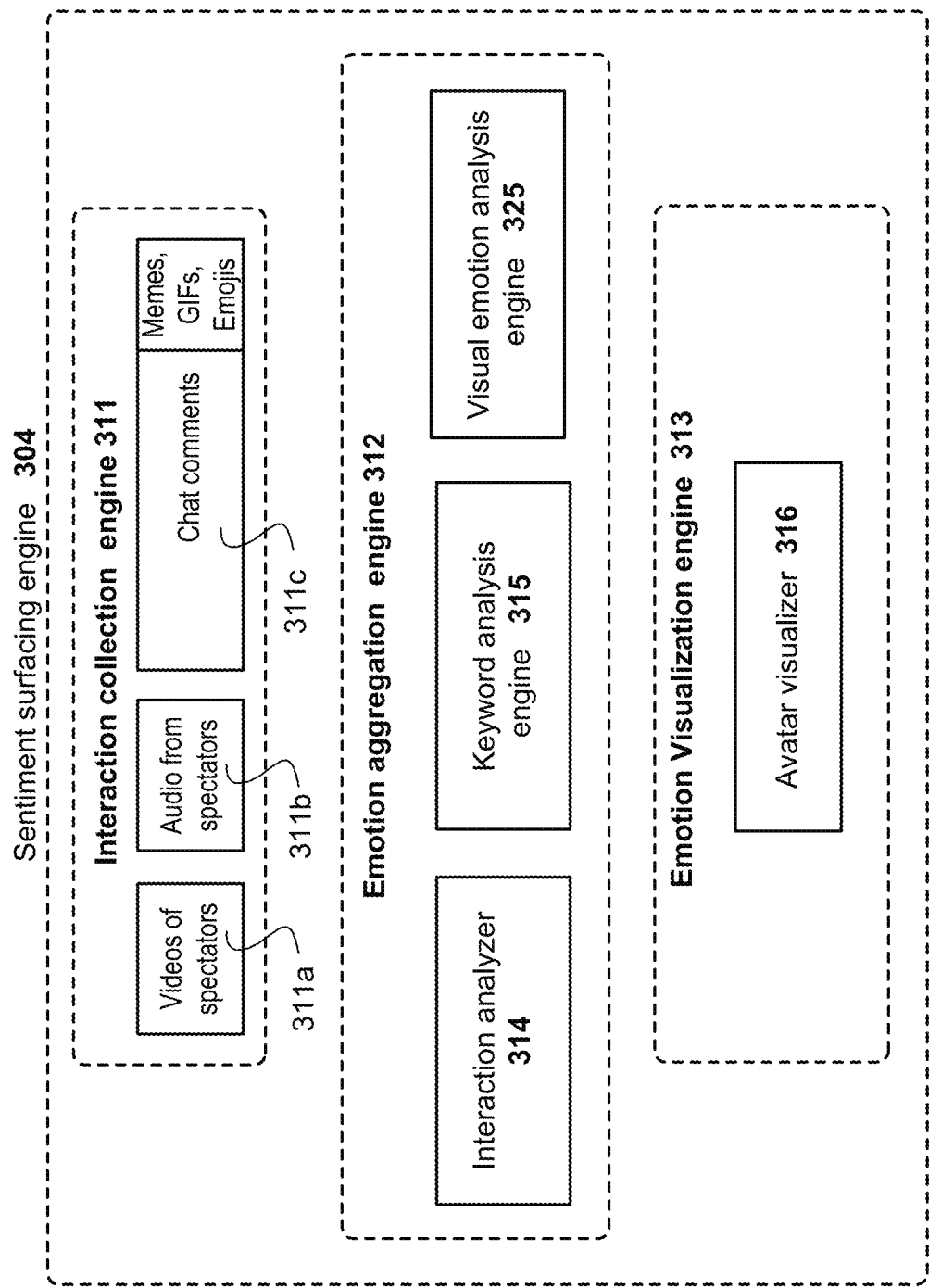
FIG. 4 illustrates a broad overview of the different components of the sentiment surfacing engine used during different phases of processing the interaction data to generate and present avatars representing the different emotions, in accordance with one implementation of the disclosure.

FIG. 4 illustrates some of the components of the sentiment surfacing engine 304, in one implementation. As mentioned previously with reference to FIGS. 2 and 3, the sentiment surfacing engine 304 includes an interaction collection engine 311, an emotion aggregation engine 312, and an emotion visualization engine 313. Some of the components may include additional sub-components. For example, the emotion aggregation engine 312 may include an interaction analyzer 314, a keyword analysis engine 315 and a visual emotion analysis engine 325. Similarly, the emotion visualization engine 313 may include an avatar visualizer 316.

The interaction collection engine 311 collects the interactions generated by the spectators 102 while the spectators are engaged in watching online gaming of the video game and processes them to identify the different modes (i.e., types) of interactions included therein. The different modes of interactions that may be identified by the interaction collection engine 311 can be broadly classified into live videos of spectators 311a that include both the audio and video component, audio of spectators 311b, and chat comments 311c. The live video of a spectator is captured using one or more image capturing devices as the spectator is watching the online gaming. The image capturing devices may include one or more of a video camera, a stereoscopic camera, a digital camera or any other image capturing device associated with or available at the client device of the spectators, wherein the client device may be portable computing device, such as a laptop computing device, a smart phone, a head mounted display, smart eyeglasses, a wearable computing device, a tablet computing device, etc., or a desktop computing device. The chat comments may include any and all types of content provided via a chat interface or message board or an interactive social media interface or any other interactive application interface. The chat comments may include text comments, videos or video clips, emojis, memes, GIFs, audio clips, etc., provided by spectators in response to events or activities or actions occurring during the gameplay of the video game or in response to interactions from other spectators or players.

The emotion aggregation engine 312 processes the interactions identified by the interaction collection engine 311 differently based on the modal type, in one implementation. For example, an interaction analyzer 314 within the emotion aggregation engine 312 is used to process the graphic content provided via chat interface to identify the emotions expressed via emojis, memes, GIFs and other graphic content. Probability score is computed for each of the emotions identified for the graphic content. The emotions and probability score for the graphic content is provided as input to the avatar visualizer 316.

The live video of the spectators may be partly processed by the interaction analyzer 314 and partly by a visual emotion analysis engine 325. For instance, the visual emotion analysis engine 325 is used to process images of spectators captured in the live video and the interaction analyzer 314 is used to process verbal content included in the live video. The visual emotion analysis engine 325 is used to analyze the images of the face to identify the facial features captured in the images to identify the emotions expressed by the spectators. The visual emotion analysis engine 325 may use machine learning algorithm to identify the attributes of the various facial features captured in the images and expression recognition neural network to identify the emotions expressed by the spectators. As the expressions provided by the spectators may correspond to more than one emotion (see FIG. 11), determining the most dominant emotion assists in clustering the spectators into appropriate vibe cliques. Consequently, the visual emotion analysis engine 325 computes a probability score (also referred to as "emotion probability score") 325a for each of the emotions identified from the attributes of the facial features. Based on the probability score 325a of each emotion identified from the expressions of the spectators, the most dominant emotion expressed by the spectator is identified. Upon identifying the emotions of each spectator, the spectators are clustered into vibe cliques, with each vibe clique corresponding to a distinct emotion. The details of spectators in each vibe clique and the emotions associated with each vibe clique are provided as input to the avatar visualizer 316.

The interaction analyzer 314 processes the audio content of the live video to identify keywords included therein. Similarly, text portion of the chat content is processed by the keyword analysis engine 315 to identify keywords and use the keywords to identify the emotions conveyed by the spectators via the text content. More details of the function of the interaction analyzer 314 will be described with reference to FIG. 5. Keywords identified from the analysis of the text and the audio content of the interactions by the interaction analyzer 314 are provided as input to a keyword analysis engine 315.

The keyword analysis engine 315 uses the keywords identified by the interaction analyzer 314 to populate a word cloud that is used to identify keywords that relate to emotions. The emotion related keywords in the word cloud are used to identify the different emotions expressed by the spectators in the audience. As more and more spectators begin to express certain ones of the emotions via interactions, the keyword analysis engine 315 computes a probability score for the keywords corresponding to those emotions higher in the word cloud. The various keywords of the word cloud along with the corresponding computed probability scores are provided as input to the emotion visualization engine 313. The emotions detected from the various interactions are used to cluster the spectators into vibe cliques, wherein each vibe clique corresponds to a distinct vibe or emotion. The clustering of the spectators may be further refined or conditioned based on the age, demographics, and other user attributes of the spectators. The user attributes may be obtained from the user profile maintained at the game cloud system. The vibe cliques identified for the different emotions are provided as inputs to the emotion visualization engine 313.

The emotion visualization engine 313 receives the various inputs from the emotion aggregation engine 312 and uses the input to create an avatar for each vibe clique. As part of creating the avatar to represent emotion of each vibe clique, the emotion visualization engine 313 computes a confidence score for each vibe clique as a number of spectators in the vibe clique that have expressed the dominant emotion or a comparable version of the dominant emotion. Based on the computed confidence score, an avatar visualizer 316 creates and scales avatars corresponding to the different vibe cliques identified in the audience. Adjusting the avatars includes adjusting at least the expressions, the size and the color of the avatars in accordance to the confidence score of the respective vibe cliques.

The size of each avatar is scaled to correlate with the confidence score so that an avatar with the highest confidence score will be rendered larger than an avatar with the lower confidence score. Similarly, the colors of the avatars may be adjusted to reflect a vibe rating of the emotions that are being expressed. For example, an angry emotion may be rendered in red while a happy emotion may be rendered in green. More details of the vibe rating will be discussed with reference to FIG. 12. In some implementations, the avatar visualizer 316 may selectively identify certain ones of the emotions for generating expressive avatars that are returned to the client devices of the spectators for rendering over an image representation of the audience. For instance, the number of emotions identified by the emotion visualization engine 313 may be too many and rendering the avatars for all the emotions identified in the audience may make the rendering on the display screen too crowded. So, to prevent such overcrowding of avatars while ensuring that the emotions of the spectators 102 in the audience 103 are appropriately represented, the avatar visualizer 316 may select a predefined number of emotions for representation using the avatars and generate the avatars accordingly. The emotions for representation may be selected based on their confidence scores associated with the corresponding vibe cliques. For example, the maximum number of avatars for presenting over the audience may be predefined to be 5. As a result, when more than 5 emotions are identified from the spectators of the audience, the avatar visualizer 316 may select the top 5 emotions (i.e., dominant emotions) with the highest confidence score (i.e., with higher level of dominance) for generating the avatars.

The expressive avatars are returned to the client devices of the spectators 102 for rendering over an image representation of the audience 103 presented alongside content of the video game. The expressive avatars provide a visual representation of the emotions that are dominating in the audience 103. Based on the visual representation of emotions, the spectators may be able to identify a group of spectators whose emotions they most align with for hanging out, making it appear as though they are together in a stadium watching a live event (e.g., game).

Figure 5:
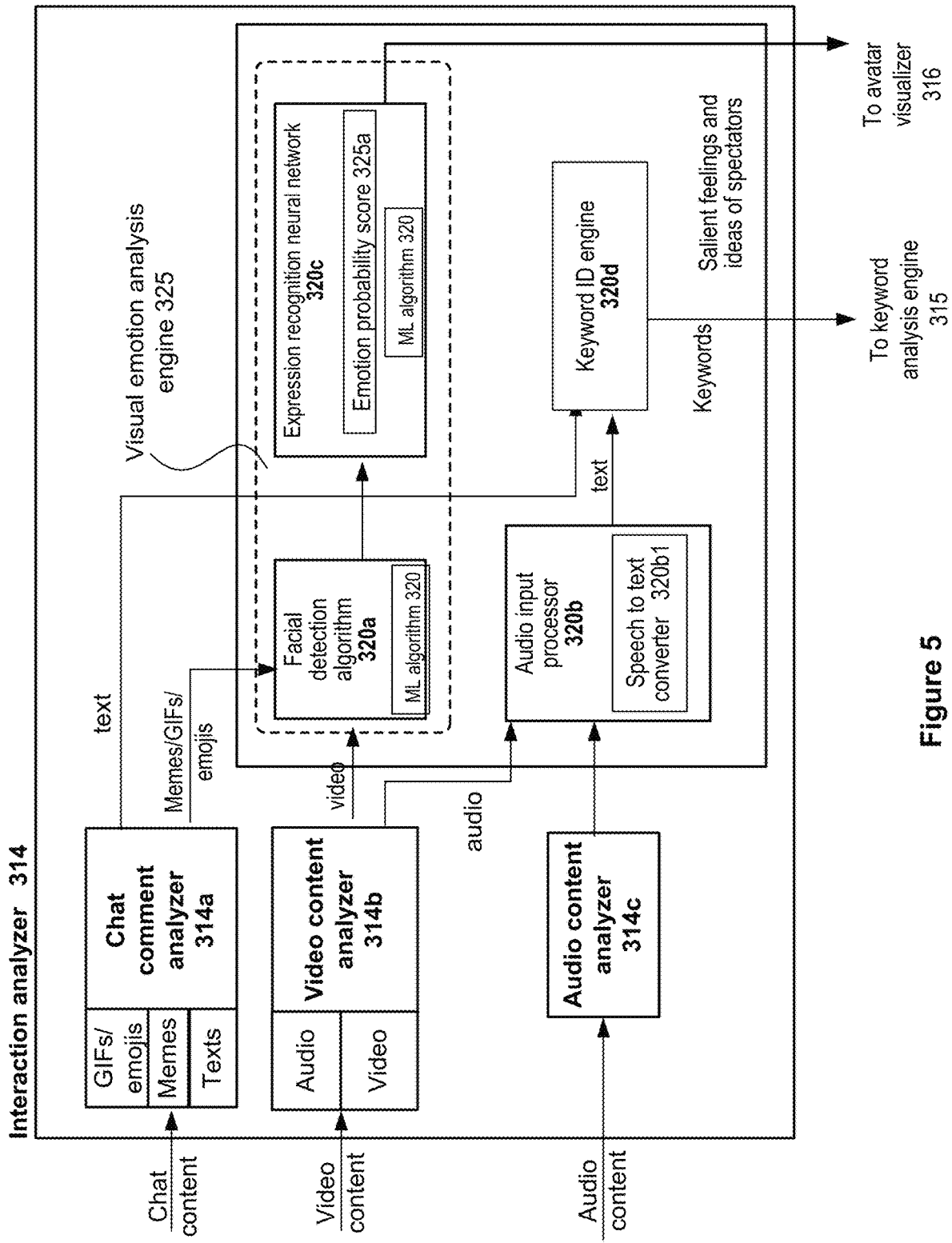
FIG. 5 illustrates an example interaction analyzer of the sentiment surfacing engine used to collect and analyze interaction data of the spectators viewing the online gaming of the video game, in accordance with one implementation of the disclosure.

FIG. 5 illustrates various components of an interaction analyzer 314 used to process the interaction data collected from the spectators' interactions during the online gaming of the video game, in one implementation. As earlier noted, the interaction data may include chat content, live video, live audio, etc. The chat content is obtained from the chat interface or instant message interface or social media interface, etc., through which the spectators and the players of the video game communicate with one another to express their thoughts and to provide comments. The interaction collection engine 311 collects the interactions of the spectators and forwards the interactions to the interaction analyzer 314. The interaction analyzer 314 analyzes the interactions to identify the different modes of data contained within the interactions. The various modalities correspond to the type of content included in the interactions. In implementations where live gameplay of the video game is being viewed, the interactions of the spectators are captured at the respective client devices during live gameplay and transmitted as data streams to the sentiment surfacing engine 304. These data streams may include different modes of data, such as live video data capturing expressions of the spectators, text data, audio data, graphic data, etc.

The interaction analyzer 314 receives and processes each one of the interactions (e.g., chat interactions, the live video and the audio content) in real time to identify the different modal data streams. The interaction analyzer 314 may include a plurality of sub-modules to process the different modal data streams identified from the interactions. In one implementation, the data streams pertaining to the chat content may be processed by a chat comment analyzer 314a, the data stream of live video content may be processed by a video content analyzer 314b, and the data stream of the audio content may be processed by an audio content analyzer 314c. Similar process of collecting interactions from the spectators and identifying and processing the different data streams is followed when a replay of the gameplay of the video game is watched by spectators at delayed time.

The chat comment may include texts, memes, emojis, GIFs, etc., provided by different spectators as part of their interaction with other spectators or players or as part of general comments related to the gameplay of video game or reactions related to spectators or players. The chat comment analyzer 314a identifies the different modal data that are included in the chat interactions and processes each modal data stream separately. For instance, the memes, GIFs, and emojis within the chat interactions may be extracted and provided as input to a facial detection algorithm 320a. The facial detection algorithm 320a engages machine learning algorithm 320 to identify the facial features and to crop the images included in the memes, GIFs, emojis, and other graphical content so as to include only the relevant facial features from the graphical content. The cropped images are provided as inputs to an expression recognition neural network 320c. The facial detection algorithm 320a and the expression recognition neural network 320c are part of the visual emotion analysis engine 325. The expression recognition neural network 320c is trained using various face samples. The expression recognition neural network 320c with the aid of the machine learning algorithm 320 uses the trained information to identify the salient emotions (and ideas) expressed in the memes, GIFs, emojis, and other graphic images provided by the spectators through the chat interface. The machine learning algorithm 320 compares each one of the facial features (e.g., eyes, nose, mouth, etc.) individually, in combination and as a whole to the trained data from the expression recognition neural network 320c to find the salient emotions that best match the expressions of the graphic images. The identified salient emotions are provided as inputs to an avatar visualizer 316. Similarly, the text content within the chat interactions are extracted and forwarded to the emotion keyword identification (ID) engine 320d.

In addition to processing chat content, the interaction analyzer 314 also processes live video of the spectators captured in real time while the spectators are watching the gameplay of the video game. The live video may be captured by one or more image capturing devices, such as cameras, that are facing the spectators. The cameras may be integrated within the spectators' client devices or may be external cameras that are communicatively connected to the client devices. The captured video includes at least the faces of the spectators. In addition to capturing the images of the spectators, the cameras may also capture the verbal reactions (e.g., outbursts, comments, reactions, etc.) of the spectators as they are watching the video game. A video content analyzer 314b is used to forward the video portion of the live video to the facial detection algorithm 320a, which crops the images of the spectators to include facial features and forwards the cropped images to the expression recognition neural network 320c. The expression recognition neural network 320c processes the facial features from the cropped images of the spectators in a manner similar to how the graphic images from the chat content were processed. For instance, the machine learning algorithm 320 with the aid of the expression recognition neural network 320c identifies and compares each one of the facial features captured and the facial features as a whole of the spectator captured in the cropped images with the trained data from the expression recognition neural network to identify the salient emotions that best match the facial features of the spectators.

In some cases, the analysis of the facial features may result in identifying expressions that correspond with multiple emotions. In such cases, the machine learning algorithm 320, with the aid of the expression recognition neural network 320c, may compute probability score 325a for each emotion identified from the facial features of the spectator captured in the images included in the live video. The salient emotion to associate with the spectator is determined based on the probability scores 325a of the plurality of emotions identified from the facial features of the spectator. The live video of the spectators may include both a video component and an audio component. In some implementations, a unimodal approach is adopted by feeding only the video component of the live video to the expression recognition neural network 320c to identify the salient emotions detected from the interactions of the spectators. In other implementations, a multimodal approach may be adopted by pairing the video component with the corresponding audio component captured in the live video and forwarding the paired content (i.e., video and audio content) to the facial detection algorithm 320a for onward transmission to the expression recognition neural network 320c.

As with the unimodal approach where only the cropped images from the video was used, in the multimodal approach, the expression recognition neural network 320c uses the cropped images from the video and the associated audio to identify the salient emotion detected from each spectator. The audio data may be used to further refine the salient emotions identified from the facial features of each spectator. The salient emotions of the plurality of spectators who make up the audience 103 are forwarded as inputs to the avatar visualizer 316. In some implementations, the keywords included in the audio data as well as pitch, amplitude, duration, etc., are identified and used to refine the salient emotions. The salient emotions are forwarded to the keyword identification engine 320d.

In addition to the chat content and the video content, the audio content generated during the online gaming of the video game is processed by an audio content analyzer 314c of the interaction analyzer 314. The audio content may be generated by the spectators or players during the online gaming and may be captured using microphones embedded in the client devices or using external audio capturing devices (e.g., audio recorders, external microphones, etc.) that are communicatively coupled to the client devices of the spectators. Alternatively, the audio content may be from audio clips that were included in the chat content. In some implementations, the audio content analyzer 314c may process the audio content by applying filters to filter out the ambient noises and/or to selectively extract specific ones of the audio signals. The processed audio content is forwarded to an audio input processor 320b. The audio input processor 320b includes or engages a speech to text converter 320b1 to convert the audio into text. The converted text is forwarded by the audio input processor 320b to the keyword identification engine 320d. In addition to text content, the audio content is analyzed to identify certain audio features and use the audio features to detect emotion. For example, the pitch, amplitude, duration, etc., of the audio may convey different emotions, regardless of the content. Consequently, the audio input processor 320b may engage an audio analyzer module (not shown) with machine learning algorithm to analyze the audio content and extract certain audio features, such as pitch, amplitude, duration, etc., and predict the emotion associated with the extracted audio features of the audio content. The emotion identified from the extracted audio features of the audio content is forwarded to the avatar visualizer 316 as input from the interaction analyzer 314.

The keyword identification engine 320d receives the text content and the converted text content from the audio data included in the chat content and the audio content. The keyword identification engine 320d examines the text content and identifies keywords included therein. The text content may include keywords that pertain to expressions associated with certain ones of emotions or pertain to subjects of discussion within the chat interface. It should be noted that any reference to chat interface could be extended to include an interactive interface through which the spectators are able to communicate with one another and with players of the video game. The subjects of discussion may pertain to the game state or gameplay of the video game or may pertain to comments or behavior of spectators or players or may pertain to other content related to the video game. For instance, the subjects of discussion may relate to game style of players, comments related to the gameplay of the video game or content of the video game, comments related to spectators, players, comments in response to interactions of the spectators or players, etc. The keywords identified by the keyword identification engine 320d is forwarded to the keyword analysis engine 315 as input for further processing.

Figure 6:
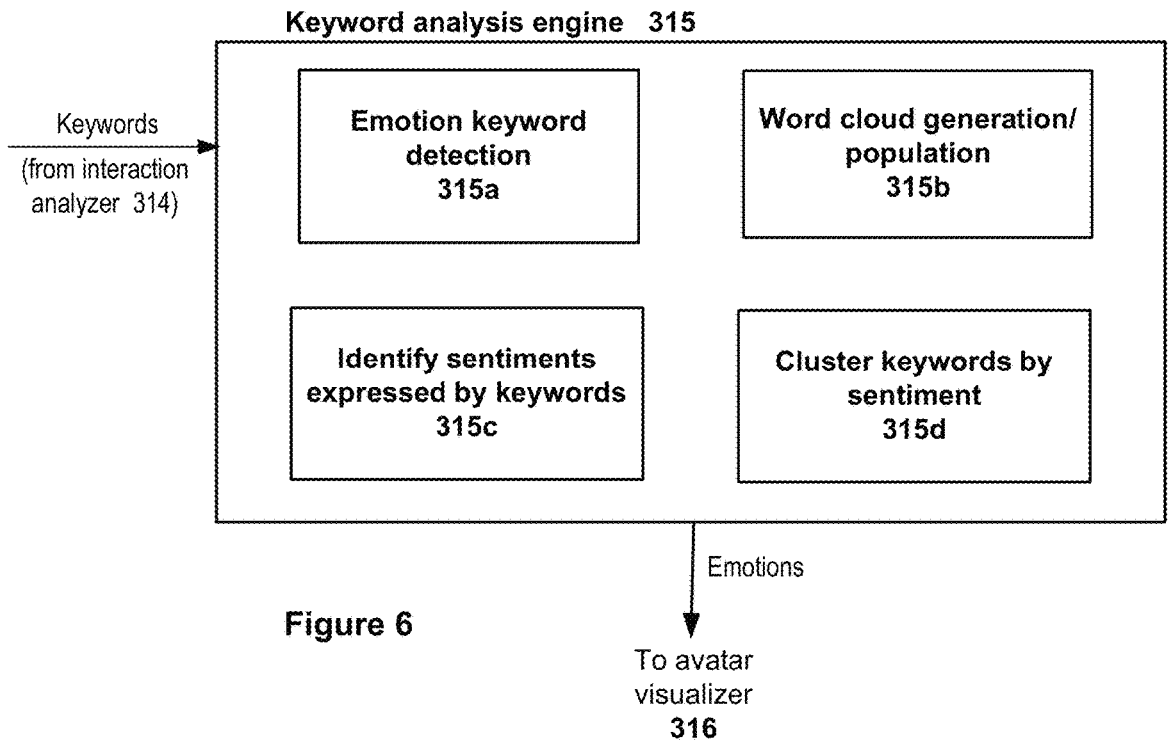
FIG. 6 illustrates an example keyword analysis engine of the sentiment surfacing engine used to identify the various emotions detected from the different spectators, in accordance with one implementation of the disclosure.

FIG. 6 illustrates the various components of the keyword analysis engine 315 used to identify the keywords pertaining to emotions and to cluster the spectators in accordance to the emotions expressed in their interactions. The keyword analysis engine 315, for example, begins by first performing an emotion keyword detection 315a by identifying keywords pertaining to basic emotions, such as happiness, fear, sadness, anger, surprise, disgust, jealous, anticipation, loneliness and trust, and keywords that pertain to expressions that can be associated with emotions. Some of the keywords identified by the interaction analyzer 314 may not directly express the emotion but are expressions that can be associated with emotions. The keyword analysis engine 315 engages machine learning algorithm 320 to identify expressive keywords that can be associated with different emotions. For example, keywords, such as amused or cheerful or excited may be associated with happiness emotion, keywords, such as clingy or moody or fussy may be associated with sadness emotion, keywords, such as panicky or scary or nervous may be associated with fear emotion, and keywords, such as irritated or grumpy may be associated with anger emotion, etc. Of course, some of the expressive keywords may be synonyms of the corresponding emotions while other expressive keywords may not be. The machine learning algorithm 320 uses history of spectators interactions for the video game and/or other video games and the context in which the expressive keywords were provided at the interaction interface during current gameplay session to correctly identify the emotions for associating with the expressive keywords.

The keywords (i.e., keywords identifying basic or primary emotions and/or expressive keywords associated with emotions) are used to dynamically generate and populate a word cloud (315b) in real time. The keywords in the word cloud correspond to the current emotions of the audience of spectators. As additional interactions are received from the spectators, additional keywords are identified from text and other interactions, and the word cloud is dynamically updated to reflect the emotions of the spectators.

The word cloud is examined to identify the various emotions expressed by the spectators (315c) in the audience. As part of identifying the various emotions, the keyword analysis engine 315 with the aid of the machine learning algorithm 320 identifies the various keywords that pertain to each emotion and indexes the keywords accordingly. The indexing of each keyword is done to identify the emotion to which the keyword belongs and to identify the spectators who included the keyword in their interactions during online gaming of the video game. The indexes are used to cluster the keywords by emotions (315d) into different vibe cliques, wherein each vibe clique corresponds to a distinct emotion. Thus, emotional keyword, such as happy, and expressive keywords, such as amused, cheerful, excited, etc., may be clustered together under a vibe clique associated with happy emotion. Similarly, emotional keyword, such as sad, and expressive keywords, such as clingy, moody or fussy are clustered under a vibe clique associated with sadness emotion, and emotional keywords, such as afraid, fear, and expressive keywords, such as panicky, scary, nervous are clustered under vibe clique associated with fear emotion, and so on. Based on the number of people that have used each keyword for expressing the associated emotion, the size of the keyword in the word cloud may be adjusted.

The word cloud provides a visual representation of the various emotions expressed by the spectators through text or audio content, and the size of the keywords represents the number of times the keywords were used by the different spectators during interactions. In addition to clustering the spectators into vibe cliques, the keyword analysis engine 315 also computes a confidence score for each vibe clique. The confidence score for each vibe clique is computed as a number of spectators in the audience that express the dominant emotion or a variation of the dominant emotion in their interactions using keywords or through expressions. The emotion expressed by each spectator is determined using probability scores 325a computed for each emotion identified from the analysis of the facial features captured in the images obtained from the live video, wherein the emotion expressed by the spectator is identified to be the emotion with the highest probability score 325a.

Figure 7:
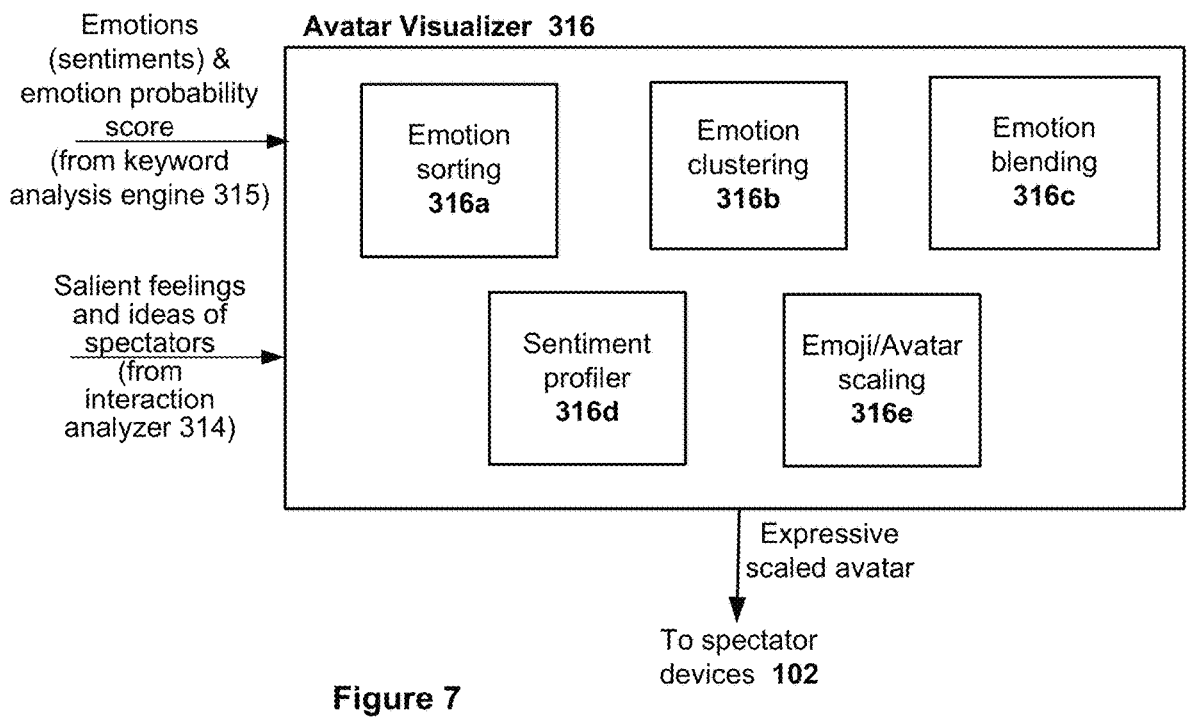
FIG. 7 illustrates an example avatar visualizer of the sentiment surfacing engine used to generate and scale avatars representing different emotions detected from the different spectators, in accordance with one implementation of the disclosure.

FIG. 7 illustrates an avatar visualizer 316 to generate representative avatars for rendering over an image representation of audience, in one implementation. The avatar visualizer 316 receives the emotions provided by the interaction analyzer 314 and the emotion keywords provided by the keyword analysis engine 315. The emotion keywords and the emotions are used to create expressive avatars to represent the distinct emotion for each cluster (i.e., vibe clique) of spectators identified in the audience. Additionally, the confidence scores associated with the different vibe cliques are used to scale the corresponding expressive avatars. To start with, the avatar visualizer 316 first sorts the emotions (316a) to determine the number of emotions that are identified from the interactions of the spectators. When the number of emotions identified are too many, some of the emotions are clustered together (316b) based on the level of similarity detected from those emotions. For instance, primary emotions (e.g., happy, sad, fear, anger, etc.) may be identified from the inputs provided by the interaction analyzer 314 and the keyword analysis engine 315. A similarity score is computed for each of the emotions identified from the inputs. The similarity score of a primary emotion is defined as 1, and the similarity score of other emotions that are variants of the primary emotion are defined by a number between 0 and 1. For instance, using the keywords as examples, keyword happy representing a primary emotion is assigned similarity score of 1. Other keywords that are variants of the happy emotion, such as smile, content, ecstatic, amused, cheerful, excited, etc., are assigned a similarity score that is between 0 and 1. In one implementation, the similarity score for the keywords which are variants of the primary emotion may be determined based on the context in which the keywords were used in the interactions. The similarity scores are used to identify the dominant emotions (i.e., primary emotion) and to cluster the different emotions identified from the interactions into vibe cliques defined for the dominant emotions. The vibe cliques thus may be formed to include emotions with similarity scores that vary by a predefined percentage (e.g., 5% or 10%) or predefined number (e.g., 0.005-0.010) from the similarity scores of the dominant emotions. From the above example, the vibe clique for the happiness emotion may include spectators who expressed the happy emotion as well as spectators who expressed variations of the happy emotion (e.g., smile, content, ecstatic, amused, cheerful, excited, etc.).

As part of clustering the spectators into vibe cliques in accordance to emotions expressed by the spectators, a confidence score is computed for each vibe clique as the number of spectators that are expressing the emotion associated with the vibe clique. Accordingly, for each vibe clique, the confidence score is the number of spectators that are expressing the primary emotion as well as the variations of the primary emotion associated with the respective vibe clique. In addition to clustering the emotions and computing the confidence scores for the various emotions, the avatar visualizer 316 may also determine the number of emotions that are detected in the audience. When the number of emotions detected is too many, the avatar visualizer 316 may select only a predefined number of avatars to represent. For example, if the number of emotions identified/detected is 10 or 12 (e.g., 10 or 12 basic emotions), the avatar visualizer 316 may identify the top 5 emotions to represent using avatars, wherein the 5 may be a predefined number.

Additionally, the avatar visualizer 316 may determine whether the emotions expressed are positive or negative in nature. In one implementation, the avatar visualizer 316 may determine the positive or negative nature of each expressed emotion by referring to a psychology literature available to the sentiment surfacing engine 304. The nature of the emotions may be used in presenting the avatars in different colors to provide a more visual representation of the emotions in the audience. For instance, the happy emotion is considered a positive emotion while anger or sadness or fear emotion is considered as a negative emotion. The positive emotions may be represented in green color while the negative emotions may be represented in red color. When more than one positive emotion is identified, each of the avatars representing the positive emotion may be represented as a variation in the intensity of the green color, with the most positive emotion having the most intense green color and the least positive emotion having a lighter shade of green. Similar variation may be applied when more than one negative emotion is detected in the audience. Alternatively, each of the basic emotions may be represented by a different color. In addition to the color, the avatar visualizer 316 may identify additional features to include (i.e., blend) when generating the expressive avatar for each emotion identified by the interaction analyzer 314 and the keyword analysis engine 315.

The avatar visualizer 316 then performs sentiment profiling (316d) by adjusting the expressions of the appropriate avatar to match the emotion. During profiling, the avatar visualizer 316 blends in the various features (e.g., color, size, etc.) that were identified for each emotion so as to generate an avatar that properly represents the dominant emotion in each vibe clique. In one implementation, the avatar is generated in the form of emojis. It is noted that rendering emojis as expressive avatars is one way of representing emotions and that other forms of avatars or representations may also be used.

Once the avatars are generated for each emotion, the avatar visualizer 316 uses the confidence score computed for each vibe clique to dynamically scale the generated avatar for each emotion. The dynamic scaling is done to provide a visual indication of a level of dominance each emotion has in the audience, with the avatar corresponding to the most dominant emotion being larger than others. The profiled and scaled avatars representing the different emotions are returned to the client devices of the spectators for rendering over an image representation of an audience presented alongside the content of the video game. The sentiment surfacing engine 304 using machine learning algorithm 320 provides a way to gauge the distribution of reactions of a large number of gaming spectators that are spread across a wide geographical area quickly (i.e., in almost real-time). The aggregate visual feedback is intuitive to the spectators, allowing the spectators to visualize the various emotions of the audience. The visual representation also allows the spectators to compare their reactions with those of the different groups and to identify the group (i.e., vibe clique) in the audience whose emotions most align with their own.

Figures 8A, 8B:
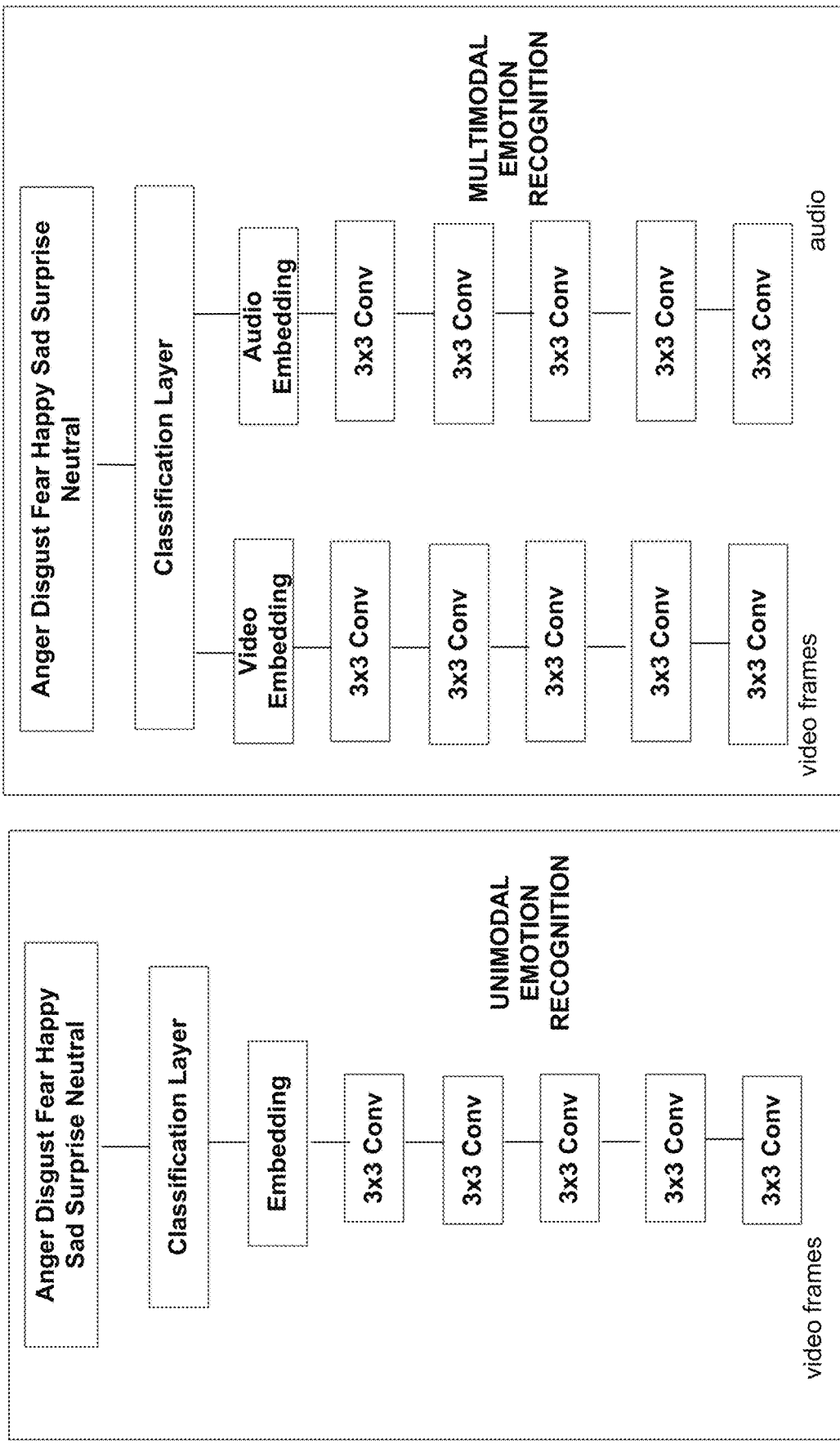
FIG. 8A illustrates an overview of video image processing as part of a unimodal emotion recognition process, in accordance with one implementation of the disclosure.
FIG. 8B illustrates a overview of video image processing as part of a multimodal emotion recognition process, in accordance with one implementation of the disclosure.

FIG. 8A illustrates the process of identifying the different emotions expressed by spectators based on analysis of video portion of live video using unimodal emotion recognition approach adopted by machine learning algorithm used by the sentiment surfacing engine 304, in accordance with one implementation. In this approach, the various video frames captured in the live video capture the facial features of the spectator. Each video frame captured in the live video is analyzed to identify the facial features embedded therein. Each video frame is cropped to include the facial features. The facial features are used by the machine learning model to classify the different emotions of the spectators.

The interaction analyzer module 314 processes each modality of content captured from or generated by each spectator independently to infer the expressed emotion and fuse the emotions from different modalities identified from the interaction data associated with each spectator. The fused emotions of each spectator are then provided to the avatar visualizer 316 as input to visualize the emotions using the avatars. In the example illustrated in FIG. 8A, the video modal data (i.e., live video) is being processed by the interaction analyzer 314. Other modal data identified in the interaction data can be processed in a similar manner. As shown, the interaction analyzer 314 may engage the visual emotion analysis engine 325 along with machine learning algorithm 320 for processing the video modal data included in the live video, wherein the processing includes extracting the features (e.g., facial features) of each spectator captured in the live video and independently inferring the emotion of the respective spectator, with the aid of the expression recognition neural network 320c. In the implementation illustrated in FIG. 8A, the expression recognition neural network is a unimodal-stream deep neural network that is trained to use the features identified from a specific modality and to predict the emotion for the features from the specific modality for a spectator. The emotion identified from each modal data is then combined with the emotions identified from other modal data for each spectator. For example, as shown in FIG. 8A, the emotion is predicted for the live video. The inferred emotion of the live video is then fused with the emotions predicted from other modalities included in the interaction data of the spectator, for example through weighted averaging. Thus, the emotion prediction for a spectator is based on fusing the predictions of different unimodal streams emotions for that spectator. The avatar visualizer 316 receives the fused emotions of each spectator, determines the distribution of the various emotions within the audience, and generates appropriate avatars to visualize the emotions of the spectators in the audience.

FIG. 8B illustrates the process of identifying the different emotions expressed by spectators based on analysis of video and audio portion of live video using a multimodal emotion recognition approach adopted using machine learning algorithm 320 of the sentiment surfacing engine 304, in accordance with one implementation. In the example of FIG. 8B, live video and audio features identified from different modal streams are processed to identify the emotions expressed by a spectator. The audio may be generated by the spectator when the video was being captured or when the spectator was interacting with other spectators. In this implementation, the features from each modality are used as input to train the expression recognition deep neural network 320c to predict the emotion of a spectator. The predicted emotion is then provided to the avatar visualizer 316 for generating avatars. The avatar visualizer 316 receives the predicted emotion of each spectator, determines the distribution of the various emotions within the audience, and generates avatars with appropriate size and color that reflects the distributions of the emotions of the spectators. In the implementation illustrated in FIG. 8B, the expression recognition neural network is a multi-modal deep neural network that is trained to use the features from the two different modalities to predict the emotion for a spectator. In the example illustrated in FIG. 8B, only two modalities (i.e., live video and audio streams) are shown to be combined to predict the emotions expressed by the spectators, whereas in reality more than two modalities of interaction data can be used to predict the emotions of the spectators.

Figure 8C:
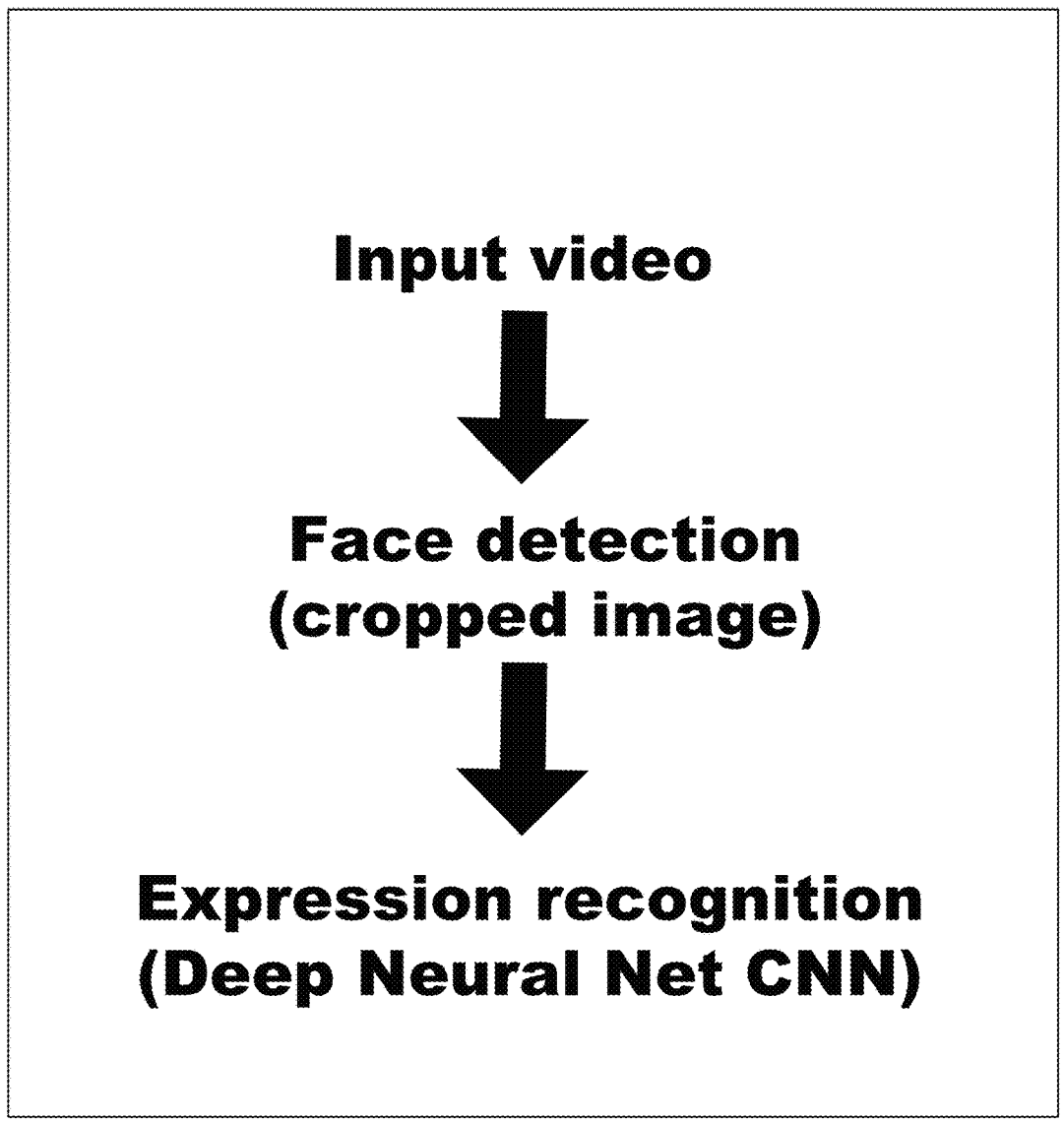
FIG. 8C illustrates a simplified unimodal emotion recognition process implemented using the sentiment surfacing engine for identifying different expressions detected from the interactions of the spectators viewing online gaming of the video game, in accordance with one implementation of the disclosure.

FIG. 8C illustrates the main steps taken by the machine learning algorithm in a unimodal approach for identifying emotions of spectators watching gameplay of a video game, in one implementation. In the illustrated example, the unimodal approach uses the live video of the spectator captured using cameras or image capturing devices incorporated within or associated with the client devices of the spectator as input. The live video of the spectator captured at the client device is forwarded to the cloud server. The sentiment surfacing engine 304 receives the live video, extracts the image of the spectator included within, detects the face of the spectator and crops the image of the spectator to retain only the facial features. The cropped image is then used to identify the expression of the spectator and relate the expression to an emotion using trained data from the expression recognition neural network.

Figure 9:
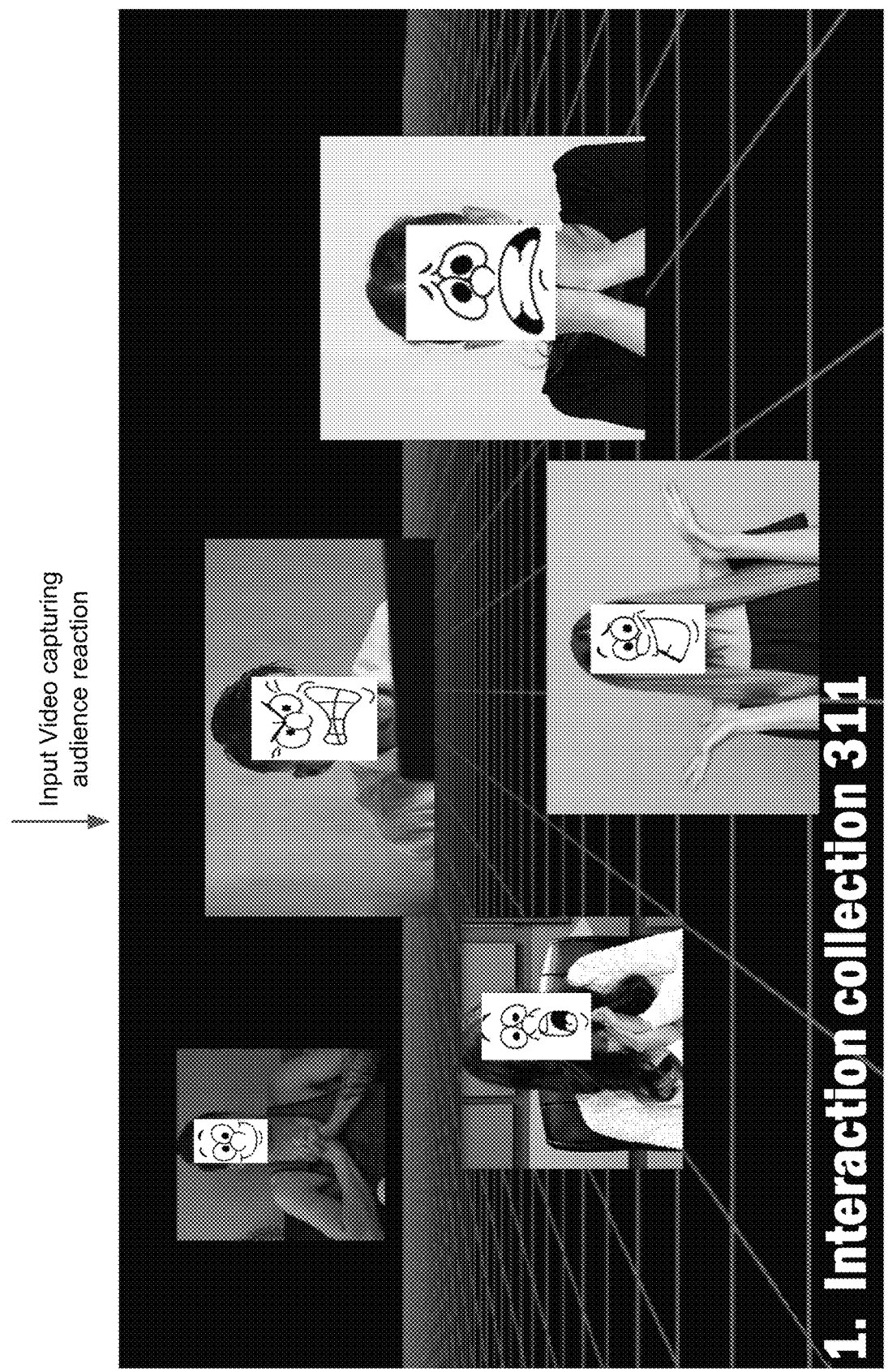
FIG. 9 illustrates a sample screen view representation of information collection phase (i.e., operation) using video of different spectators captured while the spectators were viewing the online gaming of the video game, in accordance with one implementation of the disclosure.

FIG. 9 illustrates a sample screen showing images of spectators that were captured in live video, during an interaction collection phase using interaction collection engine 311, in one implementation. The live video of the spectators who are part of the live audience watching the gameplay are captured using image capturing devices and made available to the sentiment surfacing engine 304. The sample screen illustrated in FIG. 9 shows each spectator showing a different emotion, although that might not always be the case. The images of the spectators capture facial features in addition to other features, such as hands, body, etc. As the emotions (i.e., basic emotions) are expressed using facial features, the sentiment surfacing engine 304 identifies the facial features from the images of the spectators and crops the images to include only the facial features showing the emotions. The cropped facial features are processed by the interaction analyzer 314 to identify the salient emotions detected from the spectators. In FIG. 9, in order to protect privacy of the spectators, graphical overlay has been provided over the actual faces in the images of the spectators, whereas in reality facial features from the actual faces of the spectators are used in determining emotions expressed by the spectators.

Figure 10:
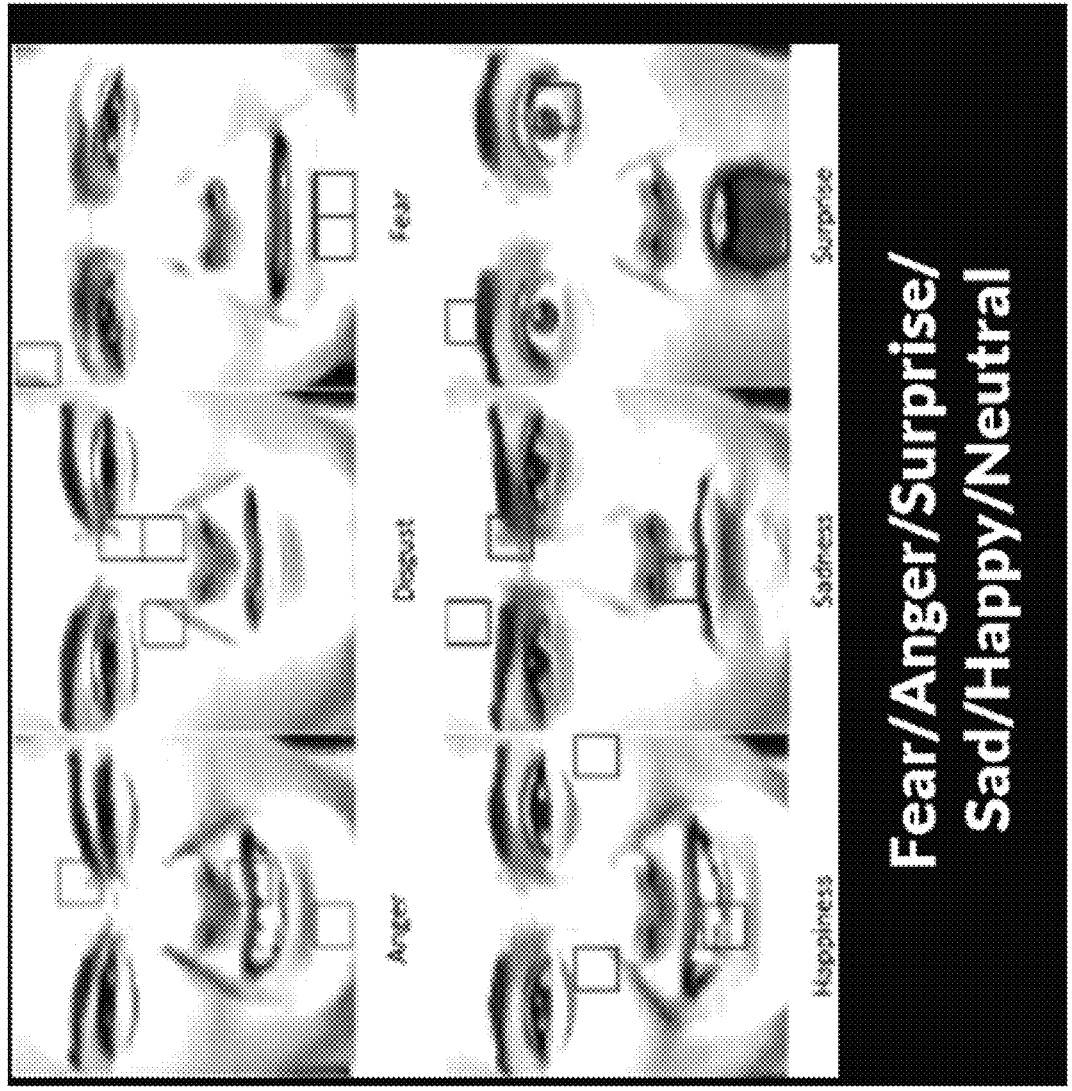
FIG. 10 illustrates a sample facial feature recognition process used to identify different expressions detected from the spectators, in accordance with one implementation of the disclosure.

FIG. 10 shows an illustration of the cropped images of a sample set of spectators, wherein the images were cropped to include only the facial features. The facial features are used by the interaction analyzer 314 to identify the salient emotions of the spectators, in one implementation. The interaction analyzer 314 examines various aspects (e.g., knitting of the eyebrows, crinkling of the nose, wrinkles on the forehead, extent to which the eyes are opened, smile or frown of the mouth and the extent of the smile or frown, etc.) of each and every facial feature, such as the eyebrow, the eyes, the nose, the forehead, the mouth, etc., and the facial features as a whole to identify the emotions detected from the spectators. In some implementations, the facial feature and the features as a whole are examined to identify one or more of at least the six basic emotions (e.g., anger, disgust, fear, happiness, sadness, surprise, etc.).

Figure 11:
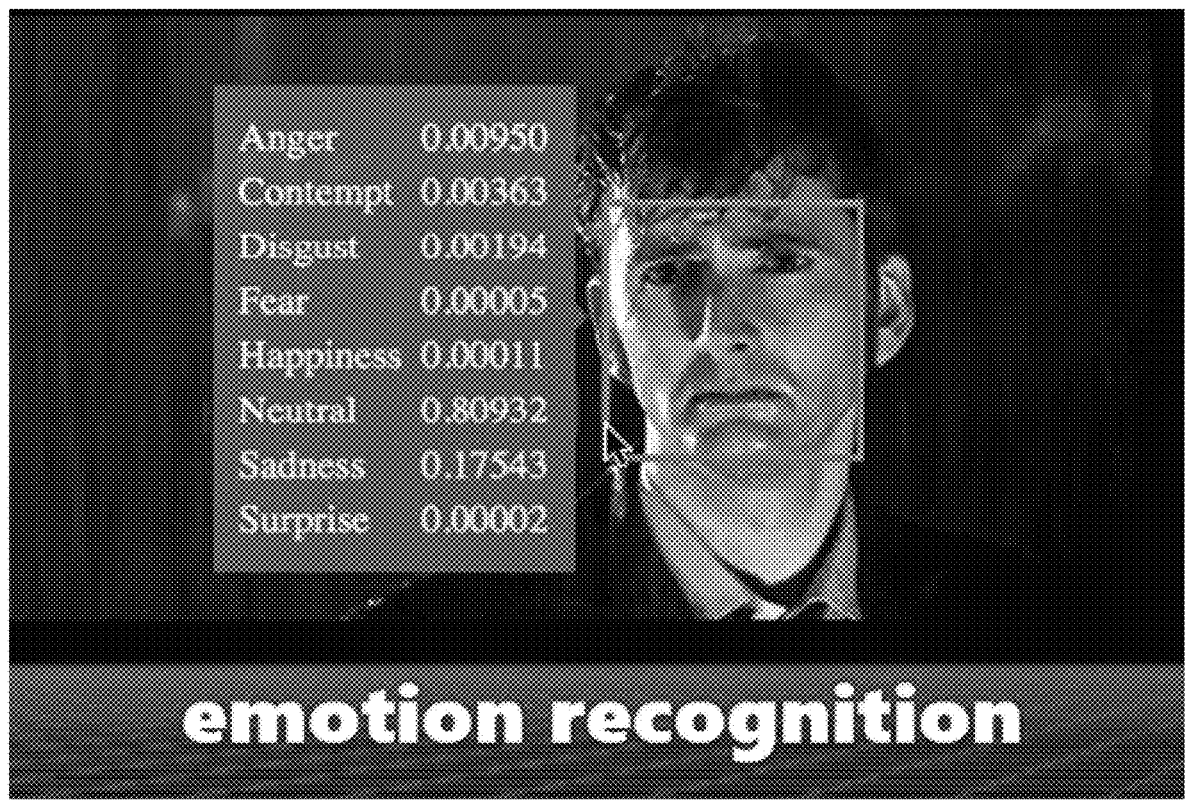
FIG. 11 illustrates a sample set of emotions recognized by analyzing facial features of a spectator captured in a video when the spectator was viewing the online gaming of the video game, in accordance with one implementation of the disclosure.

FIG. 11 illustrates an image of a spectator from a live video used to determine the emotion expressed by the spectator, in one implementation. As noted with reference to FIG. 10, the facial detection algorithm within a sentiment surfacing engine 304 receives the live video and extracts the image of the spectator. The extracted image is then cropped to include only the facial features (represented as blue square in FIG. 11) of the spectator. The various facial features of the cropped image are then analyzed to identify the emotion detected from the spectator. The analysis includes comparing each facial feature as well as combination of facial features with corresponding facial features in the trained data included in the emotion recognition neural network to identify the various emotions. In addition to identifying the various emotions, the facial detection algorithm also identifies a matching score for each emotion, wherein the matching score corresponds to level of matching of the specific one(s) of the facial features with the corresponding ones in the trained data. FIG. 11 shows one such example wherein the analysis of the facial features of a spectator has yielded a set of emotions and a corresponding matching score for each identified emotion. Although the implementation illustrated in FIG. 11 corresponds to live video the implementations can be extended to include analysis of other graphical images, such as emojis, memes, GIFs and other graphic content as well. Based on the matching score of the facial features identifying the level of matching, the expression of the spectator captured in the image represented in FIG. 11 may be determined to be neutral (i.e., the emotion with the highest matching score).

Figure 12:
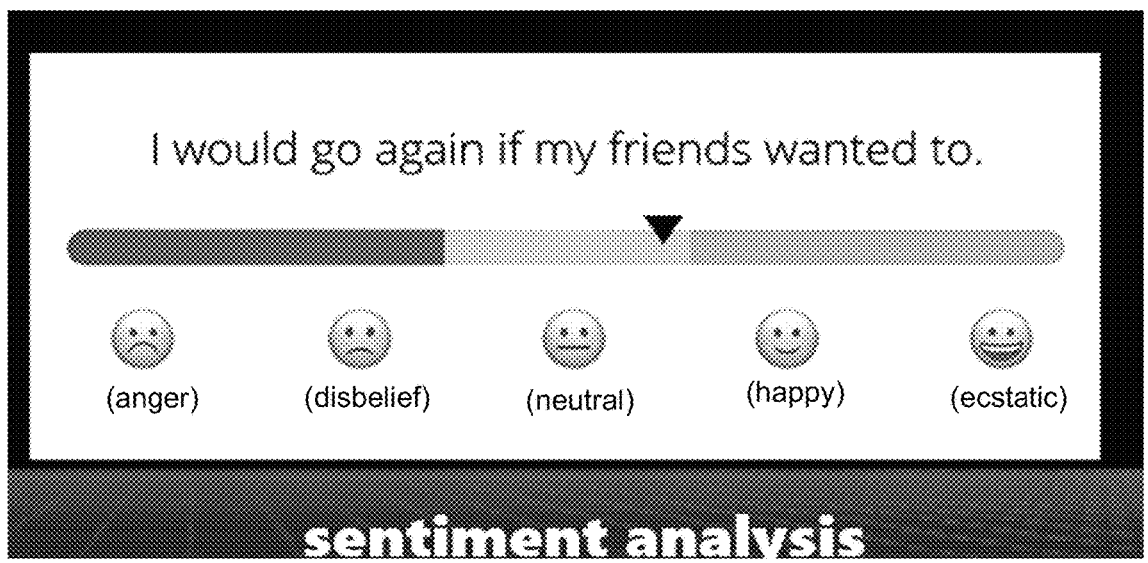
FIG. 12 illustrates a sample vibe rating used by the sentiment surfacing engine during sentiment analysis to identify the emotion of the spectator, in accordance with one implementation of the disclosure.

FIG. 12 illustrates a sliding vibe rating scale that can be used for visually representing each emotion when generating the respective avatars, in one implementation. The emotions can have a positive vibe rating or a negative vibe rating. Based on the vibe rating of each emotion, the sentiment surfacing engine 304 may define a color for an avatar generated to represent the respective emotion. For example, the anger emotion is shown to have a negative vibe rating and, as a result, the avatar representing the anger emotion may be represented in red. Similarly, the happy or ecstatic emotion is shown to have a positive vibe rating and as a result may be represented in green. In one implementation, depending on the vibe rating, the intensity of the colors representing the avatars may be adjusted. In the example shown in FIG. 12, both anger and disbelief have a negative vibe rating but the level of negative vibe for anger emotion may be greater than the negative vibe rating of the disbelief emotion. As a result, the avatar representing the anger emotion may be defined using a deeper red while the avatar representing the disbelief emotion may be defined using a lighter red. In the implementation illustrated in FIG. 12, the vibe rating scale also shows a sample color code used for representing the various emotions in accordance to the vibe rating associated with the emotions. It is noted that other color schemes may be used to represent the emotions including using a distinct color to represent each distinct emotion.

Figure 13:
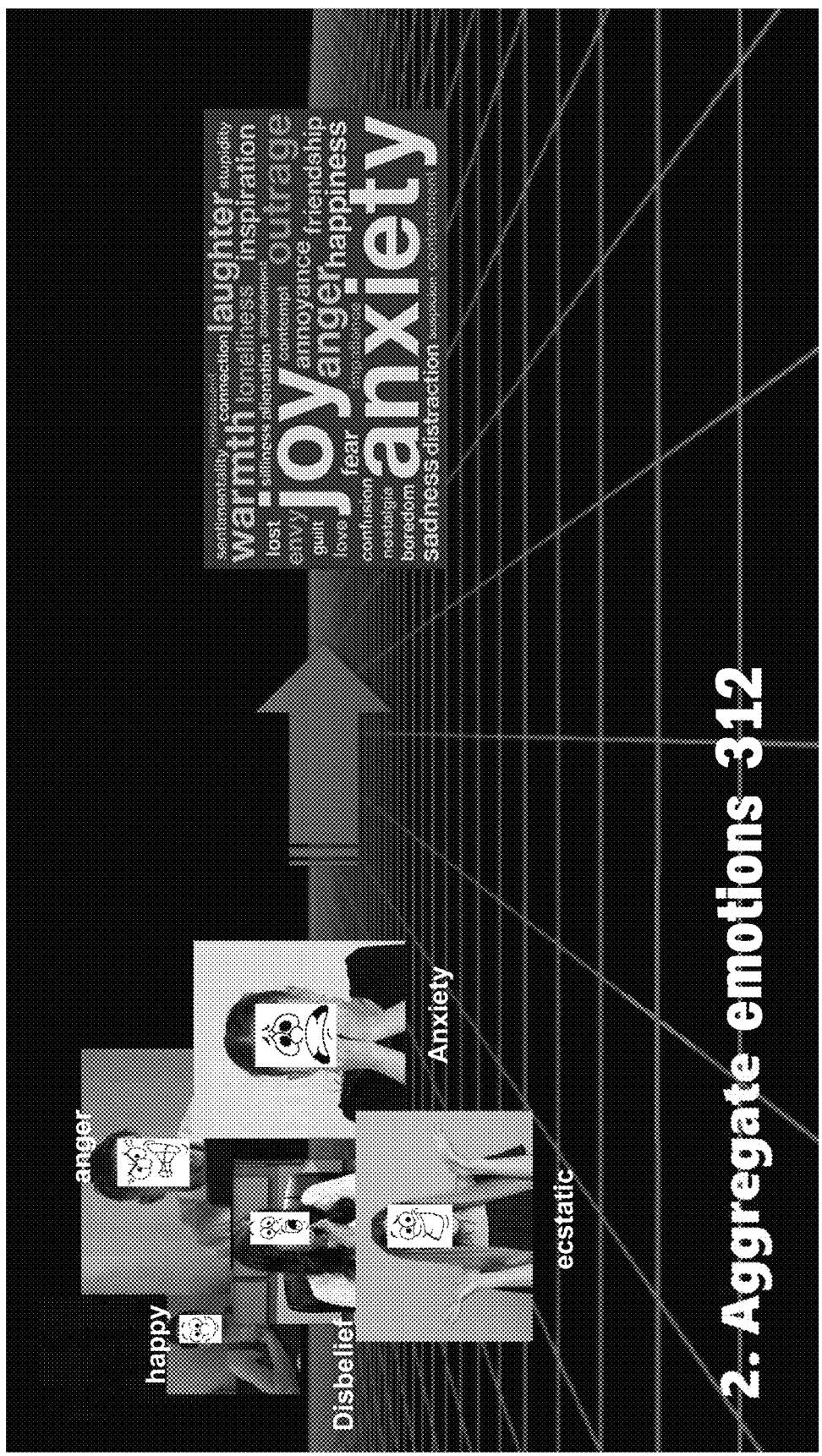
FIG. 13 illustrates a simplified screen view representation of emotion aggregation phase (i.e., operation) using the spectator interactions gathered during online gaming of the video game, in accordance with one implementation of the disclosure.

FIG. 13 illustrates a representation of an emotion aggregation step (also referred to as "emotion aggregation phase") 312 wherein certain ones of the interactions of spectators are used to dynamically generate and populate a word cloud with keywords representing emotions and expressive keywords related to emotions gathered from the spectators during gameplay of the video game, in one implementation. In the example illustrated in FIG. 13, the live videos of spectators are used to populate the word cloud. In one example, the sentiment surfacing engine 304 adopts a unimodal approach to populate the word cloud by using information from the live video of the spectators. It is to be noted that the various implementations are not restricted to the unimodal approach but can include multimodal approach as well, wherein the live video, audio content, chat content may all be processed simultaneously to populate the word cloud. The keywords in the word cloud are used for identifying the emotions of the crowd (i.e., audience) of spectators. In the implementation illustrated in FIG. 13, some of the keywords in the word cloud are rendered more prominently (i.e., visually represented largely) than others. This may be to indicate the level of dominance of that keyword in the interactions of the spectators (i.e., number of spectators that have expressed the specific keyword during their interactions). It should be noted that the word cloud itself is not actually rendered on any display screen of any client device but is shown in FIG. 13 for illustration purposes to provide a visual representation of which keywords are more dominant than others in spectator interactions. The keywords in the word cloud represent the emotions or expressive keywords that are associated with the emotions. As with FIG. 9, in the example illustration of FIG. 13, graphical overlay has been provided over the actual faces of the spectators captured in the images of the spectators, in order to protect privacy of the spectators, whereas in reality facial features from the actual faces of the spectators captured in the images of the live video are used in populating the word cloud.

Figure 14:
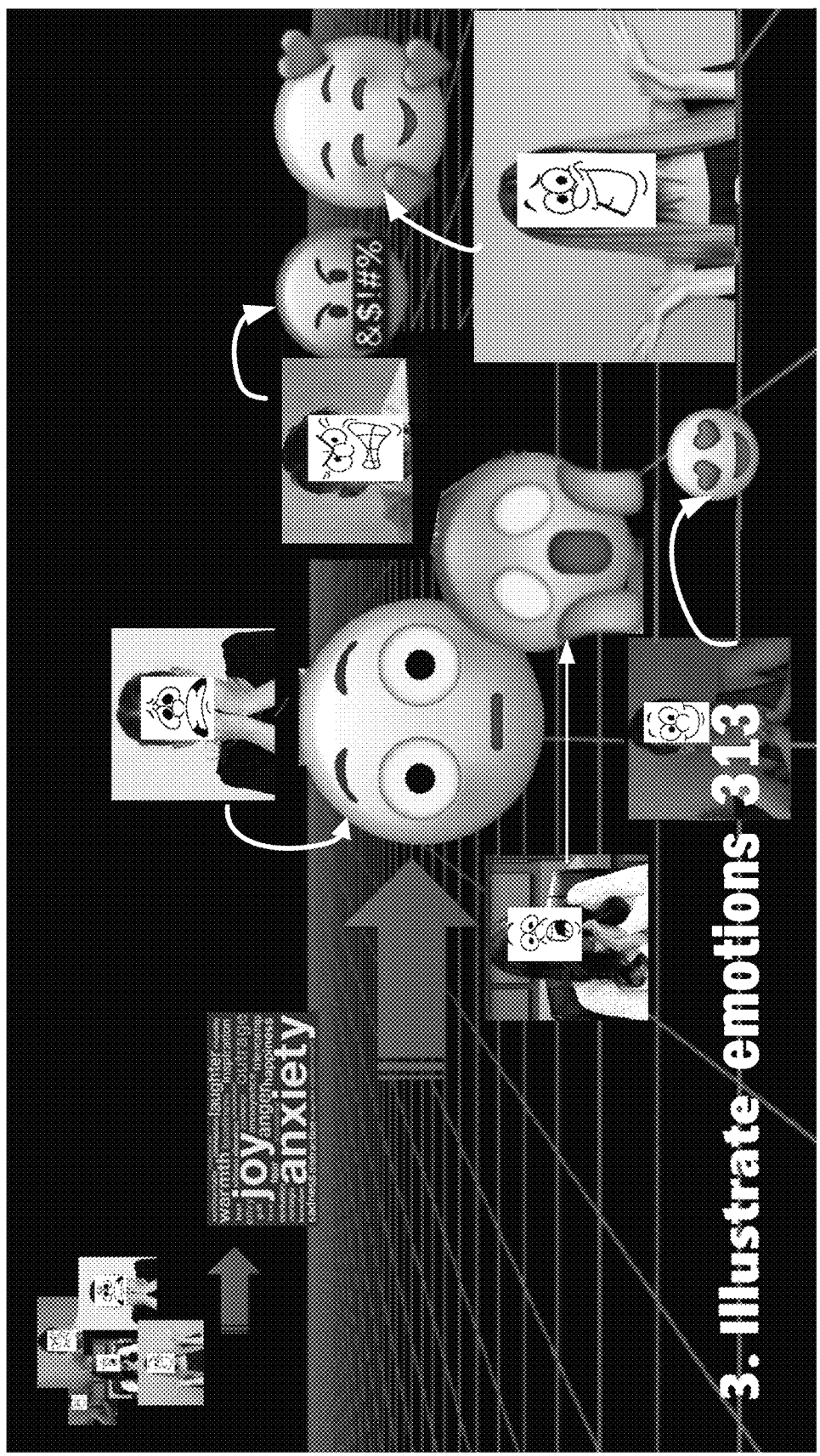
FIG. 14 illustrates a simplified screen view representation of the emotion visualization phase performed by sentiment surfacing engine, in accordance with one implementation of the disclosure.

FIG. 14 illustrates an example representation of the emotion visualization phase of the sentiment surfacing engine 304, in one implementation. As shown in the example representation, once the word cloud is generated, the sentiment surfacing engine 304 clusters the spectators who generated the keywords in accordance to the emotions that the keywords represent, such that each cluster of spectators is associated with a distinct emotion. Based on the clustering of spectators, the sentiment surfacing engine 304 identifies an avatar for each emotion, adjusts the expressions of the avatar, blends various features identified for each emotion and forwards the blended avatar for each emotion for rendering at the client device of the spectators. FIG. 14 shows some of the avatar representations that were generated for the different emotions identified from the sample live video of spectators captured during interaction collection phase of FIG. 9. For illustration purposes only, in the example illustrated in FIG. 14, the avatars are shown to have a one-to-one correlation with the images of spectators illustrated in FIG. 9, whereas in reality, the correlation between the avatar to the spectators are actually one-to-many Although, in the example illustrated in FIG. 14, only the results of the live video of spectators are shown to be used for populating the word cloud and generating avatars, in reality, other modal data, such as text data, audio data, memes, GIFs, emojis, other graphic content, etc., generated by the spectators are also used in populating the word cloud and/or in identifying avatars for representing the emotions. As with FIGS. 9 and 13, in the example illustration of FIG. 14, graphical overlay has been provided over the actual faces of the spectators captured in the images of the spectators in order to protect privacy of the spectators, whereas in reality facial features from the actual faces of the spectators captured in the images are used in determining emotions expressed by the spectators and to provide avatar representations.

Figure 15:
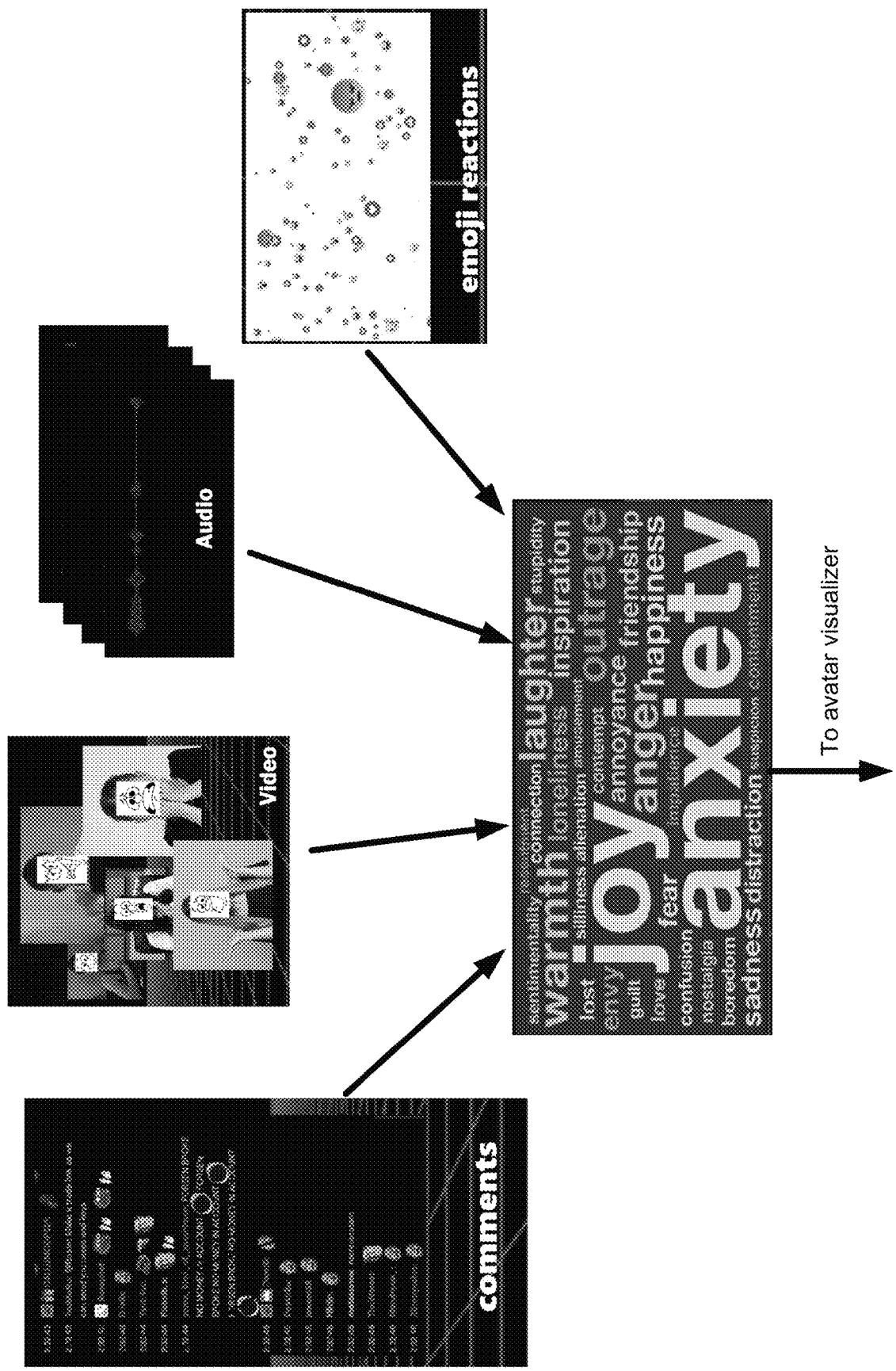
FIG. 15 illustrates the various interaction inputs (i.e., modal data) of the spectators that are gathered from audience of spectators to generate word cloud that is used to recognize keywords representing emotions detected from the spectators, in accordance with one implementation of the disclosure.

FIG. 15 provides a visual representation of the various types of interactions that can be used to generate the word cloud, which is used to generate the expressive avatars for rendering over the image representation of the audience, in one implementation. The types of interactions include chat or message content (including text, emojis, GIFs, memes, other graphic content, etc.), live video content (capturing expressions of spectators while they are watching the online gaming of the video game), audio comments/content, and emoji reactions. Different spectators may elect to share none, select ones or all types of interactions generated by them while they are watching the gameplay of the video game. Based on the sharing option selected by the spectators, the sentiment surfacing engine 304 collects the corresponding types of interactions from the different spectators and uses the interactions to generate the word cloud, which is used along with expressions of the spectators to identify the emotions and to generate and scale the avatars for each identified emotion. As with FIGS. 9, 13 and 14, in the example illustration of FIG. 15, graphical overlays have been provided over the actual faces of the spectators captured in the images of the spectators in order to protect privacy of the spectators, whereas in reality facial features from the actual faces of the spectators captured in the images of the live video are used in determining the emotions.

In one implementation, the interactions of the spectators are collected during live video game, the collected interactions are used for generating the word cloud, generate avatars to represent the emotions identified from the word cloud, and return the avatars to client devices of the spectators that have accessed the video game to watch the gameplay. The generated word cloud and the avatars are saved in sentiment database 334 for use during replay of the video game. During replay, the interactions from the spectators that are watching the replay are collected and used to update the word cloud and the avatars representing the emotions identified from the word cloud and other interactions.

Figure 16:
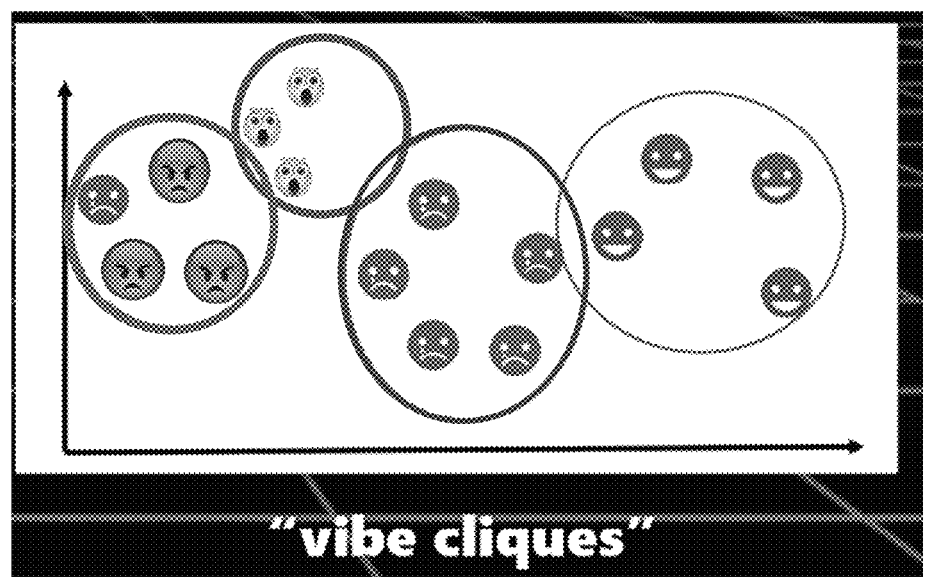
FIG. 16 illustrates sample vibe cliques defined by the sentiment surfacing engine, in accordance with one implementation of the disclosure.

FIG. 16 illustrates a simple representation of a temporal graph of vibe cliques that are generated by clustering similar vibes, in one implementation. The vibe cliques illustrated in FIG. 16 provide a visual representation of the number of vibe cliques generated for the different vibes detected from the spectators for a specific time in the video game when changes in the emotions were detected. For example, the temporal graph may be plotted with the timeline of gameplay along an x-axis and the constitution of the vibe clique (and the corresponding confidence score along the y-axis. The timeline identifies specific time when an event occurred during gameplay of the video game that caused changes in emotions of the spectators. The changes detected in the gameplay of the video game may or may not cause changes in the constitution of the vibe cliques. In some implementations, when the number of emotions identified from the interactions of the spectators is too many, the sentiment surfacing engine 304 may cluster vibes that are similar in nature into a single vibe clique. In alternate implementation, each vibe identified from the spectators are used to generate a corresponding vibe clique and the sentiment surfacing engine 304 selects a predefined number of vibe cliques with highest probability score to represent using avatars. In the example illustrated in FIG. 16, four vibe cliques are defined to include four different types of vibes, whereas in reality there could be more than four vibe cliques defined from the emotions of the spectators.

Figure 17:
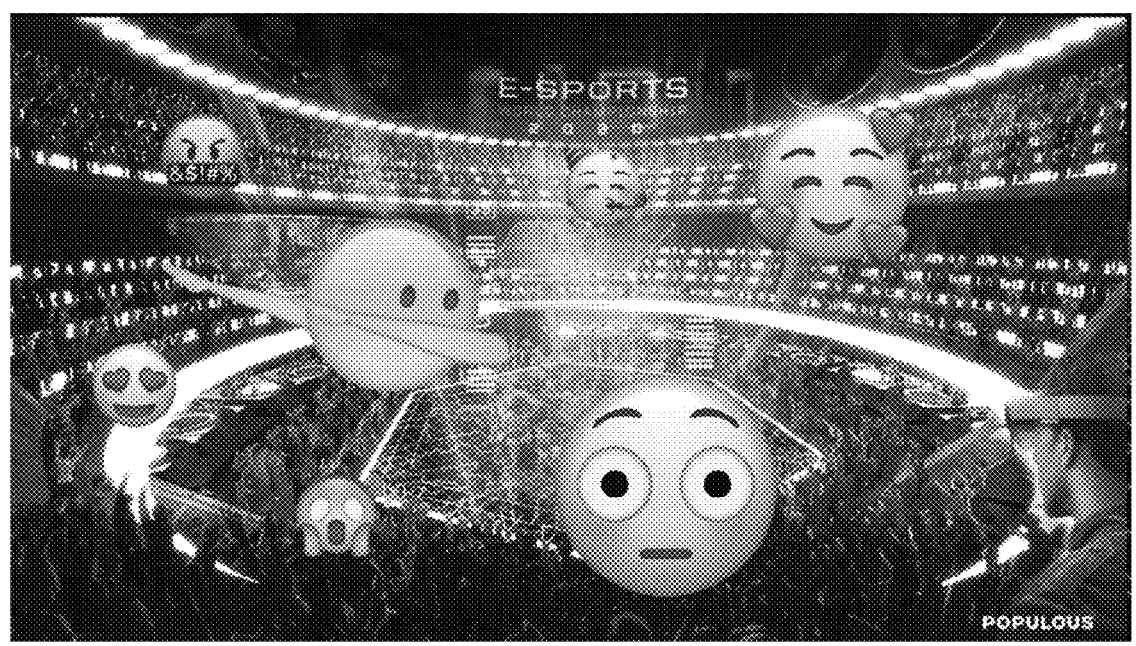
FIG. 17 illustrates sample avatars/emojis representing the emotions of the different vibe cliques presented for the audience of spectators, in accordance with one implementation of the disclosure.

FIG. 17 illustrates a sample view of a representative image of an audience over which images of expressive avatars are overlaid, in one implementation. The expressive avatars represent different emotions that were identified from the interactions of the spectators. The size, color and other features of the avatars representing each emotion are scaled/adjusted to provide an appropriate visual representation of the various emotions detected from the spectators, the number of spectators that express each identified emotion, the associated vibe rating of each emotion, etc. In one implementation, the spectators in the audience may be associated with different geo locations and the spectators in each geo location may be associated with specific emotion. For example, spectators in geo locations 1 may be associated with or follow player 1 or team 1, spectators in geo locations 2 may be associated with or follow player 2 or team 2, etc. Consequently, the spectators supporting each player or team may express similar emotions. In this example, the avatars representing different emotions (i.e., vibes) may be rendered on a map with each avatar representing a particular vibe rendered over a geo location that corresponds with the spectators associated with the vibe clique of the particular vibe. The expressive avatar provides a visual view of the various emotions expressed in the audience and allows a spectator to identify and join a group of spectators (i.e., vibe clique) whose emotions align with their own emotions, providing the spectators with a feeling that they are hanging out with their friends or like-minded spectators when watching the gameplay of the video game.

In one implementation, once the vibe cliques are formed, expressions of the spectators included in each vibe clique are monitored to detect any changes in the expressions. The expressions of the spectators may change based on current game state of the gameplay of the video game, which is influenced by game events and interactions of the players. As the players score or lose points or game prizes or game life, etc., the spectators' emotions may change to reflect their emotions toward the player, toward the result of gameplay, etc. In addition to in-game changes, the emotions of the spectators may also be influenced by other spectators reactions to the gameplay, players comments or actions during gameplay, other spectators reactions to the reactions/interactions of the spectators, etc. The sentiment surfacing engine 304 monitors the changes in the emotions of the spectators in each vibe clique and adjusts the emotions of the avatars of the respective vibe cliques dynamically to reflect the current emotion of the group of spectators included in the vibe clique.

In one implementation, the confidence score identifying the number of spectators in each vibe clique expressing the emotion of the vibe clique may change over time. This may be due to some spectators in the group forming the vibe clique leaving the group or new spectators joining the group. The new spectators may be joining a first group (i.e., first cluster) from a second group (i.e., second cluster) representing a different vibe clique or vice versa. Alternatively, new spectators may be joining to watch the gameplay of the video game. In some implementations, some of the spectators may join the first group just to get a feel for the emotions and interactions expressed by the spectators of the first group. Options may be provided on a user interface alongside the content of the video game and the image representation of the audience to spectators of the first group to provide permission for the spectators from different groups (e.g., second group, third group, etc.) to join the first group. Additional options may be provided to the spectators of other groups (e.g., second group, third group, etc.) to request to join the first group. When the request is accepted by the first group or based on the settings of the first group, the spectators from the second, third, etc., groups may be allowed to join the group. This may be akin to a spectator hanging out with their friends who may be supporting different teams while watching a live game played in a stadium, for example. When a spectator from the second group, or the third group, etc., elect to join the first group, the spectator is automatically detached or disassociated from the second or third group, and attached to or associated with the first group. Similar association and disassociation may be envisioned when the spectators from the first group elect or request to join the other groups.

In one implementation, associating a spectator to a group allows the spectator to access the interactions of the spectators of the group. Similarly, disassociating the spectator from a group results in the spectator being prevented from accessing the interactions of the spectators of the group from which the spectator was disassociated. Providing this option allows the spectators to feel the vibes of not only the spectators of their own vibe clique but also the vibes of other spectators of different vibe cliques. In another implementation, spectators within a cluster are allowed to interact with other spectators within the cluster and access the interactions of other spectators within the cluster. In this implementation, the spectators of a first cluster are not allowed to interact with spectators of other clusters and do not have access to the interactions of spectators of the other clusters.

In one implementation, an interactive temporal graph may be generated and presented to the spectators in the audience to indicate reaction intensities of different emotions expressed by or detected from the spectators of the video game. FIG. 16 illustrates one such example. The reaction intensities of different emotions may vary based on the changes occurring in the gameplay of the video game. In one implementation, the reaction intensities captured in the interactive temporal graph are linked to particular portions of the gameplay of the video game so that a spectator may be able to visualize the reaction intensities expressed for a particular emotion in the temporal graph and correlate it to specific changes occurring in the gameplay of the video game (e.g., an event). In some implementations, the spectator may be able to click on any one of the vibe cliques included in the temporal graph for a specific time and the spectator may be able to view the gameplay of the video game that corresponds with the reaction intensities of the particular vibe clique represented in the temporal graph for the specific time. The interactive temporal graph may be in addition to or may be in place of the avatars that are presented over the image representation of the audience rendered alongside the content of the gameplay of the video game. The temporal graph may be generated during the live streaming of the gameplay of the video game and may also be stored in the gameplay datastore 332 for subsequent retrieval and presentation. Alternatively, the temporal graph may be stored in the sentiment database 334 with the word cloud and the vibe cliques identified from the spectator interactions. When the video game is replayed (i.e., content streamed at delayed time), the stored temporal graph may be retrieved and presented to the spectators watching the delayed replay of the video game. As the spectators interact or react to different events or actions occurring in the gameplay of the video game during replay, a new temporal graph may be generated to include data from the stored temporal graph and the additional reactions identified from the interactions of the spectators watching the delayed replay of the video game. The new temporal graph is stored in either the gameplay datastore 332 or in the sentiment database 334 and retrieved as and when the video game replay is rendered to spectators.

In one implementation, selection of a particular time on the temporal graph causes the sentiment surfacing engine 304 to query a buffer that holds gameplay data of the video game and retrieve the particular gameplay data to determine the overall emotions of the audience at the particular time or determine the different reactions that occurred at the particular time. The temporal graph may be generated separately for each emotion or a single temporal graph may be generated for the different emotions identified in the audience. In the case where the temporal graph is generated for each emotion, there may be a plurality of temporal graphs generated, one for each emotion. The generated temporal graph for each motion may be rendered alongside the avatar of the respective emotion, or as a thumbnail at a bottom of a display screen of the client device.

In some implementations, the emotions that are identified for rendering the avatars, reaction tracks and temporal graph is a probabilistic kind of representation, wherein only select ones of the emotions that are dominating are used. The dominating ones of the emotions are determined based on probability score of emotions expressed by the spectators through facial features and confidence score of the vibe cliques.

In some implementations, the temporal graph may be represented as a line graph. In this implementation, the line graph may include graph lines to represent different emotions, with each emotion being represented by a different graph line. In some implementations, an avatar capturing an emotion represented by a graph line may be rendered alongside or overlaid over the corresponding graph line to provide a visual indication of the emotion that corresponds to that graph line. The line graph and the temporal graph illustrated in FIG. 16 are some examples of illustrating the emotions that are detected from the spectators in the audience of spectators and that other forms of visually representing the emotions of the audience may also be envisioned.

In some implementations, presenting the avatars at the client devices of the spectators may include providing a user interface with a segmenting option for the spectators to choose for rendering the avatars. The spectators may wish to view the emotions of the audience at specific location on the screen and not crowd the screen that is rendering the content of the video game or hinder rendering of other content. In these implementations, the avatars may be rendered on their own or may be rendered over an image representation of the audience. The display screen may be segmented into a plurality of segments (e.g., lower half, upper half, left side, right side, etc.), and the segmenting options may include these segments for each spectator to choose for rendering the avatars. In addition to identifying the segments, options for rendering the avatars on their own or over an image representation of the audience, and options formatting the avatars may also be provided to each spectator for selection. Based on the selection of each spectator, the avatars representing the different emotions detected in the audience may be rendered in the specified segment over or without the image representation of the audience. The segmenting option provides a certain level of autonomy for the spectators to visualize the emotions of the spectators in the audience while having the ability to view the gameplay of the video game unhindered.

In addition to rendering options, one or more formatting options may be provided at the user interface for the spectators to select from render the expressive avatars. Some of the formatting options that may be included in the user interface for spectator selection include transparency format, an overlay format, or a presentation format. Of course the aforementioned formatting options are provided as mere examples and should not be considered restrictive. Other formatting options may also be included. The avatars may be rendered in accordance to the formatting option and the segment option selected by each spectator, wherein the avatars are rendered on their own or over the image representation of the audience.

In one implementation, in addition to generating avatars and adjusting emotions of the avatars, the sentiment surfacing engine 304 may identify a specific one of the spectators in each group (i.e., vibe clique), capture the reactions of the specific spectator during defining game moments and render the captured reactions alongside the content of the video game to provide reaction highlights. In this implementation, a video of the reactions of the specific spectator identified for a vibe clique may be presented in place of the expressive avatar. In other implementations, the reactions of the specific spectator may be provided in addition to the expressive avatar for the vibe clique. The specific spectator may be identified based on the type and number of comments the reactions of the specific spectator garnered from other spectators in the group or from other groups.

In one implementation, the reactions of the specific spectator of a particular vibe clique may be captured and presented by first identifying an action that is scheduled to occur in the gameplay of the video game. The action may be identified using the current game state of the video game and from the game logic of the video game. The specific spectator from among the spectators in the group (i.e., vibe clique) may be identified based on the type and amount of reactions the specific spectator provided to different actions that occurred in the current gameplay of the video game or during prior gameplay of the video game. Based on this information, the sentiment surfacing engine 304 may predictively send a signal to the one or more image capturing devices used to capture the live video of the spectators to zoom in on the specific spectator to capture their reactions during the occurrence of the identified actions. The captured video of the specific spectator is dynamically analyzed and presented with or in place of the expressive avatars generated for the particular vibe clique. In alternate implementations, the specific spectator of a particular group may be identified based on the type and amount of comments related to the expressions of the specific spectator garnered from the remaining spectators in the particular group (i.e., vibe clique). In some implementations, one or more spectators of specific ones of the vibe cliques may be selected for presenting their expressions captured during live video streaming In alternate implementations, each vibe clique may identify specific one of the spectators and present the expressions detected from the specific spectator. In such implementations, the specific spectator may be identified based on reactions of other spectators in the respective group of spectators reacting to the reactions of the specific spectator. In alternate implementations, the specific spectator may be chosen randomly.

The various implementations discussed herein allow a spectator to view the various reactions of the audience and allow the spectator to associate with specific group of spectators. The specific group of spectators may be friends with whom the spectator desires to watch the online gaming of the video game. The friends may or may not be expressing the same emotions (i.e., may or may not be supporting the same player or team). Irrespective of the player or team each spectator supports and irrespective of the emotions expressed by the spectator and their friends, the implementations provide the spectators with ways to socialize with their friends while simultaneously be informed of the general vibe in the audience of the online video game. In one implementation, a spectator clustered into a vibe clique may elect to stay in the vibe clique or may elect to leave the vibe clique and join another vibe clique. Option may be provided to the spectator to request to join another vibe clique or to select another vibe clique to join. In this implementation, the option allows the spectator to override the clustering provided by the sentiment surfacing engine 304 and join a vibe clique of their choice. The option may identify the different vibe cliques of the audience and allow the spectator to select the vibe clique they want to join. The selection may be through drag and drop of an icon or an image of the spectator from a first vibe clique to a second vibe clique, or may be via radio buttons, checkboxes, etc. The option to move from one vibe clique to another provides the spectator with ways to experience the vibe of the second vibe clique. It should be noted that the interaction data generated by spectators of each vibe clique is shared with the spectators of that vibe clique and not with spectators of other vibe cliques. In alternate implementations, select ones of the interaction data of each vibe clique may be shared with spectators of other vibe cliques. In this implementation, the interaction data shared with other vibe cliques may be to instigate the spectators of other vibe cliques into reacting in certain manner similar to being in a stadium with fans of opposing teams.

In alternate implementations, instead of allowing the spectators to move from one vibe clique to another, the sentiment surfacing engine 304 may gather reaction highlights from a particular vibe clique and share the highlights with other vibe cliques. The sharing of the reaction highlights may be done for a particular event or action and may be shared for a predefined period of time. Reactions of the spectators in the other vibe cliques in response to the reaction highlights of the particular vibe clique may also be used by the sentiment surfacing engine 304 to update the avatars and the reaction tracks associated with each vibe clique. In some implementation, an announcer avatar may be generated to moderate the reactions of the spectators in the different vibe cliques, wherein the moderating may include providing reaction highlights of a particular vibe clique in order to goad the spectators in the other vibe cliques to respond to the reaction highlights, provide reaction highlights from the other vibe cliques reacting to the reaction highlights to the particular vibe clique, and providing commentary capturing the reaction highlights and counter-reaction highlights to show the back and forth bickering of the spectators of the different vibe cliques. Similar to the announcer avatar, a cheerleader avatar may be generated for each vibe clique to cheer the player(s) and spectators supporting the player(s) of a vibe clique. In one implementation, the announcer avatar and the cheerleader avatar may be generated by artificial intelligence (AI) as AI robots, wherein the actions of the announcer and cheerleader avatars are controlled using machine learning algorithm. The announcer and cheerleader avatars may be used to encourage the player as well as the spectators during gameplay, including goading the spectators, encouraging the players, intervening to temper down the reactions of the spectators in the different vibe cliques, especially when the reactions from the spectators border on bullying or abusive in nature.

Figure 18:
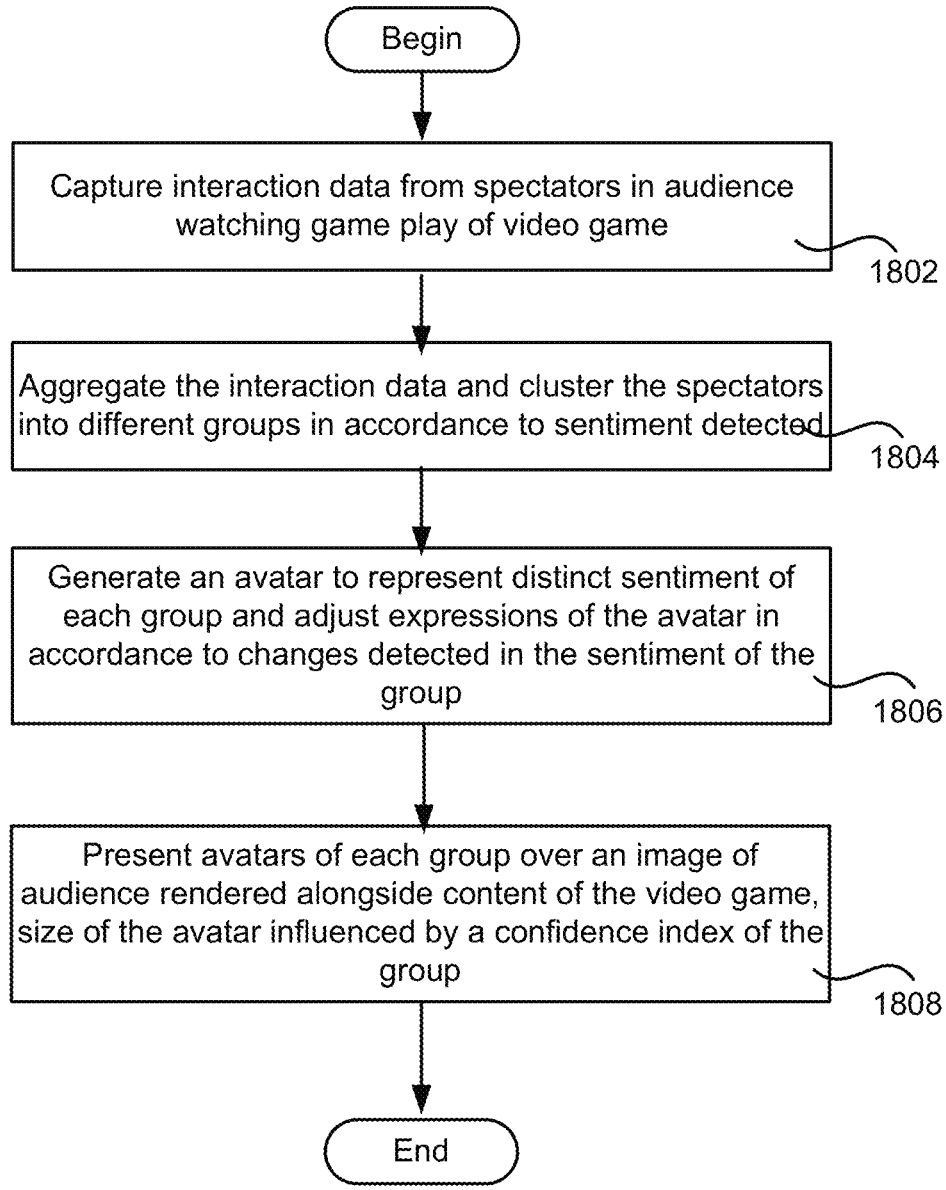
FIG. 18 illustrates method operations for identifying emotions expressed by spectators and presenting avatars representing the emotions alongside content of the video game, in accordance with one implementation of the disclosure.

FIG. 18 illustrates a method for surfacing emotions of an audience of spectators watching a gameplay of a video game, in one implementation. The spectators, in this implementation, may be watching a live gameplay of the video game. In other implementation, the spectators may be watching a replay of the gameplay of the video game. In one example, operation 1802 may be configured to capture interaction data from spectators in the audience watching gameplay of the video game. The interaction data may include expressions on the spectators face as they are watching the gameplay captured by one or more image capturing devices or may be interactions generated by the spectators, such as audio, text, memes, GIFs, emojis, etc., via interaction interface such as a chat interface, message board, social media interface, or audio captured via microphones or other audio detection and/or recording devices. The image capturing devices may be cameras or other image capturing devices that are part of the client device, such as mobile computing device (e.g., phone, laptop computer, tablet computing device, etc.), or may be external image capturing devices that are communicatively connected to the client devices. The images of the spectators are captured as live video by the image capturing devices and are transmitted to the sentiment surfacing engine 304 executing on the game cloud server 300. The images include facial features that are used to determine the emotions detected from the spectators while they are watching the online gaming of the video game. Similar to the live video of the spectators, the interactions provided via the interaction interface are also transmitted to the sentiment surfacing engine 304.

The method flows to operation 1804 where the sentiment surfacing engine 304 aggregates the emotions identified from the interaction data received from the spectators and clusters the spectators into different groups in accordance to the emotions detected from the different spectators. In one implementation, the images of the spectators from the live video are cropped to retain only the facial features and each facial feature and combination of the facial features are analyzed using machine learning algorithm to determine the emotions detected from the spectators. Keywords expressing the emotions are identified from the text content included within the chat content and/or audio content, by the machine learning algorithm. The other interaction data, such as the memes, gifs, emojis, etc., provided via interaction interface are also analyzed in a manner similar to the images of the spectators from the live video, using machine learning algorithm, to identify keywords that define the emotions. The emotions and emotion related keywords identified from various interactions (images from live video, text, emojis, memes, GIFs, graphics, etc.) of each spectator are aggregated. The aggregated emotions and the emotion related keywords are evaluated to define similarity scores for each emotion. The similarity scores are used to determine the dominant emotions and the spectators providing the emotions and the emotion related keywords are then clustered into groups (i.e., vibe cliques) in accordance to the emotions identified from the interactions of each spectator, such that each group is associated with a distinct emotion. Confidence score for the group (i.e., vibe clique) is computed based on the number of spectators that are expressing the emotions of the group.

The method flows to operation 1806, where the clustering information is used to generate avatar for each group. The avatar for each group expresses the distinct emotion associated with the group. Once a group is formed and the avatar is generated for the group, the expressions of the avatar are adjusted in accordance to changes detected in the emotions of the group. The emotions in the group may change based on the changes occurring in the gameplay of the video game. For example, a group supporting a first team may express emotion that is based on the gameplay of the first team, etc. Changes in the expressions and other interaction data are captured and used to adjust the expression of the avatar of each group. The changes may result in the avatar previously exhibiting negative vibe to begin exhibiting positive vibe or vice versa. Consequently, the features of each avatar is further adjusted to include changes to features, such as color, size, etc., based on the changes in the emotion detected from the spectators in the group and based on the confidence score of the group. In some implementations, the confidence score of the group may change based on spectators leaving the group or new spectators joining the group. As a result, the size of the avatar may dynamically change accordingly to reflect the number of spectators expressing the emotion of the group.

The method concludes with operation 1808 where the generated avatars for the different emotions exhibited by the spectators are presented over an image representation of an audience rendered alongside content of the video game. The size of each of the avatars is dynamically scaled in accordance to the confidence score of the respective group associated with the avatar. The scaled avatars provide a visual representation of the emotions of the audience, allowing the spectators to gauge the various emotions and the level of dominance of each emotion of the audience. It allows the spectators to determine how their reaction compares with the reactions of other spectators and to find a group of spectators that align with their own emotions. The avatars also allow the gaming players to gauge feedback to specific interactions during gameplay.

The various implementations provide a way for a remote spectator to feel the vibes of the crowd and to react to the gameplay that can be shared with other users, allowing them to feel that they are physically together with a group of spectators watching the online gaming Although the various implementations have been described with reference to spectators viewing online gaming (i.e., live gameplay of the video game), the implementations can be extended to include replay of the video game, wherein all the interactions from the spectators viewing the replay may be similarly harvested and used to adjust the expressive avatars of the different groups of spectators viewing the replay.

Figure 19:
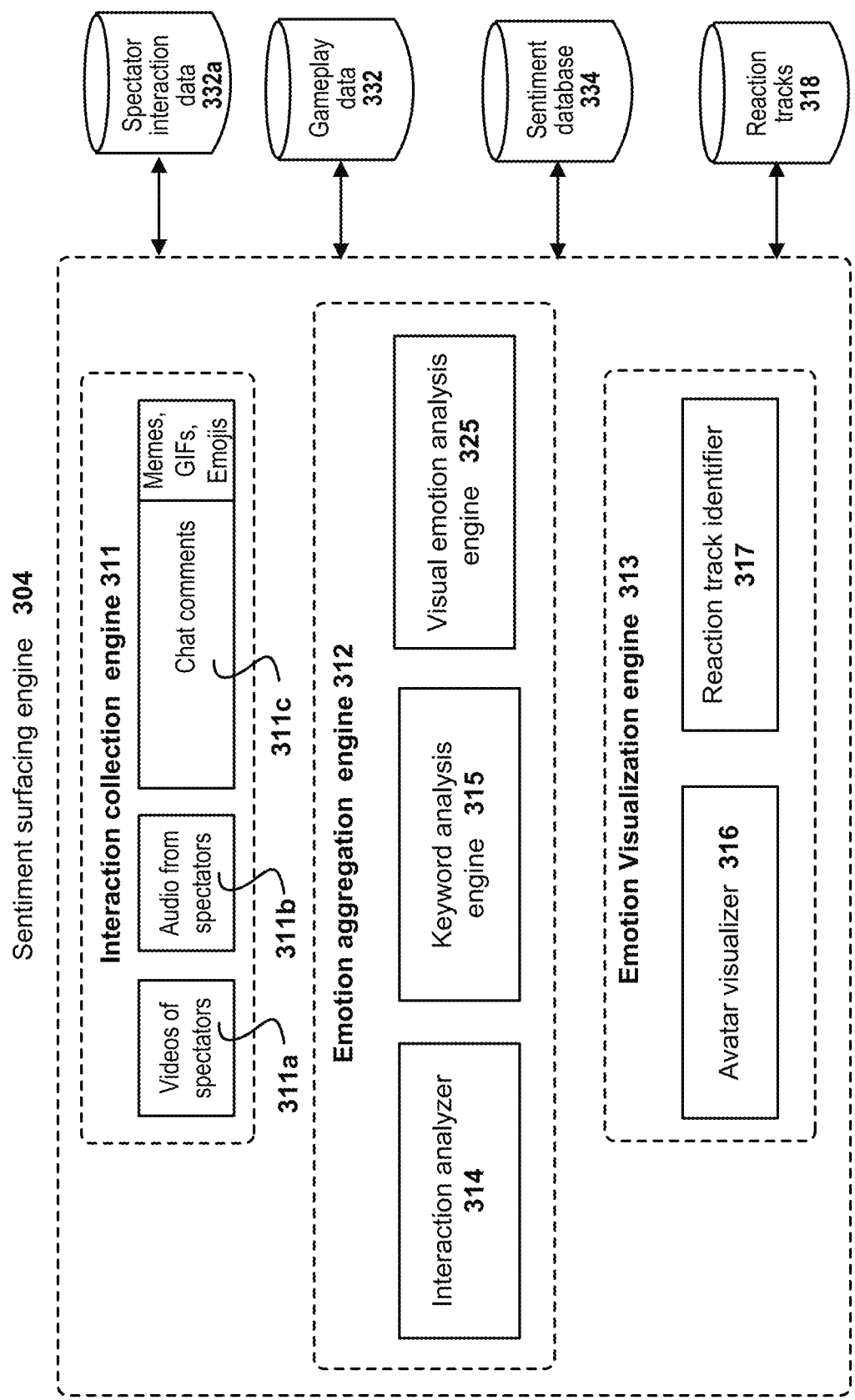
FIG. 19 illustrates a variation of the different components of the sentiment surfacing engine used to perform different phases of processing of the interaction data to generate and present avatars representing the different emotions and to identify appropriate reaction tracks for presenting at the client devices, in accordance with one implementation of the disclosure.

FIG. 19 illustrates a variation of the components of the sentiment surfacing engine 304 illustrated in FIG. 4, in one example implementation. The various components of the sentiment surfacing engine 304 are used to collect interaction data associated with the spectators, analyze the interaction data to determine different emotions, cluster the emotions into different vibe cliques and create avatars for the different vibe cliques. In addition to the avatars, the components of the sentiment surfacing engine 304 are used to identify reaction tracks for rendering to the audience of spectators. Most of the components included in the sentiment surfacing engine 304 of FIG. 19 are similar to the components that were identified in FIG. 4, and so have not been described in detail with reference to FIG. 19 as the components that are common to both FIGS. 4 and 19 function in a similar manner In addition to the common components, the sentiment surfacing engine 304 of FIG. 19 includes a reaction track identifier 317 within emotion visualization engine 313. The reaction track identifier 317 is used to identify, retrieve and include a reaction track that corresponds with the emotion expressed in each vibe clique, with the content of the video game returned to the client devices of spectators. The reaction track identifier 317 may use the emotions identified by the emotion aggregation engine 312 to determine the emotions expressed by the spectators of the audience and to identify and retrieve appropriate reaction tracks from a reaction tracks database 318.

In some implementations, the reaction track identifier 317 is used to identify reaction tracks for only those emotions that are being represented by the avatar visualizer 316. As noted above, the avatar visualizer 316 may select certain ones of the emotions identified in the audience to create the avatars and the reaction track identifier 317 is engaged to identify the reaction tracks for the emotions represented by the avatars created by the emotion visualization engine 313. The reaction track identifier 317 may query the reaction track datastore 318 and retrieve the appropriate reaction track for each emotion represented by the avatars. The reaction track datastore 318 may include reaction tracks for different content, for different events or actions or activities within each content, and for different emotions. The reaction tracks within the reaction track datastore 318 may be organized by type of content, events or actions or activities within each content, context of events, and emotions. As the emotions expressed by the spectators in each vibe clique may change over time based on changes detected in the gameplay of the video game, the expression on the avatars of each vibe clique are dynamically being adjusted to correspond with the changes in the gameplay. In response to the changes in the expressions of the avatar associated with each vibe clique, a different reaction track is identified for the respective vibe clique, so as to correlate with the current emotion of the spectators in the respective vibe clique.

In one implementation, the reaction track identifier 317 may use the gameplay data of the video game stored in the gameplay datastore 332 to determine the context of an event or action or activity within the gameplay of the video game that caused the changes in the emotion of the spectators in each vibe clique. The context and the event/action/activity data may be used to identify an appropriate reaction track to return to the spectators. The reaction track identifier 317 may also use the interaction data in the spectator interaction datastore 332a to determine the changes in the context of the reactions identified from the spectators, wherein the reactions may be expressions captured from images of facial features or verbal interactions captured using audio recording devices or interactions captured from the interactive interface, such as chat interface, message board, social media interface, etc. Alternatively or additionally, the reaction track identifier 317 may identify the appropriate reactions tracks by querying the sentiment database 334 to identify the current emotion of each vibe clique identified in the audience of spectators and querying the reaction tracks datastore 318 to retrieve the appropriate reaction track for the current emotion of each vibe clique. The sentiment database 334 is a repository for storing the various emotions identified in the audience at different times of gameplay of the video game, avatars created for each vibe clique identified in the audience of spectators of the video game, and all the changes that were done to the expressions of the respective avatars based on the changes captured from the spectators (either through expressions, verbally or through interactions via interactive interface) during the gameplay of the video game.

In one implementation, the reaction track identified for each vibe clique detected in the audience of spectators for the video game may be based on the current context of the gameplay of the video game. The current context depends on the one or more events or activities occurring in the gameplay of the video game, which can depend on the actions performed by the player(s) of the video game. As a result, the reaction track for each vibe clique may be identified to correspond with the context of the gameplay of the video game as it relates to the spectators of the vibe clique.

The reaction tracks retrieved from the reaction track datastore 318 for the different vibe cliques are returned to the client devices of spectators for rendering with the generated and updated avatars. In one implementation, the reaction track of each vibe clique is presented with the corresponding avatars to the spectators of the audience. In this implementation, the avatars and the reaction tracks expressing the different emotions are presented to all the spectators of the audience. The reaction tracks of the various emotions, in this implementation, provide aural representation of the actual vibes while the avatars provide the visual representation of the emotions of the spectators in the audience reacting differently to events or actions occurring in the gameplay of the video game making the spectators feel like they are actually in an arena or stadium watching and reacting to actions of a live sporting game with their own friends and fans of the sporting game.

In alternate implementation, the spectators of each vibe clique may be provided with the avatar and reaction track for the specific emotion expressed by the spectators of that vibe clique. In this alternate implementation, the spectators of each vibe clique see the avatar expressing the emotion of the vibe clique and experience the reaction track for the specific vibe clique and not the avatars or reaction tracks of other vibe cliques. This implementation may be provided as an option for spectators of different vibe cliques to select in order to reduce the crowding of the content rendered at the client devices of the spectators of each vibe clique and/or to avoid overwhelming the spectators with the reaction tracks of other vibes in the audience. In yet another implementation, the reaction track of the most dominant emotion (i.e., sentiment) is identified, retrieved and presented at the respective client devices of each of the spectators. The most dominant emotion is identified based on the confidence score associated with each vibe clique. In this implementation, the spectators of each vibe clique may be presented with the expressive avatar for the emotion associated with the vibe clique and the reaction track representing the dominant emotion is presented to all the spectators of the audience to indicate the dominant emotion expressed by the spectators in the audience. Alternatively, the avatars representing all the emotions identified in the audience may be presented to all the spectators and the reaction track of the dominant emotion presented to all the spectators of the audience.

In one implementation, options may be provided on a user interface for the spectators to select on how they want to experience the reaction tracks identified for the audience of the online gaming of the video game in which they are a member or which they are viewing at delayed time. The selection options may be provided to allow each spectator to customize the rendering of the reaction tracks identified for the audience at their own client devices. For example, the selection options may include a first selection option for rendering the reaction tracks identified for all the emotions expressed in the different vibe cliques identified for the audience, a second selection option for rendering the reaction track of the most dominant emotion of the audience, a third selection option for rendering only the reaction track for the emotion expressed in the vibe clique associated with the spectator, etc. Similar selection options may also be provided to the spectators for selecting the avatars for rendering at the client devices. Spectator selection of a selection option is detected and used by the emotion visualization engine 313 to identify and render the appropriate reaction tracks alongside the avatar and the content of the video game at the respective client devices. Further, the rendering of the avatar and the reaction track may be based on the segmenting option and the formatting option selected by the spectator. Rendering of the reaction tracks alongside the content of the video game allow the spectators to experience the camaraderie that exists in the audience and encourage the spectators to become involved in the gameplay of the video game. In some implementations, the reaction tracks capture the spectators' reactions to not only the events occurring in the video game but also the counter-reactions of other spectators' in response to reactions of specific one(s) of the spectators.

Figure 20:
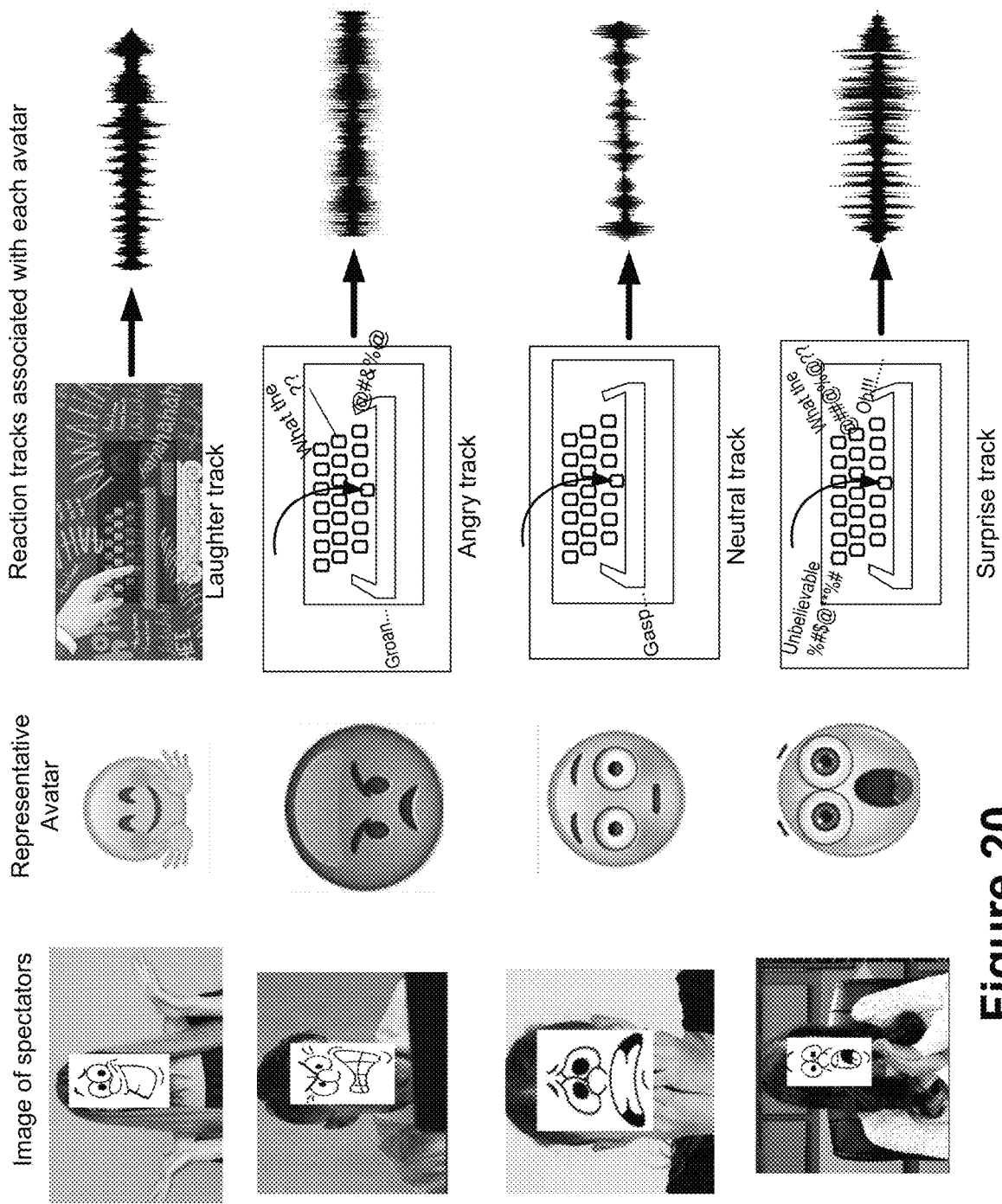
FIG. 20 illustrates an example of reaction tracks identified for the different emotions expressed by the spectators watching online gaming of a video game, in accordance with one implementation.

FIG. 20 illustrates an example of the various reaction tracks identified for the emotions expressed by the spectators in the audience, in one implementation. The images of the spectators captured by image capturing devices are analyzed to identify the emotions of each spectator. Although only images from the live video of the spectators are shown to identify the emotions in FIG. 20, it should be noted, as was previously described with reference to FIGS. 5-7, that the audio of the spectators and the interaction data provided by the spectators via interactive interface are also analyzed in a similar manner to identify the emotions expressed by the spectators of the audience. The spectators of the audience are clustered into vibe cliques and an avatar is created for each vibe clique to correspond with the emotions expressed by the spectators of the respective vibe clique. In the example illustration of FIG. 20, four different vibe cliques are identified, wherein the vibe cliques correspond to laughter, angry, neutral, and surprise emotions (i.e., vibes). Once the vibe cliques have been identified, a reaction track to correspond with the emotions of each vibe clique is identified. FIG. 20 illustrates the reaction tracks identified for the emotions identified for the different vibe cliques. As the emotions of the spectators in each vibe clique change over time due to changes detected in the gameplay of the video game, the reaction track identified for each vibe clique also changes to correspond with the changes identified in the emotions of the vibe clique. As with FIGS. 9, 13, 14 and 15, in the example illustration of FIG. 20, graphical overlays have been provided over the actual faces of the spectators captured in the images of the spectators in order to protect privacy of the spectators, whereas in reality facial features from the actual faces of the spectators captured in the images of the live video are used in determining the emotions.

Figure 21:
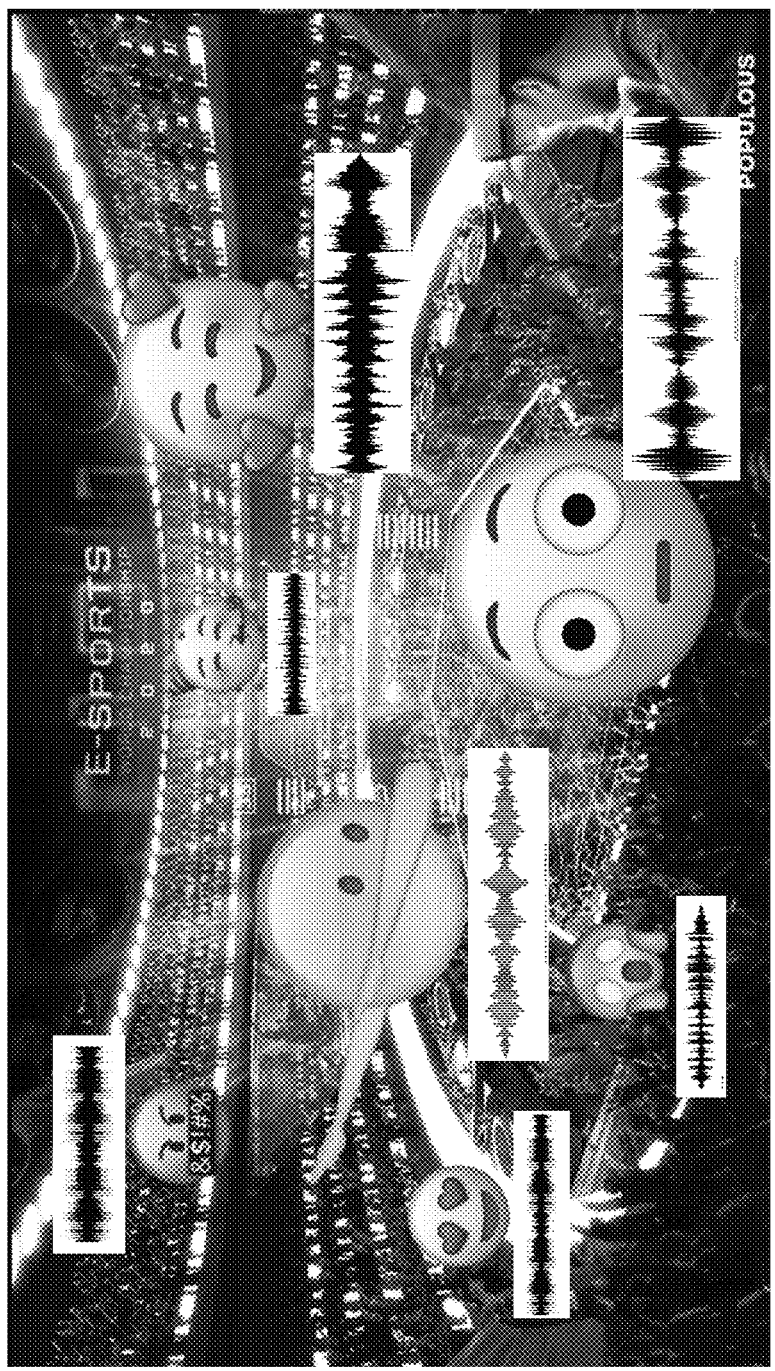
FIG. 21 illustrates an example image representation of an audience of spectators with expressive avatars and the corresponding reaction tracks rendered for the vibe cliques identified in the audience, in accordance with one implementation.

FIG. 21 illustrates an example of the reaction tracks identified and presented with the expressive avatars over a representative image of an audience, in one implementation. In one implementation, a volume of the reaction track for each vibe clique is adjusted to match the size of the avatar, which corresponds to the confidence score associated with the corresponding vibe clique. As the size of an avatar rendered over the representative image of the audience corresponds to the number of spectators in the vibe clique (i.e., confidence score of the vibe clique) that are expressing the emotion associated with that avatar, the volume of the reaction track is adjusted to correlate with the number of spectators associated with the vibe clique. The reaction tracks for the various vibe cliques shown in FIG. 21 are represented in varying sizes to visually indicate the relative volume at which each of the reaction tracks is rendered at the client devices of the spectators. For instance, the reaction track of the most dominating emotion (i.e., the vibe clique with the largest sized avatar) is rendered bigger than the reaction track of a less dominating emotion in order to indicate that the volume of the reaction track for the dominating emotion is rendered louder than the less dominating emotion. Varying the volume of the reaction track provides the spectators with a realistic representation of the emotions of the audience.

The number of spectators in each vibe clique may change based on spectators leaving the vibe clique or new spectators joining the vibe clique. As a result, the size of the avatar and the volume of the reaction track for the respective vibe clique are dynamically adjusted to correspond with the size of the vibe clique associated with each emotion. FIG. 21 illustrates a visual example of the reaction tracks presented with the corresponding avatars for the different vibe cliques, The size of the reaction track rendered alongside each avatar corresponds to the volume at which the respective reaction track is rendered, wherein the volume of the reaction track correlates with the size of the corresponding avatar rendered over an image of the audience. In the implementation of FIG. 21, the reaction track of each vibe clique is provided for rendering to allow the spectators to feel all the vibes identified in the audience.

Figure 22:
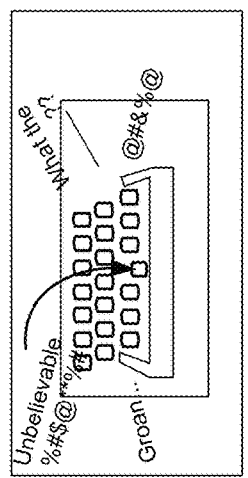
FIG. 22 illustrates an example representation of vibe cliques formed for the different emotions expressed by the different spectators in the audience watching online gaming and the corresponding reaction tracks that are presented with the corresponding avatar for the spectators of each vibe clique, in accordance with one implementation.
Figure 22:
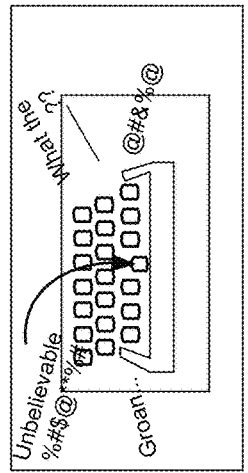
Figure 22:
Figure 22:
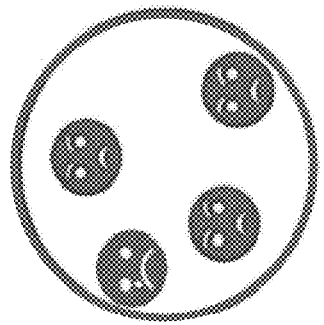
Figure 22:
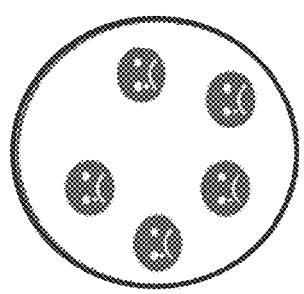
Figure 22:
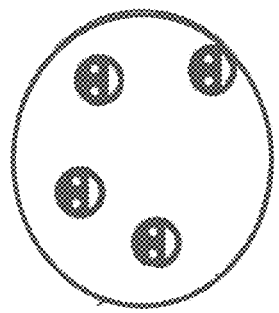

FIG. 22 illustrates an example wherein each vibe clique identified in the audience is associated with a corresponding reaction track and the reaction track for each vibe clique is included with the corresponding avatar for presenting to the spectators of the respective vibe clique, in one implementation. In this implementation, the spectators of each vibe clique are presented with the corresponding avatar and the reaction track of the vibe clique in which the spectators are members and not the avatars and the reaction tracks of all the vibe cliques identified in the audience. The presenting of the vibe clique specific avatar and the reaction track may be driven by the selection option chosen by the spectators of the respective vibe clique and the presentation may vary from spectator to spectator and from vibe clique to vibe clique. For instance, the spectators of a certain one of the vibe cliques may opt to receive the avatar and the corresponding reaction track for their own vibe clique while the spectators of the remaining ones of the vibe cliques may opt to receive the avatars and the reaction tracks for all the emotions identified for the audience. In yet another implementation, certain ones of the spectators within a specific vibe clique may opt to receive the avatar and the reaction track associated with the specific vibe clique while the remaining ones of the spectators within the vibe clique may opt to receive the avatars and reaction tracks for all the emotions identified in the audience. The emotion visualization engine 313 detects the selection option(s) chosen by the spectators of the different vibe cliques and identifies and presents the avatar(s) and the reaction track(s) in accordance to the selection option(s) chosen by the spectators of the different vibe cliques.

Figure 23:
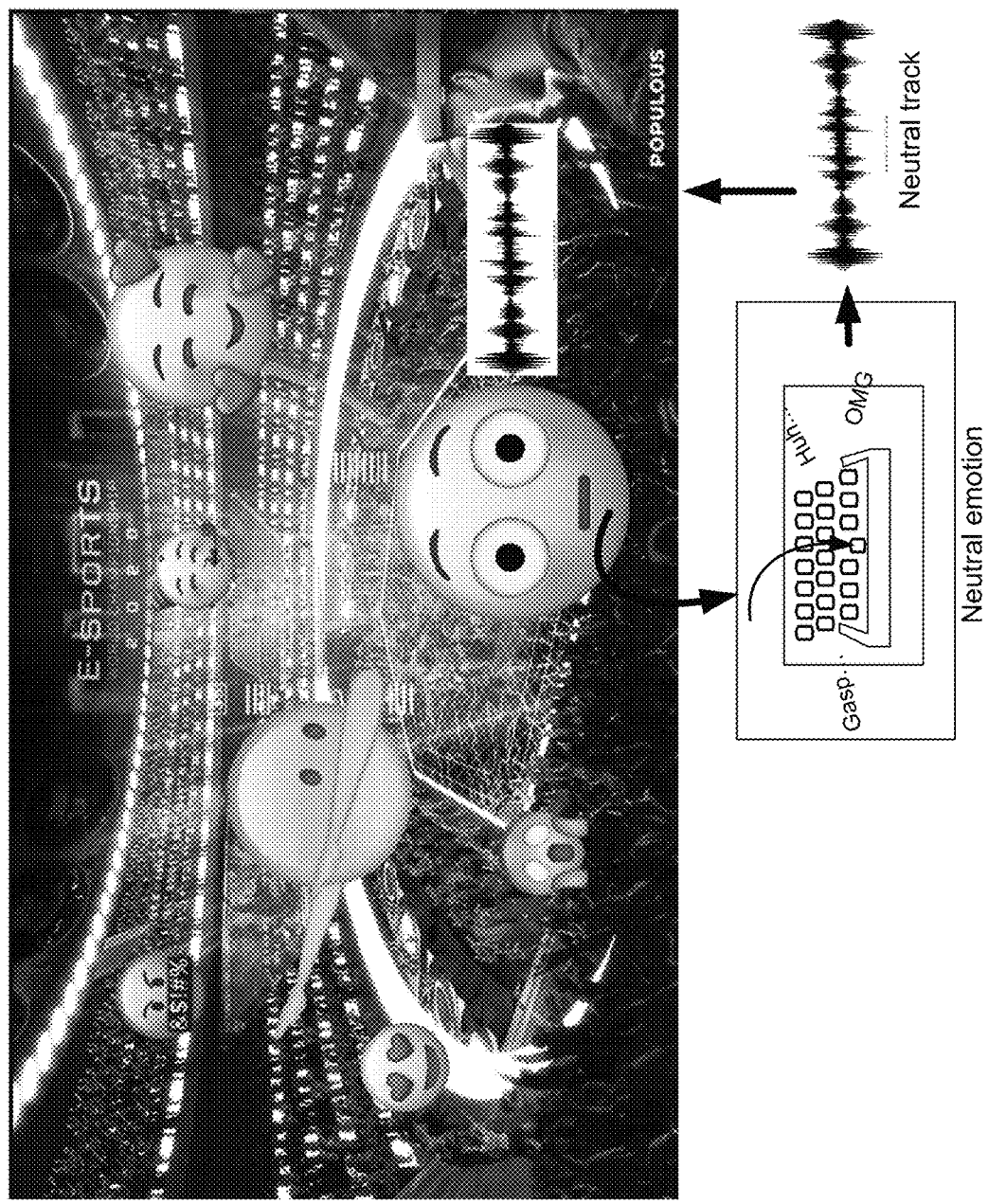
FIG. 23 illustrates an example representation of presenting reaction track of a dominating emotion alongside an avatar representing the dominating emotion within an audience of spectators, in accordance with one implementation.

FIG. 23 illustrates an example representation of a reaction track associated with a dominating emotion being rendered with a corresponding expressive avatar over an image representation of an audience, in one implementation. The avatar visualizer 316 of the emotion visualization engine 313 identifies each emotion expressed by the spectators in the audience for which an avatar is to be created and provides the avatars for the identified emotions. The reaction track identifier 317 uses the emotions associated with the created avatars to identify the appropriate reaction tracks for rendering with the respective avatars. The reaction track identifier 317 further uses the selection option chosen by the spectator(s) for rendering the avatar(s) and/or the reaction track(s) and provides the appropriate avatar(s) and/or the reaction tracks in accordance to the chosen selection option. In the example illustrated in FIG. 23, a spectator within a vibe clique may have chosen the selection option for rendering all the avatars identified in the audience and the reaction track of only the dominating emotion for rendering at the client device of the spectator. Consequently, the reaction track identifier 317 examines the confidence score associated with each of the vibe cliques to determine the dominating emotion in the audience and retrieves an appropriate reaction track for the dominating emotion for rendering at the client device. FIG. 23 shows an example where the neutral emotion is shown as the dominating emotion in the audience and the reaction track is identified for the neutral emotion and rendered alongside the expressive avatar associated with the neutral emotion. As noted before, the reaction track for the most dominant avatar may be presented based on the selection option chosen by a spectator or a group of spectators of a vibe clique from the interactive interface rendering the various selection options for presenting the avatars and the reaction tracks. The image representation of the audience of FIG. 23 is presented to the spectator or group of spectators in response to the selection option.

In some implementations, a reaction interface may be provided for spectator selection, wherein the reaction interface includes a list of reactions or comments of different spectators to access and view. In some implementations, a particular spectator's or a particular set of spectators reactions or comments in response to a specific spectator's reactions or comments may be more popular than the gameplay of the video game or the reaction tracks associated with the different vibe cliques. As a result, the reaction interface provides options to access and view reactions or comments of the particular spectator or particular set of spectators responding to reactions or comments of a specific spectator. The options may be provided to only the spectators within the vibe clique in which the particular spectator or the particular set of spectators are members or may be provided to all the spectators in the audience.

Figure 24:
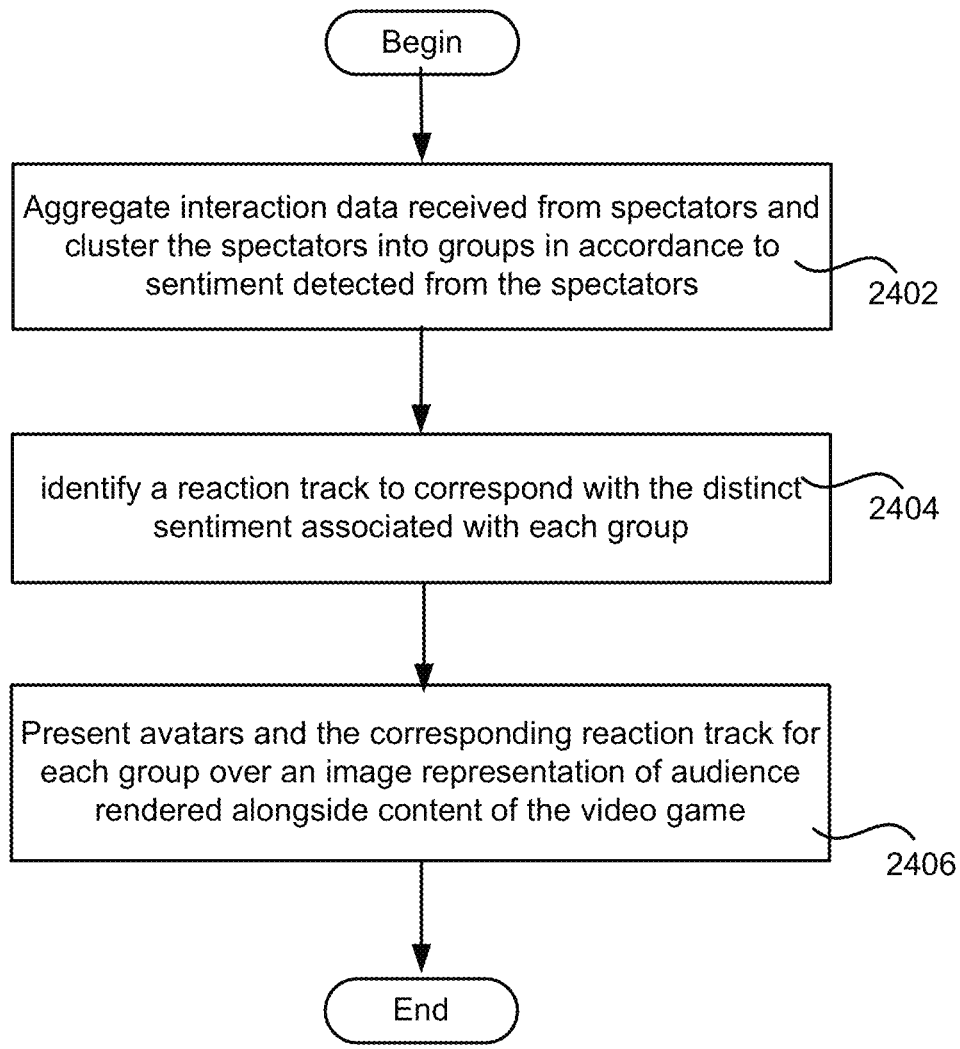
FIG. 24 illustrates method operations for surfacing emotion of spectators and presenting avatars and reaction tracks associated with the surfaced emotion alongside content of the video game, in accordance with one implementation of the disclosure.

FIG. 24 illustrates a method for identifying and presenting emotions of an audience of spectators watching a gameplay of a video game, in one implementation. The spectators, in this implementation, may be watching a live gameplay of the video game. In other implementation, the spectators may be watching a replay of the gameplay of the video game. In one example, operation 2402 may be configured to aggregate interaction data provided by spectators engaged in watching gameplay of the video game. The interaction data may include expressions on the spectators face captured in live video by one or more image capturing devices, or audio content expressed by the spectators and captured via microphones or other audio detection and/or recording device, or interaction content (e.g., audio, text, memes, GIFs, emojis, etc.) generated by the spectators via interaction interface such as a chat interface, message board, social media interface, etc. The interaction data of the spectators are transmitted to the sentiment surfacing engine 304 executing on the game cloud server 300 for processing.

The interaction data is aggregated and processed to identify emotions expressed by the spectators while they are watching the gameplay of the video game. As part of aggregation, the emotions expressed (either visually via facial features or verbally or via interactive interface) by the spectators are identified and the spectators are clustered into different groups in accordance to the emotion (i.e., sentiment) detected from the different spectators. In one implementation, the interaction data (e.g., facial features, interaction data provided via interaction interface, audio content, etc.) is analyzed using machine learning algorithm to determine the emotions detected from the spectators and to cluster the spectators into groups expressing same or similar emotions.

The method flows to operation 2404, where the clustering information is used to identify a reaction track to correspond with the distinct emotion associated with each group of spectators. The reaction track is identified based on a current emotion of the group, and as the emotions of the group change over time, a different reaction track is identified to match with the changes in the emotions of the group. The reaction track may be identified based on the content of the video game, the context of the video game, the emotion of the spectators in the group, etc.

The method concludes with operation 2406 where the reaction tracks identified for each group of spectators are presented over an image representation of an audience rendered alongside content of the video game. A volume of the reaction track associated with each group is calibrated to correspond with the number of spectators in the group. The reaction tracks provide an aural representation of the emotions of the audience, allowing the spectators to experience the emotions of the spectators in the audience and to find a group of spectators who share similar emotions exhibited by the spectators.

In some implementations, reaction highlight of a particular spectator from a specific group may be presented to the spectators of the specific group to which the particular spectator belongs or may be presented to all the spectators of the video game. In this implementation, the particular spectator may be selected based on the emotions previously expressed by the spectator while watching the gameplay of the video game (either during live gameplay or delayed gameplay). Once the particular spectator is identified, a video of the particular spectator expressing the emotions is captured and presented during a key game moment related to an event occurring in the gameplay of the video game. The captured video of the particular spectator expressing the emotion is presented as reaction highlights with the content of the video game. In one implementation, the particular spectator is selected randomly. In another implementation, the particular spectator is selected via predictive analysis of prior expressions expressed by the particular spectator during gameplay of the video game. The prior expressions of the particular spectator may be identified from current gameplay session or from prior gameplay session of the video game, or from gameplay session of another video game. The sentiment surfacing engine 304 may determine that the particular spectator provides distinctive emotions than other spectators in the specific group and such determination may be made by analyzing the interaction data of the spectators in the specific group. The sentiment surfacing engine 304 may analyze the gameplay of the video game to determine the current game state of the video and interact with game logic to determine when a key game event is scheduled to occur in the video game based on the game state of the video game, and responsively send a signal to the one or more image capturing devices to focus on the particular spectator of the specific group to capture the expressions of the particular spectator. The captured video of the particular spectator is live streamed to the spectators of the specific group or to all the spectators watching the gameplay of the video game. The live video of the spectator provides interesting aspect of gameplay viewing by the spectators in the audience of the video game.

In another implementation, instead of a video of a spectator, a graphic interchange format image (GIF) is identified to provide the reaction highlights of the video game. The GIF is selected to express a particular emotion associated with a specific group. The GIF may be identified using keywords identifying the particular emotion of the specific group. Similar to the video of the spectator, the identified GIF may be provided as reaction highlights during key game moment related to an event of the video game.

The various implementations discussed herein provide ways for spectators to get involved in the gameplay of the video game and to connect with other spectators that are also watching the gameplay of the video game. The reaction tracks and the avatar representation allow the spectator to quickly gauge the vibes in the audience viewing the gameplay of the video game and to identify a specific group of spectators to align with for watching the gameplay.

Figure 25:
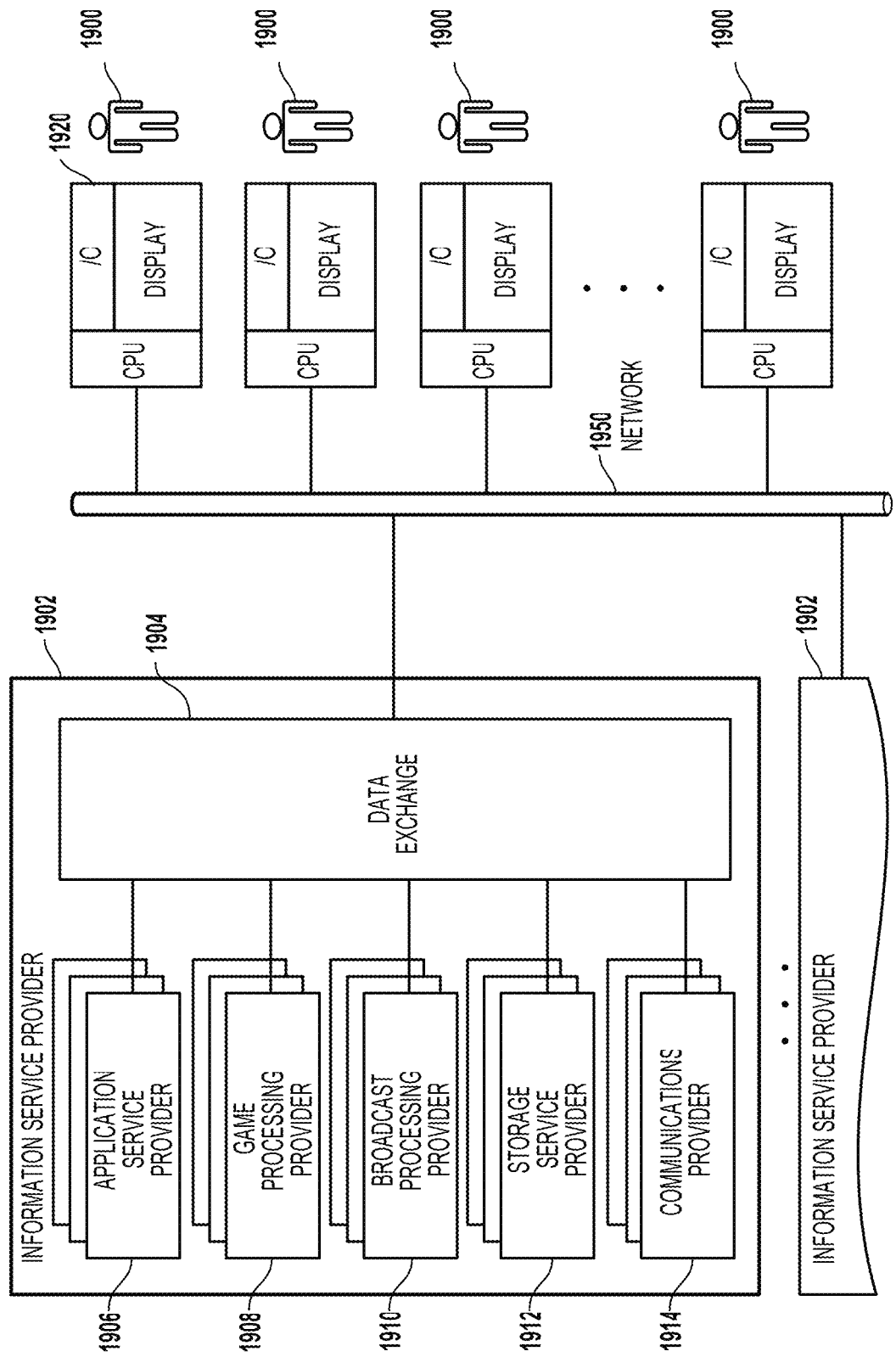
FIG. 25 illustrates an example information service provider used for processing the interaction data of the spectators to present avatars representing different emotions, in accordance with one implementation of the disclosure.

FIG. 25 illustrates an example Information Service Provider architecture that can be used to perform aspects of the various embodiments of the present disclosure, in one implementation. Information Service Providers (ISP) 1902 delivers a multitude of information services to users (i.e., players) 1900 geographically dispersed and connected via network 1950 (also referred by reference number 200 in FIG. 1). An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1902 includes Application Service Provider (ASP) 1906, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1902 includes a Game Processing Server (GPS) 1908 which is used by game clients to play single and multiplayer video games. Most video games played over the Internet operate via a connection to a game server (e.g., game cloud server). Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1910 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1912 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1914 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1904 interconnects the several modules inside ISP 1902 and connects these modules to users 1900 (players, spectators) via network 1950 (reference number 200 in FIG. 1). Data Exchange 1904 can cover a small area where all the modules of ISP 1902 are in close proximity, or can cover a large geographic area when the different modules are geographically dispersed. For example, Data Exchange 804 can include a fast Gigabit Ethernet (or faster) within a cabinet of a data center, or an intercontinental virtual area network (VLAN).

Users 1900 (players, spectators) access the remote services with client device 1920 (i.e., client device of player 101 or spectator 102 in FIG. 2), which includes at least a CPU, a memory, a display and I/O. The client device can be a PC, a mobile phone, a netbook, tablet, gaming system, a PDA, etc. In one embodiment, ISP 1902 recognizes the type of device used by the client and adjusts the communication method employed. In other cases, client devices use a standard communications method, such as html, to access ISP 1902.

Figure 26:
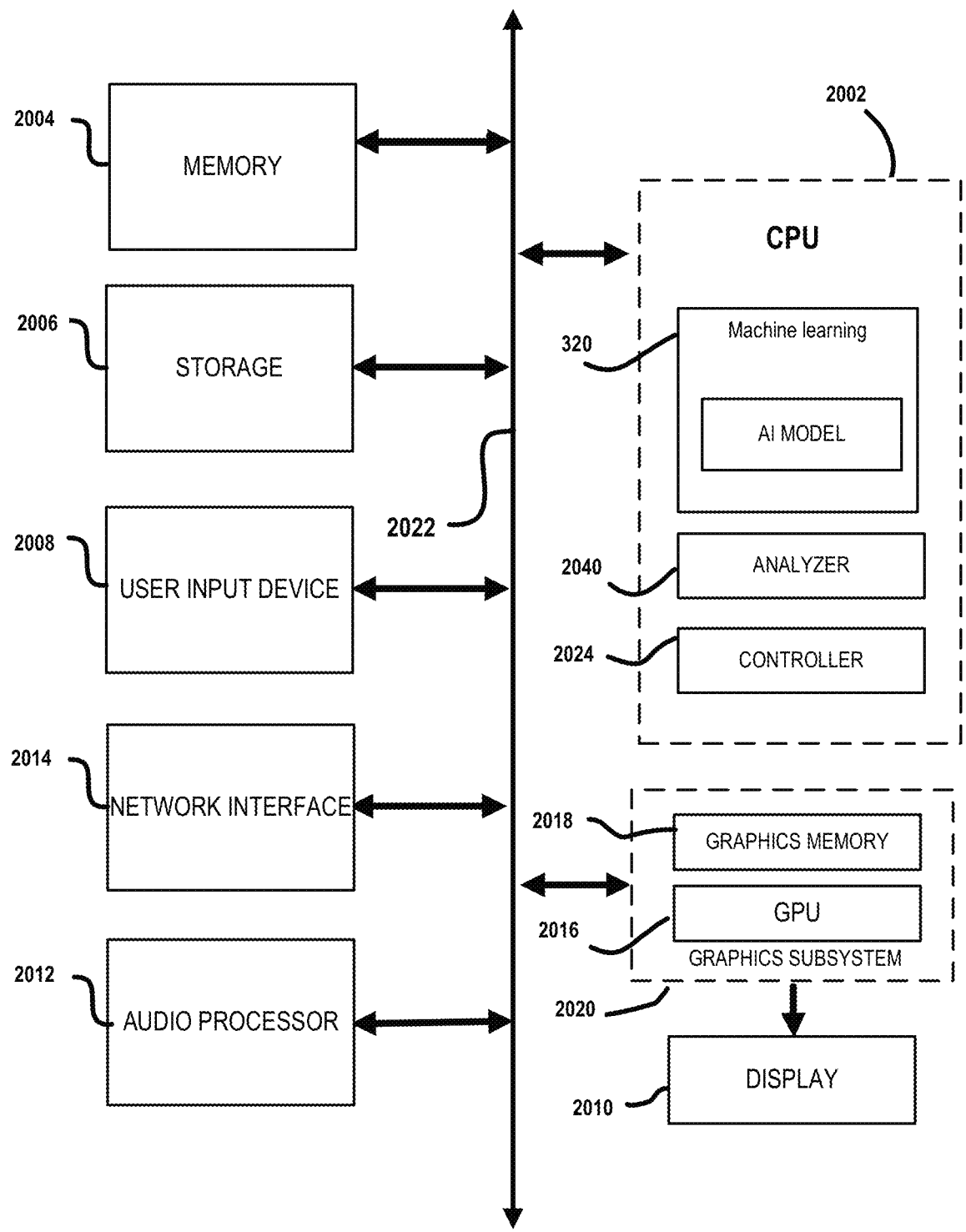
FIG. 26 illustrates components of an example server device that can be used to perform aspects of the various embodiments of the present disclosure.

FIG. 26 illustrates components of an example device 2000 that can be used to perform aspects of the various embodiments of the present disclosure. This block diagram illustrates a device 2000 that can incorporate or can be a personal computer, video game console, personal digital assistant, a server or other digital device, suitable for practicing an embodiment of the disclosure. Device 2000 includes a central processing unit (CPU) 2002 for running software applications and optionally an operating system. CPU 2002 may be comprised of one or more homogeneous or heterogeneous processing cores. For example, CPU 2002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 2000 may be a localized to a player playing a game segment (e.g., game console), or remote from the player (e.g., back-end server processor), or one of many servers using virtualization in a game cloud system for remote streaming of gameplay to clients.

Memory 2004 stores applications and data for use by the CPU 2002. Storage (e.g., data storage) 2006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 2008 communicate user inputs from one or more users to device 2000, examples of which may include keyboards, mice, joysticks, touch pads, touch screens, still or video recorders/cameras, tracking devices for recognizing gestures, and/or microphones. Network interface 2014 allows device 2000 to communicate with other computer systems via an electronic communications network, and may include wired or wireless communication over local area networks and wide area networks such as the internet. An audio processor 2012 is adapted to generate analog or digital audio output from instructions and/or data provided by the CPU 2002, memory 2004, and/or storage 2006. The components of device 2000, including CPU 2002, memory 2004, data storage 2006, user input devices 2008, network interface 2014, and audio processor 2012 are connected via one or more data buses 2022.

A graphics subsystem 2020 is further connected with data bus 2022 and the components of the device 2000. The graphics subsystem 2020 includes a graphics processing unit (GPU) 2016 and graphics memory 2018. Graphics memory 2018 includes a display memory (e.g., a frame buffer) used for storing pixel data for each pixel of an output image. Graphics memory 2018 can be integrated in the same device as GPU 2016, connected as a separate device with GPU 2016, and/or implemented within memory 2004. Pixel data can be provided to graphics memory 2018 directly from the CPU 2002. Alternatively, C P U 2002 provides the GPU 2016 with data and/or instructions defining the desired output images, from which the GPU 2016 generates the pixel data of one or more output images. The data and/or instructions defining the desired output images can be stored in memory 2004 and/or graphics memory 2018. In an embodiment, the GPU 2016 includes 3D rendering capabilities for generating pixel data for output images from instructions and data defining the geometry, lighting, shading, texturing, motion, and/or camera parameters for a scene. The GPU 2016 can further include one or more programmable execution units capable of executing shader programs.

The graphics subsystem 2020 periodically outputs pixel data for an image from graphics memory 2018 to be displayed on display device 2010. Display device 2010 can be any device capable of displaying visual information in response to a signal from the device 2000, including CRT, LCD, plasma, and OLED displays. Device 2000 can provide the display device 2010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, gameplay replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device 2024. However, when such a game is made available via a game cloud system as presented herein, the user may be accessing the video game with a different controller device 2024. For example, a game might have been developed for a game console and its associated controller 2024, whereas the user might be accessing a cloud-based version of the game from a personal computer utilizing a keyboard and mouse. In such a scenario, the input parameter configuration can define a mapping from inputs which can be generated by the user's available controller device 2024 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device 2024 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device 2024. That is, the controller device 2024 communicates via a wireless or wired connection with the client device to transmit inputs from the controller device 2024 to the client device. The client device may in turn process these inputs and then transmit input data to the game cloud server via a network (e.g. accessed via a local networking device such as a router). However, in other embodiments, the controller device 2024 can itself be a networked device, with the ability to communicate inputs directly via the network to the game cloud server, without being required to communicate such inputs through the client device first. For example, the controller device 2024 might connect to a local networking device (such as the aforementioned router) to send to and receive data from the game cloud server. Thus, while the client device may still be required to receive video output from the cloud-based video game and render it on a local display, input latency can be reduced by allowing the controller device (also referred to as "controller") 2024 to send inputs directly over the network to the game cloud server, bypassing the client device.

In one embodiment, a networked controller and client device can be configured to send certain types of inputs directly from the controller to the game cloud server, and other types of inputs via the client device. For example, inputs whose detection does not depend on any additional hardware or processing apart from the controller itself can be sent directly from the controller to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller might be processed by the client device in conjunction with captured video to detect the position and motion of the controller, which would subsequently be communicated by the client device to the game cloud server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
aggregating interaction data collected from spectators engaged in watching gameplay of a video game, the aggregation includes clustering the spectators into groups based on emotions detected from the interaction data of the spectators, wherein each group of spectators is associated with a distinct emotion identified from the interaction data;
generating an avatar for associating with said each group of spectators, expression of the avatar reflecting the distinct emotion of said each group;
identifying a reaction track to correspond with the distinct emotion associated with said each group; and
presenting the avatar and the reaction track associated with said each group over an image representation of the groups of spectators presented alongside content of the video game that is being viewed by the spectators of the video game, wherein presenting includes adjusting a volume of the reaction track of said each group in accordance to a number of spectators in said each group, the avatar providing a visual representation and the reaction track providing an aural representation of the distinct emotion of said each group.

2. The method of claim 1, wherein the number of spectators in said each group represents further includes, determining a confidence score of said each group of spectators.

3. The method of claim 1, wherein identifying the reaction track further includes,
detecting changes in the emotions expressed by spectators of each group over time, the changes to the emotions correlating with changes occurring in the content of the video game; and
dynamically identifying the reaction track for each group to correspond with changes to the emotions detected in each group.

4. The method of claim 1, wherein presenting the reaction track includes presenting the reaction track of each group to all the spectators engaged in watching the video game.

5. The method of claim 1, wherein presenting the reaction track presenting the reaction track of said each group to corresponding spectators of said each group.

6. The method of claim 1, wherein aggregating the interaction data includes,
performing sentiment analysis of the interaction data to identify keywords that correspond with emotions; and
generating and dynamically updating a word cloud with the keywords, the keywords in the word cloud capturing an emotional state of the spectators at each point in time.

7. The method of claim 6, wherein identifying the reaction track for a specific group of spectators includes,
grouping the keywords in the word cloud in accordance to the emotions defined by the keywords, wherein each group of keywords corresponds to a particular sentiment; and
using select group of keywords that represent the emotion of the specific group to identify the reaction track for the specific group.

8. The method of claim 6, wherein identifying the reaction track for a specific group of spectators further includes,
identifying affiliation of the spectators to particular players or particular team of players of the video game, the affiliation identified from social graph of the spectators or players;
grouping the keywords in the word cloud into groups in accordance to the affiliations of the spectators, the keywords correspond to the emotions of the spectators responding to gameplay of the particular players or particular team of players in the video game, wherein each group of keywords corresponds to a particular sentiment; and
using select group of keywords that represent the emotion of the specific group to identify the reaction track for the specific group.

9. The method of claim 1, wherein the reaction track for each group is identified using artificial intelligence model.

10. The method of claim 1, further includes, receiving a request from a spectator of a first group to be affiliated with a second group, responsive to the request, disassociating the spectator from the first group and associating the spectator with the second group, the association of the spectator with the second group resulting in a change in the number of spectators in the first and the second groups, wherein the association of the spectator with the second group providing the spectator with access to interaction data generated by or captured of the spectators in the second group in response to events occurring in the video game.

11. The method of claim 1, wherein generating the avatar for each said group of spectators further include, dynamically adjusting the expression of the avatar and identifying the reaction track of said each group in accordance to changes detected in the corresponding distinct emotion expressed by the spectators of said each group, wherein the changes to the distinct emotion expressed by the spectators of said each group correspond to events occurring in the video game, the dynamically adjusted avatar and the reaction track identified for said each group of spectators to client devices of the spectators of said each group for rendering alongside content of the video game.

12. The method of claim 11, wherein generating the avatar for a group of spectators includes,
generating a generic avatar using artificial intelligence model;
associating the generic avatar to the group of spectators, the association allowing access to interaction data of the spectators in the group, the interaction data used to determine dynamics of the emotion expressed by the spectators of the group, the emotion changing with changes detected in the video game; and
dynamically adjusting expression of the generic avatar and identifying appropriate reaction track to correspond with changes detected in the emotion of the group, the avatar with adjusted expression and the appropriate reaction track forwarded to client devices of the spectators of said group for rendering.

13. The method of claim 11, presenting the avatar of each group includes simultaneously presenting avatars and corresponding reaction tracks of two opposing groups of spectators viewing the video game, the avatars and the reaction tracks of the two opposing groups of spectators used to provide contrasting reactions to an event occurring within the video game, when rendered alongside the content of the video game.

14. The method of claim 1, further includes,
selecting a spectator within a specific group of spectators associated with a particular emotion to provide reaction highlights for a particular sentiment, the spectator selected based on the emotions expressed by the spectator; and
presenting a video of the spectator expressing the emotion of the group during occurrence of an event in the video game, the video presented along with the reaction track of the specific group.

15. The method of claim 14, wherein the spectator for the specific group is selected via predictive analysis of prior expressions for different emotions expressed by the spectators in the specific group captured during current gameplay session while the spectators were viewing gameplay of the video game.

16. A method, comprising:
capturing interaction data from spectators in an audience engaged in watching gameplay of a video game;
aggregating the interaction data captured from the spectators in the audience, the aggregating includes clustering the spectators into different groups in accordance to emotions detected from the interaction data of the spectators in the audience, wherein each group of spectators is associated with a distinct emotion identified from the interaction data;
determining a confidence score of each group of spectators, the confidence score indicative of a number of spectators in each group expressing the distinct emotion associated with the group;
identifying a reaction track to correspond with the distinct emotion associated with a specific group of spectators, wherein the specific group of spectators is identified based on the confidence score of each group; and
presenting the reaction track of the specific group of spectators to the spectators of each group alongside content of the video game that is being viewed by the spectators, wherein presenting includes adjusting a volume of the reaction track of said specific group of spectators in accordance to the number of spectators in said specific group.

17. The method of claim 16, wherein the specific group of spectators is identified to have the highest confidence score in the audience, and wherein the volume of the reaction track of the specific group is adjusted in accordance to the confidence score of the specific group.

18. The method of claim 16, further includes,
generating an avatar to represent the distinct emotion associated with the specific group of spectators, expressions of the avatar associated with the specific group being dynamically adjusted in accordance to changes detected in the emotion of the spectators in the specific group; and
presenting the avatar of the specific group of spectators alongside content of the video game, a size of the avatar for the specific group scaled to correspond with the confidence score of the specific group.

* * * * *